United States Patent
Lakkis

(10) Patent No.: US 7,916,081 B2
(45) Date of Patent: Mar. 29, 2011

(54) BEAMFORMING IN MIMO SYSTEMS

(75) Inventor: Ismail Lakkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 337 days.

(21) Appl. No.: 11/960,234

(22) Filed: Dec. 19, 2007

(65) Prior Publication Data

US 2009/0160707 A1 Jun. 25, 2009

(51) Int. Cl.
*H04B 7/00* (2006.01)
(52) U.S. Cl. ........................................................ 342/367
(58) Field of Classification Search .................... 342/367
See application file for complete search history.

(56) References Cited

U.S. PATENT DOCUMENTS

| | | | |
|---|---|---|---|
| 7,046,716 B1 | 5/2006 | Miao | |
| 7,505,529 B2 * | 3/2009 | Kwak et al. | 375/295 |
| 7,672,271 B2 | 3/2010 | Lee | |
| 7,675,989 B2 | 3/2010 | Ahn et al. | |
| 2004/0218683 A1 | 11/2004 | Batra et al. | |
| 2006/0233270 A1 * | 10/2006 | Ahn et al. | 375/260 |
| 2007/0113159 A1 | 5/2007 | Lakkis | |
| 2007/0147361 A1 * | 6/2007 | Lee | 370/384 |
| 2008/0056414 A1 * | 3/2008 | Kim et al. | 375/347 |
| 2008/0076370 A1 * | 3/2008 | Kotecha et al. | 455/187.1 |
| 2008/0165875 A1 * | 7/2008 | Mundarath et al. | 375/262 |
| 2009/0073954 A1 * | 3/2009 | Maltsev et al. | 370/347 |
| 2009/0122715 A1 | 5/2009 | Lakkis | |
| 2009/0125792 A1 | 5/2009 | Lakkis | |
| 2009/0143008 A1 * | 6/2009 | Hottinen et al. | 455/11.1 |
| 2009/0207765 A1 * | 8/2009 | Yamaura | 370/310 |

FOREIGN PATENT DOCUMENTS

| | | |
|---|---|---|
| EP | 1659813 | 5/2006 |
| EP | 1816758 | 8/2007 |
| WO | WO2009059232 | 5/2009 |
| WO | WO2009140605 | 11/2009 |

OTHER PUBLICATIONS

IEEE 802.11n/D1.0, "Part 11: Wireless LAN Medium Access Control (MAC) and Physical Layer (PHY) specifications: Enhancements for Higher Throughput," IEEE, Mar. 2006.

IEEE 802.16e/D12, "Part 16: Air Interface for Fixed and Mobile Broadband Wireless Access Systems—Amendment for Physical and Medium Access Control Layers for Combined Fixed and Mobile Operation in Licensed Bands," IEEE, Oct. 2005.

Love, D.J., et al., "Grassmannian Beamforming for Multiple-Input Multiple-Output Wireless Systems," IEEE Trans. Information Theory, vol. 49, No. 10, Oct. 2003, pp. 2735-2747.

Wang H M et al: "Efficient MIMO channel estimation using complementary sequences" 20071004, vol. 1. No. 5. Oct. 4, 2007, pp. 962-969, XP006029714.

(Continued)

*Primary Examiner* — Thomas H Tarcza
*Assistant Examiner* — Harry Liu
(74) *Attorney, Agent, or Firm* — Dang M. Vo

(57) ABSTRACT

A beamforming method comprises transmitting a training sequence from a transmitter array employing a set of beamforming vectors from a beamforming codebook. A receive array employs a combining codebook to acquire channel state information from the received transmissions, and estimates a preferred beamforming vector and a preferred combining vector. At least the preferred beamforming vector (and, optionally, the preferred combining vector) is transmitted back to the transmitter array.

33 Claims, 48 Drawing Sheets

OTHER PUBLICATIONS

Guangqi Yang et al: "Design of Synchronization Seguences in a MIMO Demonstration System" Wireless Communications and Applied Computational Electromagnetics, 20 05, IEEE/ACES International Conference on Honolulu, HI Apr. 3-7, 2005, Piscataway NJ, USA. IEEE, Apr. 3, 2005, pp. 40-43, XP010826457.

International Search Report—PCT/US08/087094, International Search Authority—European Patent Office—Jun. 25, 2009.

Written Opinion—PCT/US08/087094, International Search Authority—European Patent Office—Jun. 25, 2009.

Hiroshi Harada: "IEEE 802.15-07-0761-10-003C Unified andflexible millimeter wave WPAN systems supported by common mode" TG3C - IEEE 802.15-07-0761-10-003C., Sep. 18, 2007, pp. 1-62, XP002508475 the whole document pp. 37-39 Appendix I, II: pp. 59 and 60.

Ryuhei Funada et al: "A design of single carrier based PHY for IEEE 802.15.3c standard" IEEE International Symposium on Personal, Indoor and Mobile Radio Communications. PIMRC, IEEE; PI, XX, Sep. 1, 2007, pp. 1-5, XP031168950 ISBN: 978-1-4244-1143-6 the whole document abstract V. Frame Format section, A. Preamble subsection figure 3.

* cited by examiner

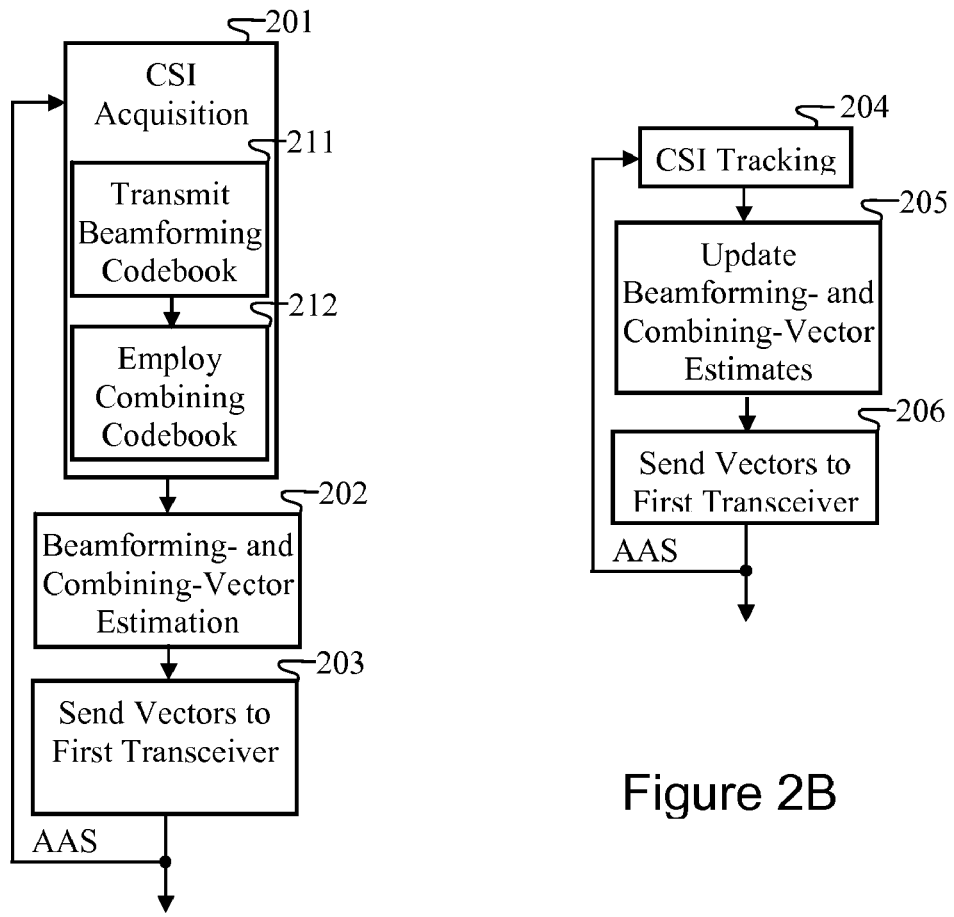

| 0 or 2 | 0 or 6 | 1 | 1 | 1 | 1 | 1 |
|---|---|---|---|---|---|---|
| TRAINING SEQUENCE INFO | Tx & RX ANTENNA ARRAY INFO | ANTENNA TYPE | CURRENT Q-OMIN S-BEACON IDENTIFER (4bits) | NUMBER OF Q-OMNI S-BEACONS (4bits) | Length (=3 or 7) | Element ID |

Figure 13A

| 4b | 4b | 4b | 4b | 4b | 4b |
|---|---|---|---|---|---|
| LAST Y-VECTOR ID | FIRST Y-VECTOR ID | LAST X-VECTOR ID | FIRST X-VECTOR ID | Y-CODEBOOK ID | X-CODEBOOK ID |

Figure 13B

| 7b | 1b | 4b | 4b |
|---|---|---|---|
| GUARD TIME DURATION | CES MODE | NUMBER OF SYNCs PER TRAINING SEQUENCE | NUMBER OF TRAINING SEQUENCES PER SUPERFRAME |

Figure 13C

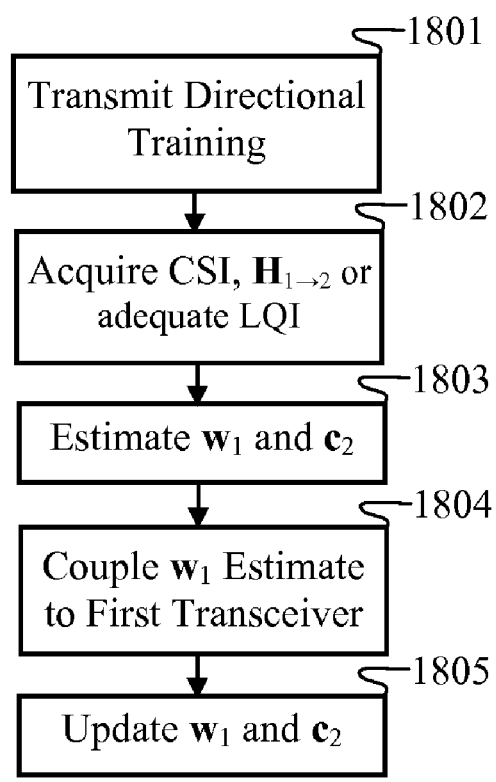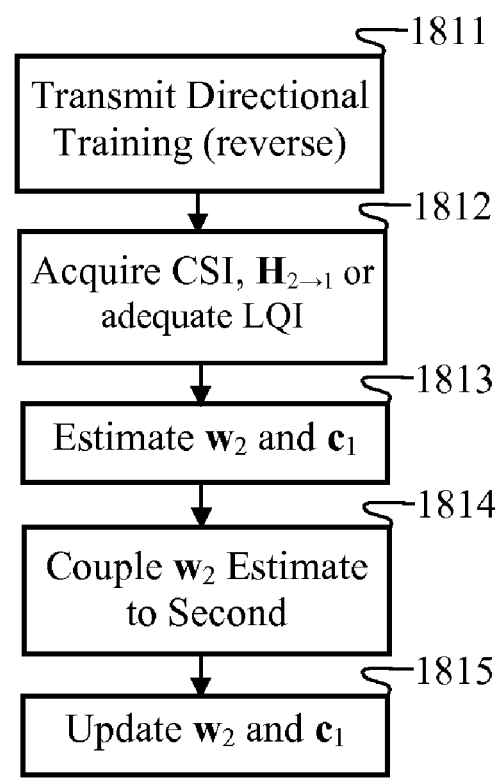
Figure 18A
Figure 18B

BEAMFORMING IN MIMO SYSTEMS

BACKGROUND OF THE INVENTION

I. Field of the Invention

This invention relates generally to wireless communication systems and more particularly to beamforming in a millimeter-wave wireless communication system.

II. Description of the Related Art

In one aspect of the related art, a dual-mode ultra-wideband (UWB) Physical Layer supporting single carrier and OFDM modulation employs a common mode. The UWB Physical Layer may be used for millimeter wave (e.g., 60 GHz) communications. The common mode is a single-carrier mode used by both single-carrier and OFDM devices for beaconing, network-control signaling, and base-rate data communications. The common mode is typically necessary for interoperability between different devices and different networks.

Millimeter-wave communications may also employ MIMO (multiple input multiple output) beamforming to provide both spatial diversity and array gains. Conventional beamforming, such as Eigen-beamforming, requires channel state information matrices or beamforming matrices to be returned to the transmitting array. The IEEE 802.11n MAC/PHY Specifications D0.04, March 2006, specifies feedback information that includes row and column sizes of the feedback matrices, subcarrier grouping size (or cluster size), quantization bit size, and an array of actual quantized data elements starting in the order of the lowest subcarrier index to the highest subcarrier index. For beamforming that employs precoding matrices, the feedback information can be reduced by replacing beamforming matrix contents with indices of a precoding-matrix codebook, such as described in the IEEE 802.16e MAC/PHY Specifications D12, 2005, and in D. J. Love, R. W. Heath Jr., and T. Strohmer, "Grassmannian Beamforming for Multiple-Input Multiple-Output Wireless Systems", IEEE Trans. Information Theory, Vol. 49, No. 10, October 2003, pp. 2735-2747).

SUMMARY OF THE INVENTION

Embodiments disclosed herein are advantageous for systems employing UWB signals. However, the invention is not intended to be limited to such systems, as other wireless systems may benefit from similar advantages.

In one embodiment of the invention, a piconet controller employs a frame format for signaling to one or more wireless subscriber devices. The piconet controller and each of the one or more subscriber devices employ antenna arrays. The piconet controller transmits a signal with a frame format comprising a plurality of transmission segments, wherein each of the plurality of transmission segments is transmitted with a different beam pattern from a predetermined beamforming codebook.

The frame format also provides for a listening period that allows the piconet controller to listen for feedback (e.g., an acknowledgment) from the one or more subscriber devices. The piconet controller receives preferred beamforming weights calculated by each subscriber device and employs the beamforming weights in its array for communicating with the one or more subscriber devices. The piconet controller may also receive each subscriber device's calculated combining weights.

In one embodiment of the invention, the piconet controller may perform proactive beamforming in which it employs the beacon portion of a superframe when the piconet controller is the data source for one or more subscriber devices. In another embodiment, the piconet controller may perform on-demand beamforming, which employs a Channel Time Allocation (CTA) part of the superframe. On-demand beamforming is typically performed between two devices (e.g., between the piconet controller and a subscriber device, or between two subscriber devices).

The beacon portion includes a quasi-omni section and a directional section. The quasi-omni section may comprise a plurality of identical quasi-omni (Q-omni) sub-beacons (S-beacons), also referred to as transmission segments, covering different (and possibly overlapping) geographical areas around the piconet controller. Each Q-omni S-beacon is transmitted using a different Q-omni beamforming pattern selected from a Q-omni codebook. One Q-omni beamforming vector is used per Q-omni sub-beacon transmission.

The listening period also comprises a plurality of receiving segments. For example, the Contention Access Period (CAP) may be divided into a plurality of sub-CAPs. During the $l^{th}$ sub-CAP, the piconet controller is in receiving mode, and it employs the same Q-omni beamformer vector used for transmission during the $l^{th}$ Q-Omni beacon. The quasi-omni transmissions convey information about the structure of the directional training sections, and the directional training sections enable channel state information (CSI) acquisition and tracking. The directional section comprises a plurality of repetitions of a training sequence (which may also be referred to as transmission segments), where each repetition is transmitted by the piconet controller with a different orthogonal or quasi-orthogonal beamforming vector from an orthogonal (or quasi-orthogonal) codebook.

The applicant recognizes that the frame formats and methods described with respect to the piconet controller communicating with one or more subscriber devices may also be employed by subscriber devices communicating with the piconet controller and/or other subscriber devices.

In another embodiment of the invention, a subscriber device in a piconet is configured for selecting beamforming and combining weights. The subscriber device and the piconet controller both comprise an antenna array. The subscriber device receives a signal comprising a plurality of transmission segments transmitted by the piconet controller. Each of the plurality of transmission segments is transmitted with a different beam pattern from a predetermined beamforming codebook. The subscriber device receives at least a subset of the plurality of transmission segments and estimates a preferred beamforming vector therefrom. The subscriber device also estimates a preferred combining vector for processing it receives. At least the preferred beamforming vector is sent back to the piconet controller during a listening period The applicant recognizes that the frame formats and methods described with respect to the subscriber device communicating with the piconet controller may also be employed by the piconet controller communicating with one or more subscriber devices.

In a further embodiment of the invention, a quasi-omni acquisition signaling protocol comprises a first transceiver transmitting a number L of quasi-omni packets followed by L listening periods (ACKs) until it receives an ACK in one of the L listening periods (e.g., at the $l^{th}$ listening period). The first transceiver selects the $l^{th}$ Q-omni direction for transmission from the Q-omni codebook. The second transceiver records its best Q-omni receiving direction and uses it for any future Q-omni reception.

Embodiments of the invention may also provide for a frame format for directional training employing periodic transmissions from the first transceiver to the second transceiver. For example, one cycle of directional training sequences transmitted by the first transceiver may correspond to all J orthogonal (quasi-orthogonal) beamforming vectors from a subset of the selected codebook. Each cycle is followed by a listening period (ACK) to listen to any feedback from the second transceiver.

The first transceiver repeats the period until the second transceiver acquires the CSI, $H_{1\to 2}(n)$ for $n=0, 1, \ldots, N-1$, or finds an adequate LQI. The second transceiver estimates $w_1$ and $c_2$ and couples at least the $w_1$ estimate to the first transceiver during the listening (ACK) period. The first transceiver employs the $w_1$ beamforming estimate and the second transceiver employs the $c_2$ combining estimate for downlink ($1\to 2$) data communications. These estimates may be updated during a subsequent tracking step. Furthermore, this procedure may be performed for uplink (e.g., $2\to 1$ data communications).

Embodiments of the invention may be optimized for minimum processing complexity, such as to enable suitability for real-time applications, rapid updates, low power consumption, and/or low cost processing components. Particular embodiments of the invention may be configured to provide for the previously recited features and advantages and/or alternative features and advantages.

Although particular embodiments are described herein, many variations and permutations of these embodiments fall within the scope and spirit of the invention. Although some benefits and advantages of the preferred embodiments are mentioned, the scope of the invention is not intended to be limited to particular benefits, uses, or objectives. Rather, embodiments of the invention are intended to be broadly applicable to different wireless technologies, system configurations, networks, and transmission protocols, some of which are illustrated by way of example in the figures and in the following description of the preferred embodiments. The detailed description and drawings are merely illustrative of the invention rather than limiting, the scope of the invention being defined by the appended claims and equivalents thereof.

BRIEF DESCRIPTION OF THE DRAWINGS

Embodiments according to the present invention are understood with reference to the following figures.

FIG. 2A illustrates a beamforming method between a first transceiver and a second transceiver in accordance with an embodiment of the invention.

FIG. 2B illustrates a beamforming-tracking method in accordance with an embodiment of the invention.

FIG. 13A shows a beamforming information element of a transmission frame.

FIG. 13B shows an antenna array information portion of the beamforming information element.

FIG. 13C shows a training sequence information portion of the beamforming information element.

FIG. 18A illustrates a method in accordance with an embodiment of the invention that employs the frame format shown in FIG. 15.

FIG. 18B illustrates a method in accordance with an alternative embodiment of the invention.

DETAILED DESCRIPTION OF PREFERRED EMBODIMENTS

Figure 1:
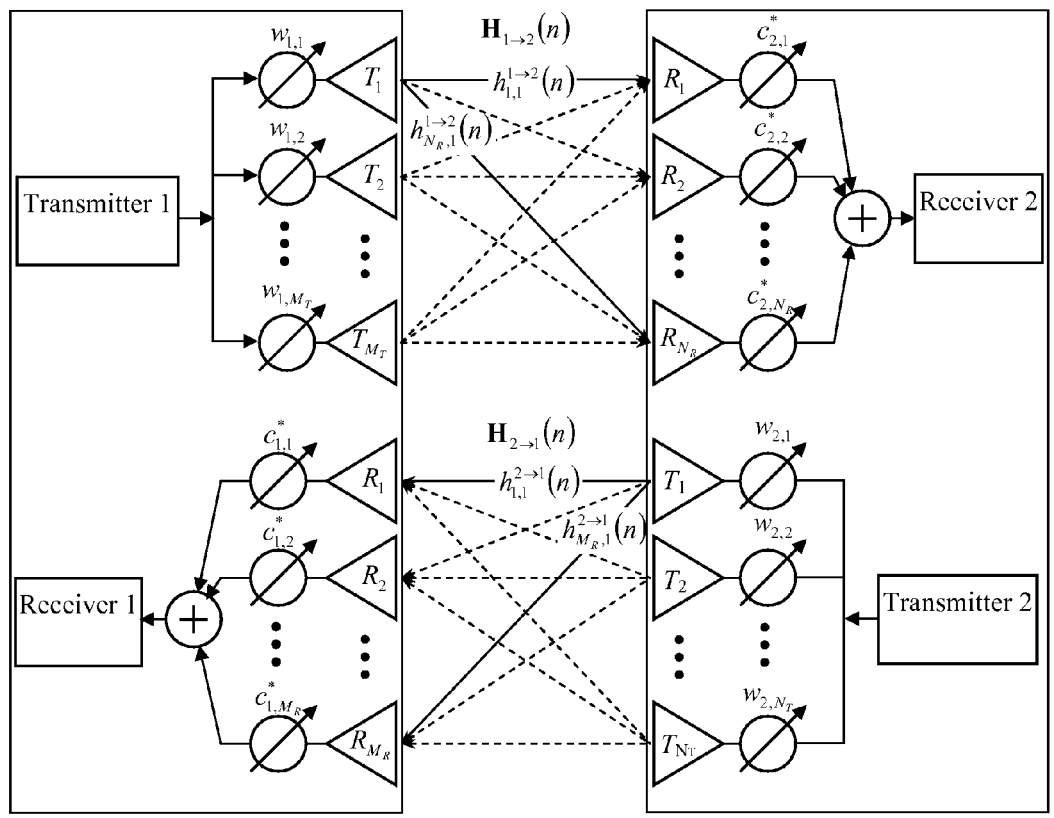
FIG. 1 is a block diagram of an Asymmetric Antenna System, which may be employed in accordance with embodiments of the invention.

Accordingly, while the embodiments of the present disclosure are susceptible to various modifications and alternative forms, specific exemplary embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers may refer to like elements throughout the description of the figures.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality and procedures involved.

A transceiver that employs the same antenna(s) for both transmission and reception is referred to as a Symmetric Antenna System (SAS). A transceiver that employs one set of antennas for transmission and another set of antennas for reception (such as shown in FIG. 1) is referred to as an Asymmetric Antenna System (AAS). A first transceiver 101 employs $M_T$ transmit antennas and $M_R$ receive antennas. A second transceiver 102 employs $N_T$ transmit antennas and $N_R$ receive antennas.

Channel model $H_{1 \to 2}$ is used to express the propagation environment when transceiver 101 transmits signals to transceiver 102. Similarly, channel model $H_{2 \to 1}$ expresses the propagation environment when transceiver 102 transmits signals received by transceiver 101. The channel models may be used to express any of the possible antenna configurations that may be employed in the related art. Furthermore, the channel models may be used to express different transmission protocols. In one embodiment of the invention, OFDM signaling with a cyclic prefix and an FFT length of N subcarriers may employ the same channel model as a transmission that is Single Carrier (SC) with a cyclic prefix having a burst length N. In such cases, it is typical to assume that the cyclic prefix is longer than any multipath delay spread between any transmit-receive pair of antenna elements.

An OFDM symbol stream or SC burst x(t) generated at the first transceiver 101 is expressed by $$x(t) = \sum_{k=0}^{N-1} s_k \delta(t - kT_c),$$

where $T_c$ is the sample (or chip) duration, and $s_k$ represents the complex data. The symbol stream is modulated by a beamforming vector $w_1 = [w_{1,1}, w_{1,2}, \ldots, w_{1,M_T}]^T$ prior to being transmitted into a communication channel. A MIMO channel may be expressed by frequency domain Channel State Information (CSI):

$$H_{1 \to 2}(n) \in \mathbb{C}^{M_T \times N_R}$$

at frequency bin number n, such as $$H_{1 \to 2}(n) = \begin{bmatrix} h_{1,1}^{1 \to 2}(n) & h_{1,2}^{1 \to 2}(n) & \ldots & h_{1,N_R}^{1 \to 2}(n) \\ h_{2,1}^{1 \to 2}(n) & h_{2,2}^{1 \to 2}(n) & \ldots & h_{2,N_R}^{1 \to 2}(n) \\ \vdots & \vdots & \ddots & \vdots \\ h_{M_T,1}^{1 \to 2}(n) & h_{M_T,2}^{1 \to 2}(n) & \ldots & h_{M_T,N_R}^{1 \to 2}(n) \end{bmatrix},$$

where the terms $h_{i,j}(n)$ include both transmit and receive filtering, along with the channel response between the first transceiver's $j^{th}$ transmit antenna and the second transceiver's $i^{th}$ receive antenna.

Signals received at the second transceiver are processed with a combining vector $c_2 = [c_{2,1}\ c_{2,2} \ldots c_{2,N_R}]^T$ to produce a combined baseband signal, $$y(t) = c_2^H [\Sigma s_k \delta(t - kT_c) \otimes H_{1 \to 2}(t) w_1 + b(t)],$$

where b(t) is the additive white Gaussian noise vector across the receive antennas of the second transceiver.

The discrete channel model between the first transceiver's transmitter and the second transceiver's receiver is expressed by a Single Input Single Output (SISO) channel, $$y_r = c_2^H \sum_{k=0}^{L-1} H_k s_{r-k} w_1 + c_2 b_i = \sum_{k=0}^{L-1} p_k s_{r-k} + b'_i$$

where $p_k = c_2^H H_k w_1$, and i denotes the sample (or chip) index within an OFDM sample (or single-carrier burst). The SISO channel has a frequency response at frequency bins n=0, 1, ..., N−1 given by $$P_n = c_2^H H_{1 \to 2}(n) w_1.$$

The discrete-frequency received signal model is:

$$Y_n = P_n S_n + B_n,$$

where $[S_0, S_1, \ldots, S_N]$ is the OFDM data symbol (or the FFT of the SC data burst), and $[B_0, B_1, \ldots, B_N]$ is the additive white Gaussian noise vector.

The channel model expressing the channel between the second transceiver's transmitter to first transceiver's receiver is given by $$Q_n = c_2^H H_{2 \to 1}(n) w_2$$

For frequency bins n=0, 1, ..., N−1. For both OFDM and SC, the Signal to Noise Ratio (SNR) on the $n^{th}$ subcarrier is given by $$SNR_n^{1 \to 2} = \frac{E_s |P_n|^2}{N_0} = \frac{E_s |c_2^H H_{1 \to 2}(n) w_1|^2}{N_0},$$

$$SNR_n^{2 \to 1} = \frac{E_s |Q_n|^2}{N_0} = \frac{E_s |c_1^H H_{2 \to 1}(n) w_2|^2}{N_0}$$

An effective SNR (ESNR) is defined as a mapping from the instantaneous subcarriers SNRs to an equivalent SNR that takes into account Forward Error Correction (FEC). There are many methods that can be used to compute the ESNR, including (by way of example, but without limitation) calculating the mean of the SNRs over the different subcarriers; employing a Quasi-Static Method (such as is commonly used in 3GPP2 and 1xEV-DV/DO communication systems); employing a Capacity effective SINR mapping (CESM), which is also used in 3GPP2 and 1xEV-DV/DO communication systems; using a CESM technique based on Convex Metric (which may be employed in 3GPP2 and 1xEV-DV/DO); and using an Exponential Effective SINR Mapping (EESM), which is also used in 3GPP2.

Different ESNR calculation methods may be used for SC and OFDM. For example, a Minimum Mean Square Error (MMSE) SC equalizer typically has an ESNR that can be approximated by the average of the SNRs over the different subcarriers. However, OFDM tends to have an ESNR that may be best approximated using the geometric mean of the SNRs over the different subcarriers. The various ESNR-calculation methods may be further configured to account for additional parameters, such as FEC, receiver imperfections, and/or bit-error rate (BER).

Embodiments of the invention may provide for one or more beamforming algorithms configured to select the beamforming vectors ($w_1$ and $w_2$) and the combining vectors ($c_1$ and $c_2$) that maximize at least one signal-quality parameter, such as the ESNR. In the general AAS case, the first transceiver 101 may transmit known information to the second transceiver 102, which then derives matrices characterizing the channel state information. This enables estimates of $w_1$ and $c_2$ to be calculated. The second transceiver 102 may transmit known information to the first transceiver 101 to provide channel state information that allows for estimates of $w_2$ and $c_1$ to be calculated. Some embodiments of the invention may employ known data symbols, pilot signals, or other training information to be transmitted for acquiring channel state information. Alternative embodiments may employ blind adaptive processing or other techniques utilizing unknown transmitted data to derive channel state information.

In AAS, both directions of the link are used to estimate the vectors $w_1$, $w_2$, $c_2$, and $c_1$. For SAS, the beamforming vectors $w_1$ and $w_2$ and the combining vectors $c_2$ and $c_1$ in a particular direction should be equal. Thus, $w_1 = w_2$ and $c_2 = c_1$, and only one direction of the link may be employed for calculating the vectors $w_1$, $w_2$, $c_2$, and $c_1$.

FIG. 2A illustrates a beamforming method between a first transceiver and a second transceiver in accordance with an embodiment of the invention. For example, one transceiver may be a piconet controller and the other transceiver may be a piconet subscriber device. A channel state information (CSI) acquisition step 201 enables the second transceiver to acquire a first CSI matrix, which is used to estimate the first transceiver's optimal (or preferred) beamforming vector $w_1$ and the second transceiver's optimal (or preferred) combining vector $c_2$. The CSI acquisition step may comprise configuring the first transceiver to transmit a subset of a beamforming codebook 211. Furthermore, the second transceiver may be configured to employ a subset of a combining codebook 212 to acquire the first CSI matrix.

An estimation step 202 comprises producing the optimal beamforming vector $w_1$ and the optimal combining vector $c_2$. It should be appreciated that the terms optimal beamforming vector and optimal combining vector denote estimates of optimal values, and the optimality of such estimates may be limited with respect to one or more processing constraints, including (but not limited to) loss of information due to quantization, simplifying assumptions that sacrifice some accuracy and/or precision in order to reduce computational complexity, and limited processing time, which may limit the number of iterative calculations. Other constraints may apply. For example, in some embodiments, a beamforming and/or combining vector resulting in a signal-quality metric above a predetermined threshold may be deemed as optimal relative to a subset of available vectors. Accordingly, the term "preferred beamforming vector" is equivalent to optimal beamforming vector, as used herein. Similarly, the term "preferred combining vector" is equivalent to optimal beamforming vector. The estimation 202 may employ any of various optimality criteria, such as EESM or mean SNR.

A feedback step 203 provides for sending the optimal beamforming vector $w_1$ (and, optionally, the optimal combining vector $c_2$) to the first transceiver 101. For an AAS system, steps 201 to 203 are repeated wherein the designations of "first transceiver" and "second transceiver" are swapped. Thus, an optimal beamforming vector $w_2$ and an optimal combining vector $c_1$ are estimated.

FIG. 2B illustrates a beamforming-tracking method in accordance with an embodiment of the invention. A tracking step 204 provides for tracking the beamforming and combining vectors. The tracking step 204 is similar to the acquisition step, except that the first transceiver transmits a subset of the beamforming codebook at a rate that is lower than the rate employed during acquisition 201. Similarly, lower-rate updates 205 are made to the optimal beamforming vector $w_1$ and the optimal combining vector $c_2$, and the values $w_1$ and $c_2$ are fed back 206 to the first transceiver 201. For an AAS system, steps 204 to 206 are repeated, wherein the designations of "first transceiver" and "second transceiver" are swapped. Thus, the estimates for the optimal beamforming vector $w_2$ and the optimal combining vector $c_1$ are updated.

For a uniformly spaced linear antenna array with N elements, the array factor is defined by $$A(\theta) = \sum_{n=1}^{N} w_n e^{j2\pi n(d/\lambda)\cos\theta},$$

where d is the spacing between array elements, θ denotes the angle from the axis of the linear array, λ is wavelength, and $w_1$ is the array element weight of the $n^{th}$ array element. The antenna array directivity is given by $$D = \frac{\max|A(\theta)|^2}{w^H K w} \text{ where } K_{n,m} = \frac{\sin[2\pi(d/\lambda)(n-m)]}{2\pi(d/\lambda)(n-m)} \; n,m = 0{:}N-1$$

The maximum possible directivity is $D_{Max}=N$.

The array factor of a two-dimensional array is given by $$A(\theta, \varphi) = \sum_{m=1}^{N_x} \sum_{n=1}^{N_y} w_{m,n} e^{j2\pi[m(d_x/\lambda)\sin\theta\cos\varphi + n(d_y/\lambda)\sin\theta\sin\varphi]},$$

where $d_x$ denotes array spacing along the x-axis, $d_y$ is the array spacing along the y-axis, $N_x$ is the number of elements along the x-axis, $N_y$ is the number of elements along the y-axis, and φ is the rotation angle from the x-axis. The antenna weights $w_{mn}$ may be expressed as $w_{mn}=w_{x,m}w_{y,n}$, where $m=0{:}N_x-1$, and $n=0{:}N_y-1$. Thus, an antenna weight matrix may be expressed by $W_{xy}=w_x w_y^T$.

The array factor of a two-dimensional array that is separable into one-dimensional (x-axis and y-axis) array components is expressed as $$A(\theta, \varphi) = A_x(\theta, \varphi) A_y(\theta, \varphi)$$

$$A_x(\theta, \varphi) = \sum_{n=1}^{N_x} w_{x,n} e^{j2\pi n(d_x/\lambda)\sin\theta\cos\varphi}$$

$$A_y(\theta, \varphi) = \sum_{n=1}^{N_y} w_{y,n} e^{j2\pi n(d_y/\lambda)\sin\theta\sin\varphi}$$

A 2-dimensional codebook $W_{xy} \in C^{N_x \times N_y}$ is expressed using a codebook for one-dimensional antenna arrays along the x-axis, $w_x \in C^{N_x \times 1}$, and a codebook for one-dimensional arrays along the y-axis, $w_y \in C^{N_y \times 1}$.

In one embodiment of the invention, antenna array weights may comprise 0° or 180° for each antenna element. This is referred to as a binary embodiment wherein the beamforming and/or combining weights are selected from $\{+1, -1\}$. Thus, each antenna element is configured to transmit or receive I+Q (phase 0°) or −(I+Q) (phase 180°) signals.

Figure 3A:
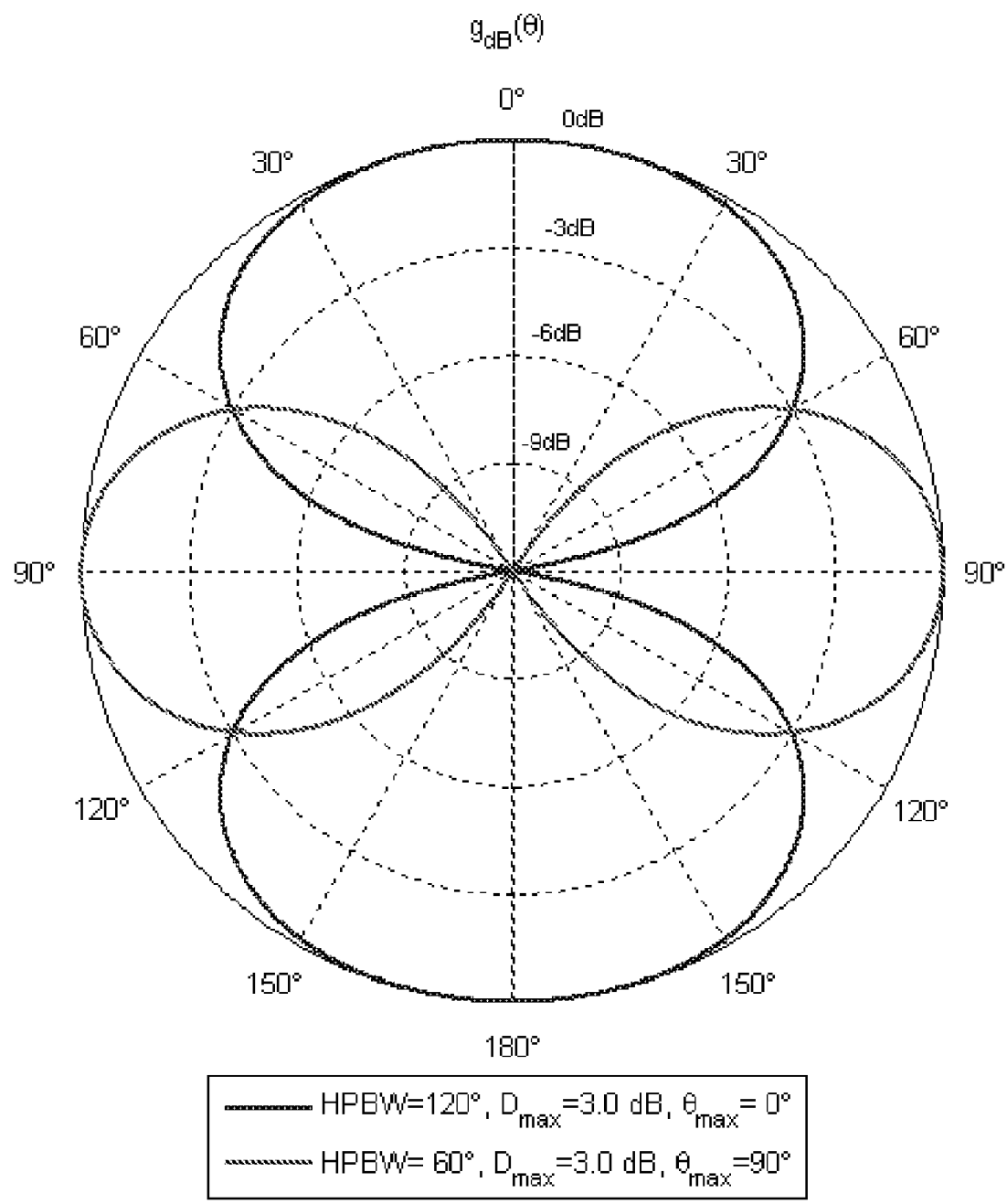
FIG. 3A shows a pair of orthogonal antenna array patterns for a two-element array with an element spacing of $\lambda/2$ and binary beamforming/combining weights.

FIG. 3A shows a pair of orthogonal antenna array patterns for a two-element array with an element spacing of λ/2 and binary beamforming/combining weights. The codebook for this case comprises the pair of orthogonal beamforming/combining vectors given by the columns of the following weight matrix W $$W = \begin{bmatrix} +1 & +1 \\ -1 & +1 \end{bmatrix}.$$

The first beam pattern has its maximum at 0°, and the second beam pattern is maximum at 90°.

Figure 3B:
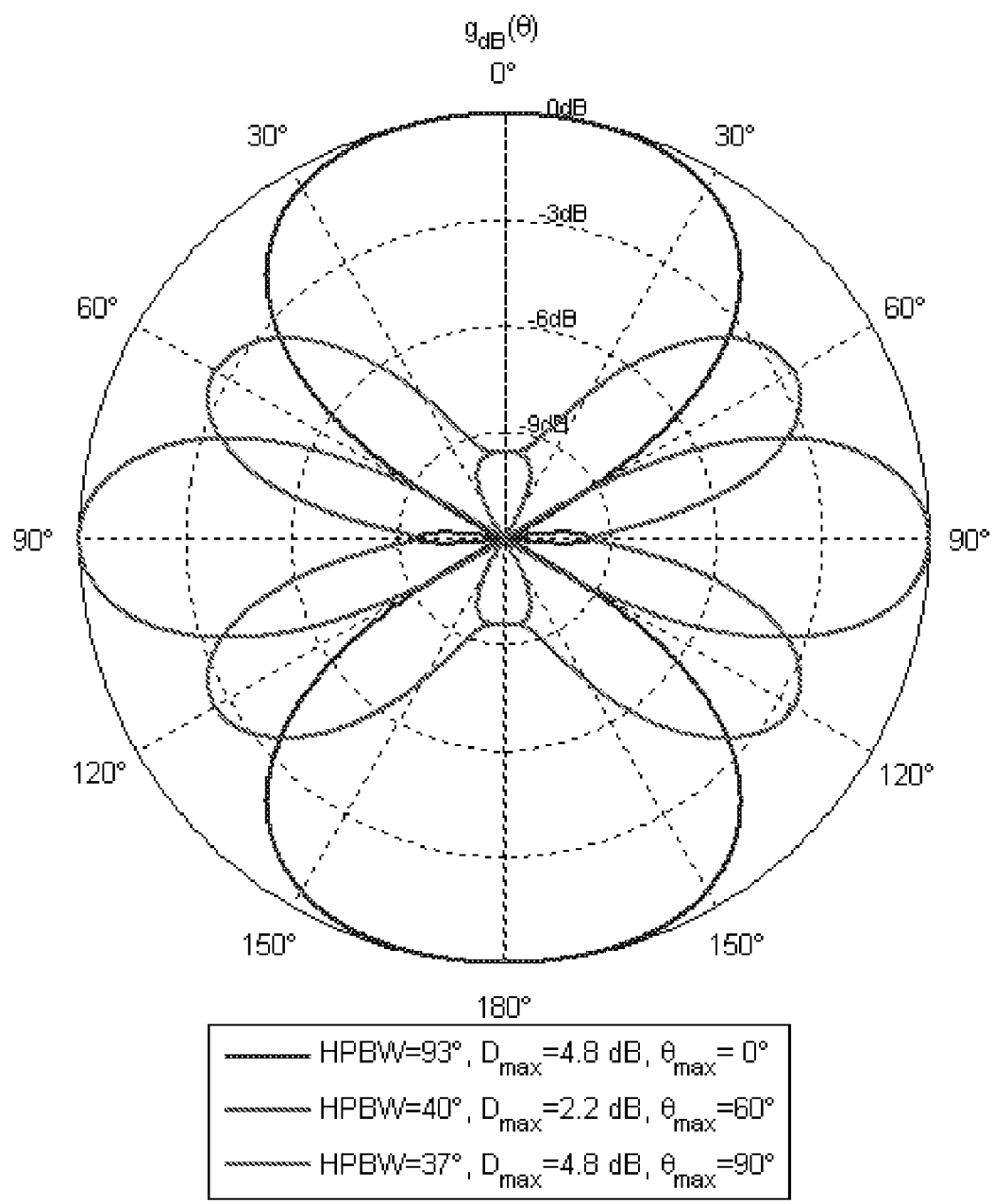
FIG. 3B shows antenna array patterns for a three-element linear array having an element spacing of $\lambda/2$ and binary beamforming/combining weights.

FIG. 3B shows antenna array patterns for a three-element linear array having an element spacing of λ/2 and binary beamforming/combining weights. The codebook comprises three beamforming/combining vectors given by the columns of the weight matrix $$W = \begin{bmatrix} +1 & +1 & +1 \\ -1 & +1 & +1 \\ +1 & -1 & +1 \end{bmatrix}.$$

In this case, the first beam pattern has its maximum at 0°, the second beam pattern is maximum at 60° and 120°, and the third pattern is maximum at 90°.

Figure 3C:
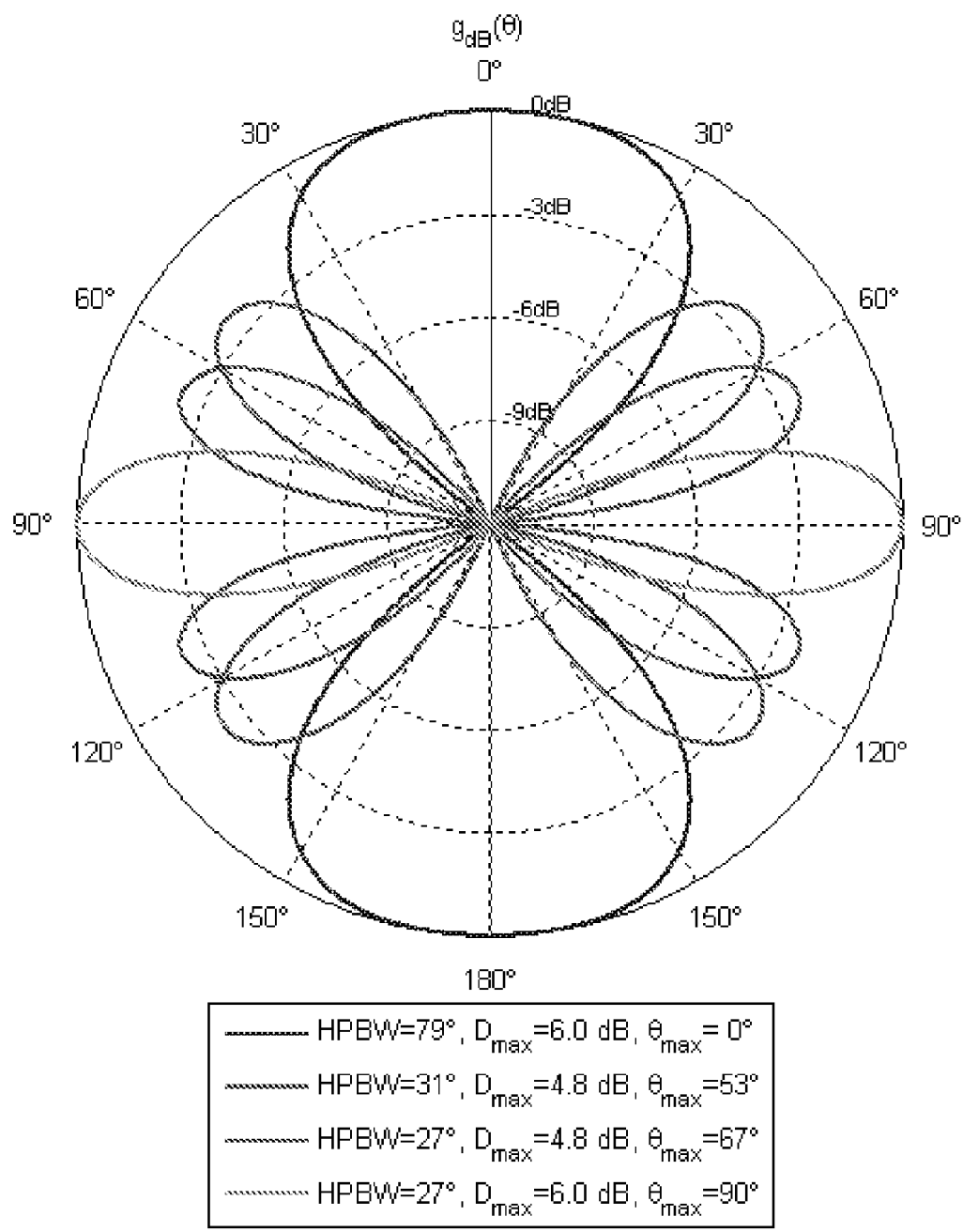
FIG. 3C shows a four orthogonal beam patterns generated by a four-element linear array with an element spacing of $\lambda/2$ and binary beamforming/combining weights.

In FIG. 3C, a four-element linear array with an element spacing of λ/2 and binary beamforming/combining weights produces four orthogonal beam patterns. These beam patterns are characterized by a codebook of vectors given by columns of the following weight matrix $$W = \begin{bmatrix} +1 & +1 & +1 & +1 \\ -1 & -1 & +1 & +1 \\ +1 & -1 & -1 & +1 \\ -1 & +1 & -1 & +1 \end{bmatrix}.$$

Figure 3D:
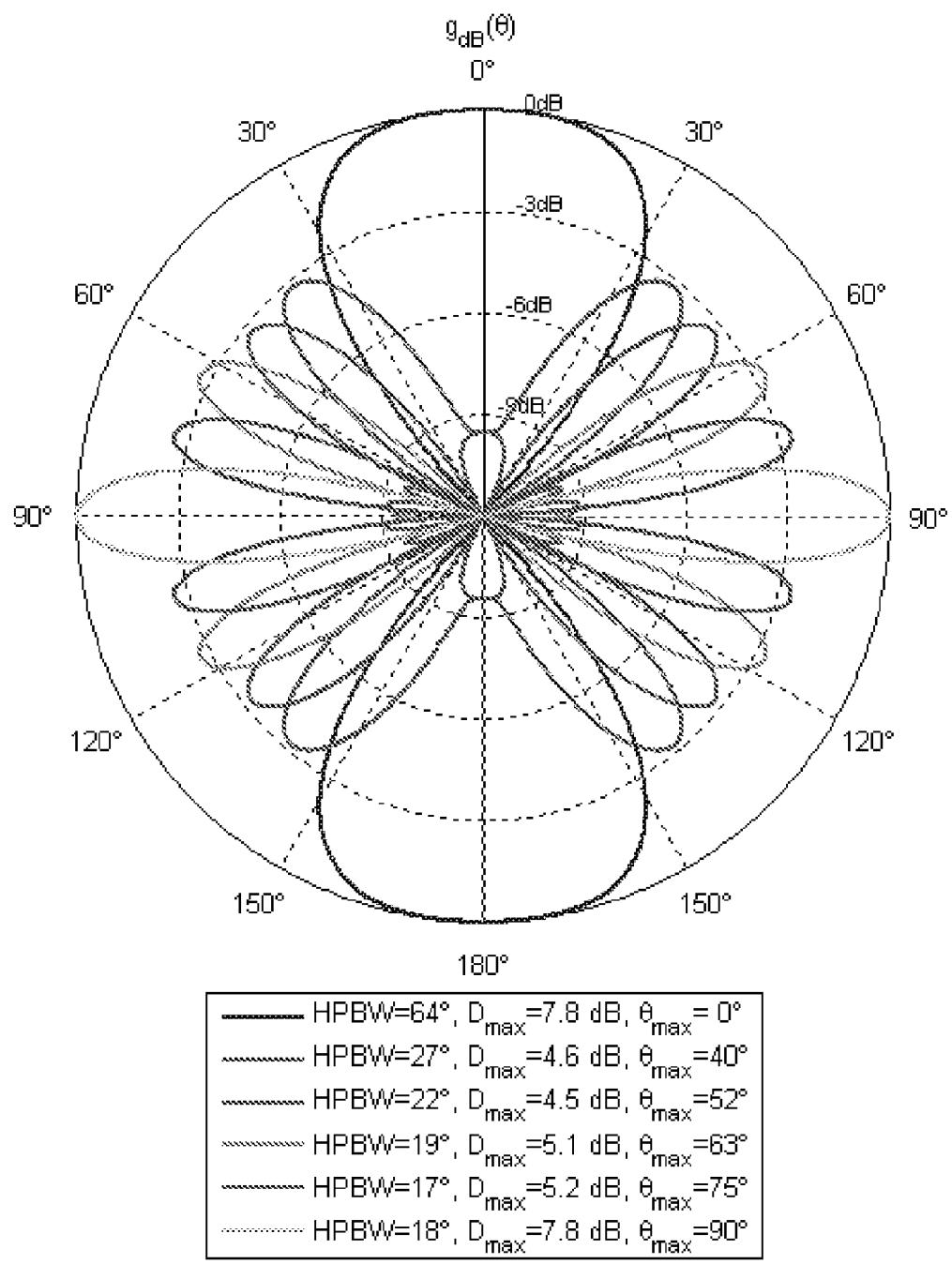
FIG. 3D shows five orthogonal beam patterns of a five-element linear array.

FIG. 3D shows five orthogonal beam patterns of a five-element linear array corresponding to orthogonal codebook vectors given by columns of the weight matrix $$W = \begin{bmatrix} +1 & +1 & +1 & +1 & +1 \\ -1 & -1 & -1 & +1 & +1 \\ +1 & +1 & -1 & -1 & +1 \\ -1 & +1 & +1 & -1 & +1 \\ +1 & -1 & +1 & -1 & +1 \end{bmatrix}.$$

Figure 3E:
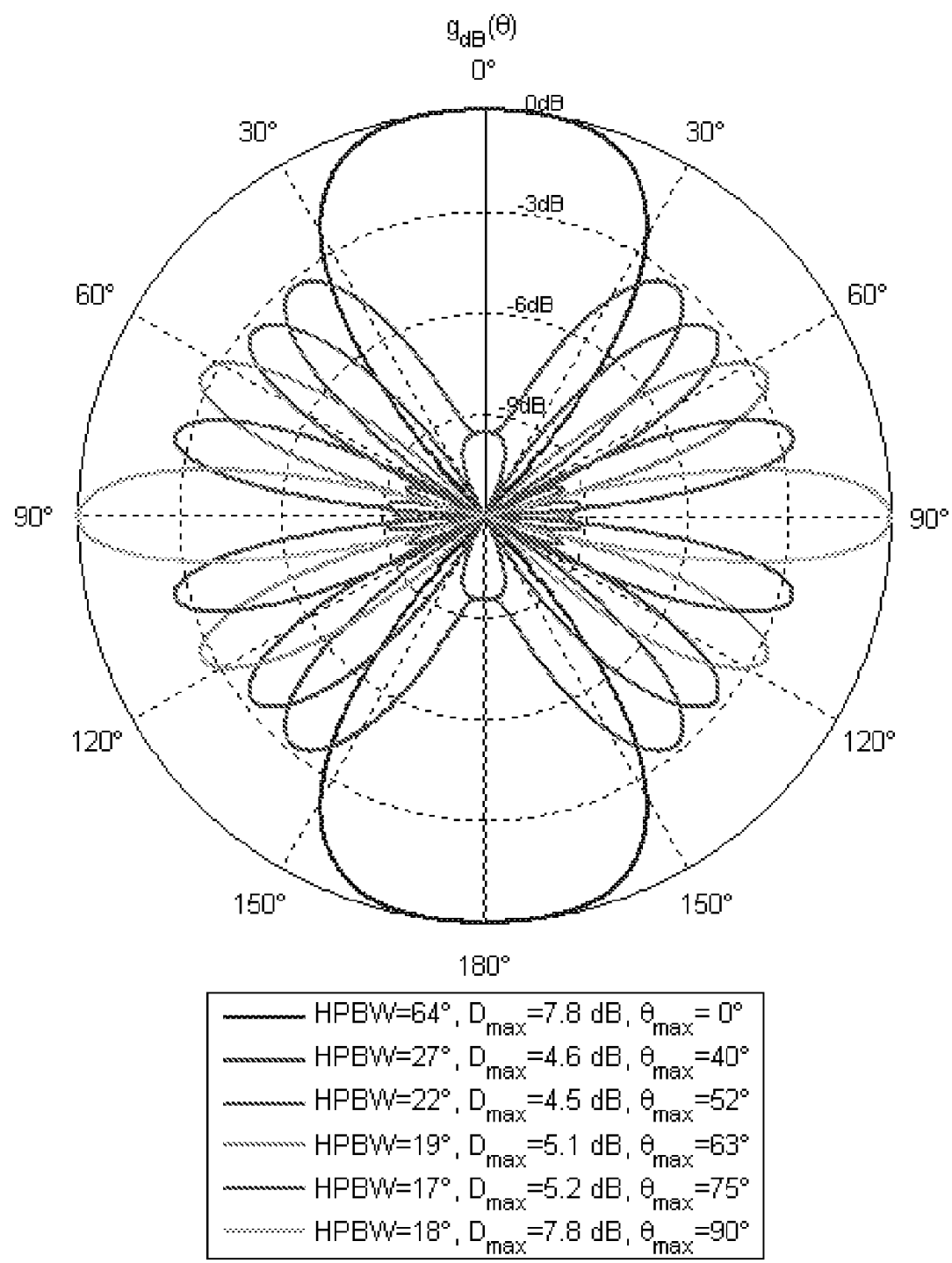
FIG. 3E shows beam patterns of a six-element linear array with $\lambda/2$ element spacing.

FIG. 3E shows beam patterns of a six-element linear array with λ/2 element spacing. Orthogonal codebook vectors are given by columns of the following weight matrix $$W = \begin{bmatrix} +1 & +1 & +1 & +1 & +1 & +1 \\ -1 & -1 & +1 & +1 & +1 & +1 \\ +1 & -1 & -1 & -1 & +1 & +1 \\ -1 & +1 & +1 & -1 & -1 & +1 \\ +1 & -1 & +1 & +1 & -1 & +1 \\ -1 & +1 & -1 & +1 & -1 & +1 \end{bmatrix}.$$

In an alternative embodiment, the following weight matrix may be employed $$W = \begin{bmatrix} +1 & +1 & +1 & +1 & +1 & +1 \\ -1 & -1 & -1 & +1 & +1 & +1 \\ +1 & +1 & -1 & -1 & +1 & +1 \\ -1 & +1 & +1 & -1 & -1 & +1 \\ +1 & -1 & +1 & +1 & -1 & +1 \\ -1 & +1 & -1 & +1 & -1 & +1 \end{bmatrix}.$$

Figure 3F:
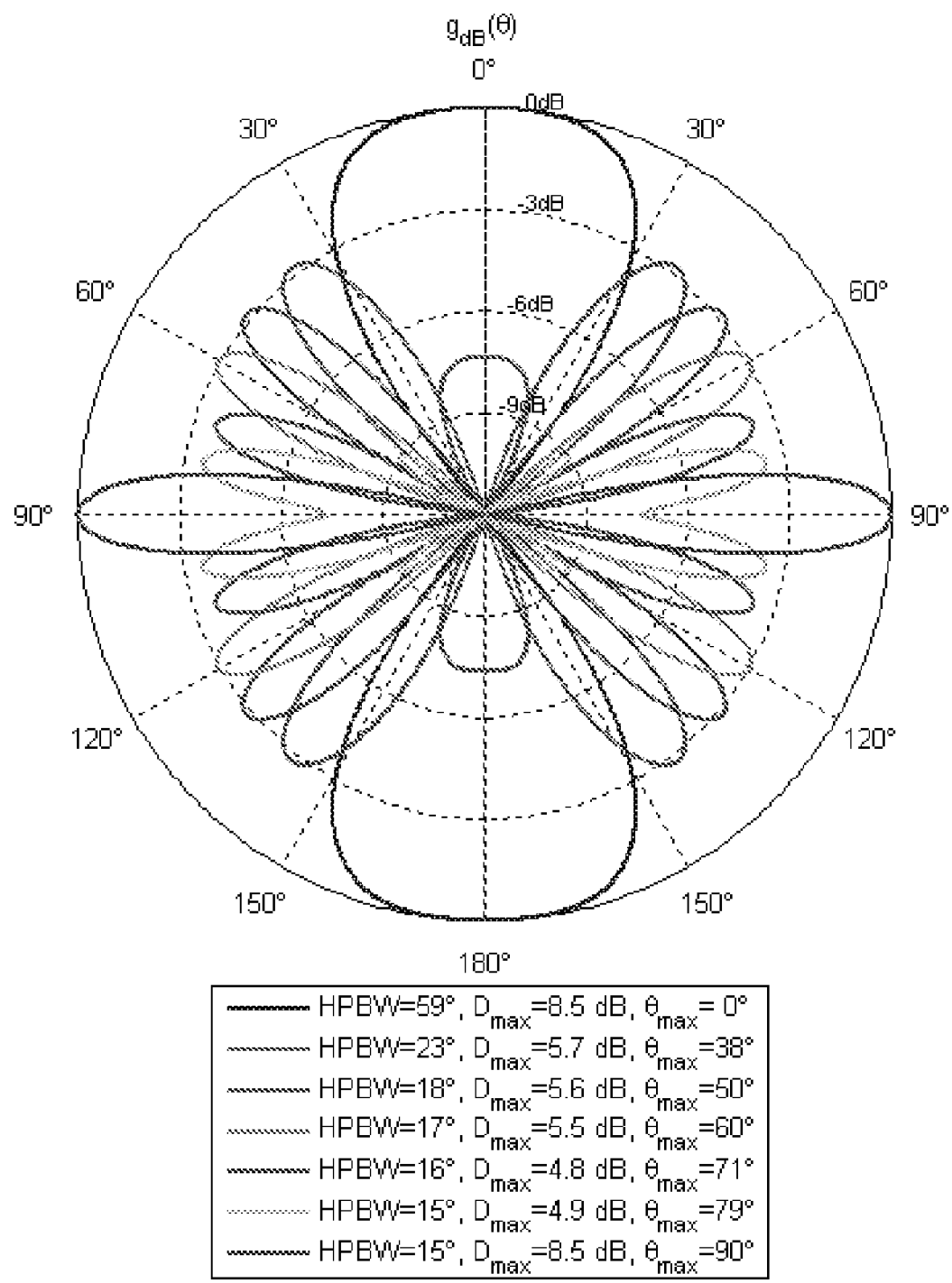
FIG. 3F shows orthogonal beam patterns of a seven-element linear array with $\lambda/2$-spacing.

FIG. 3F shows orthogonal beam patterns of a seven-element linear array with $\lambda/2$-spacing. The beam patterns correspond to codebook vectors given by columns of the weight matrix $$W = \begin{bmatrix} +1 & +1 & +1 & +1 & +1 & +1 & +1 \\ -1 & -1 & -1 & -1 & -1 & +1 & +1 \\ +1 & +1 & -1 & -1 & -1 & -1 & +1 \\ -1 & +1 & +1 & +1 & -1 & -1 & +1 \\ +1 & -1 & -1 & +1 & +1 & -1 & +1 \\ -1 & +1 & -1 & -1 & +1 & -1 & +1 \\ +1 & -1 & +1 & -1 & +1 & -1 & +1 \end{bmatrix}.$$

Figure 3G:
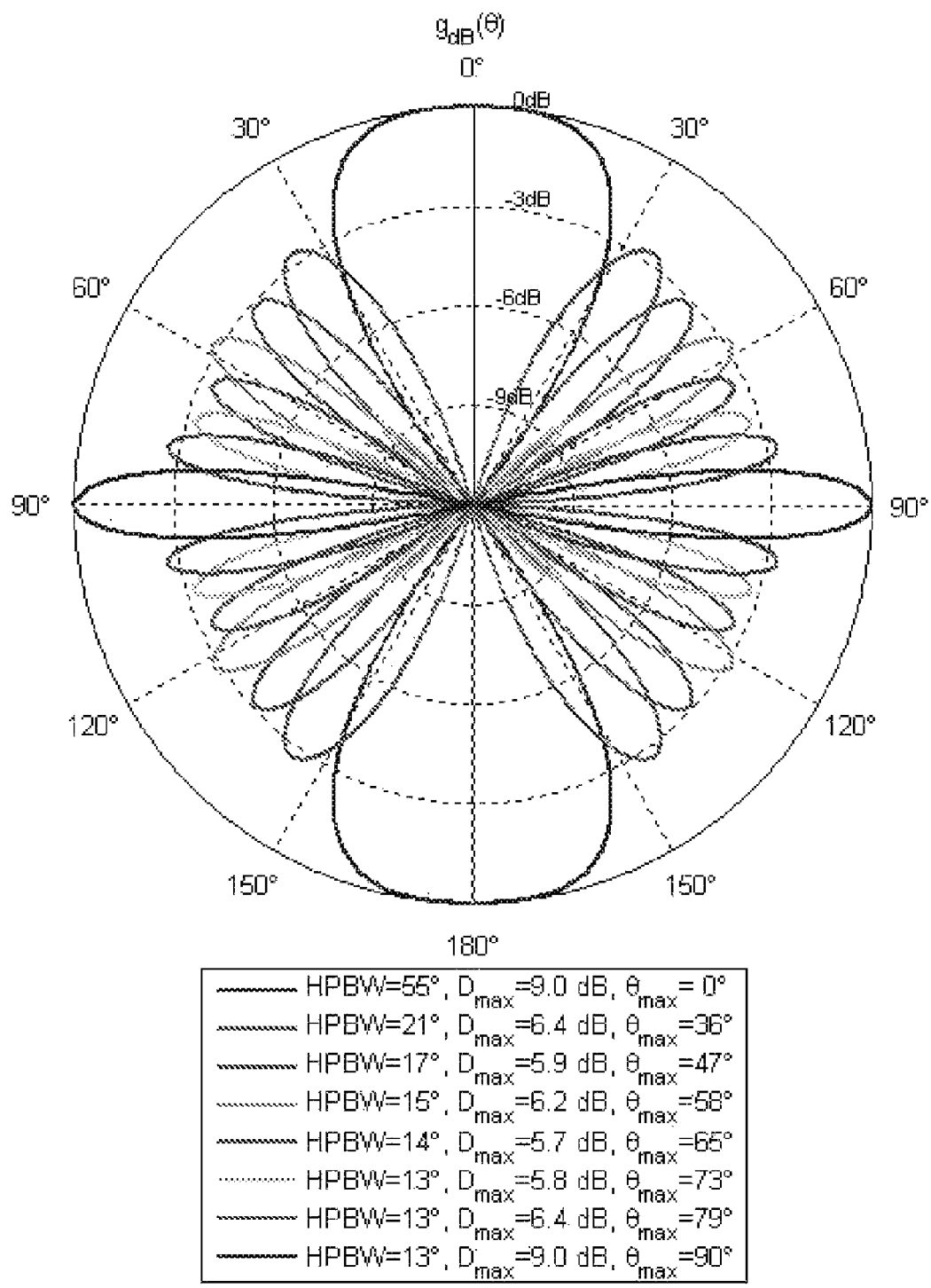
FIG. 3G shows the eight orthogonal beam patterns of an eight-element linear array with $\lambda/2$-spacing.

FIG. 3G shows the eight orthogonal beam patterns of an eight-element linear array with $\lambda/2$-spacing. The beam patterns correspond to codebook vectors given by columns of the following weight matrix $$W = \begin{bmatrix} +1 & +1 & +1 & +1 & +1 & +1 & +1 & +1 \\ -1 & -1 & -1 & -1 & -1 & +1 & +1 & +1 \\ +1 & +1 & -1 & -1 & -1 & -1 & +1 & +1 \\ -1 & -1 & +1 & +1 & -1 & -1 & +1 & +1 \\ +1 & -1 & -1 & +1 & +1 & -1 & -1 & +1 \\ -1 & +1 & -1 & -1 & +1 & -1 & -1 & +1 \\ +1 & -1 & +1 & -1 & -1 & +1 & -1 & +1 \\ -1 & +1 & -1 & +1 & -1 & +1 & -1 & +1 \end{bmatrix}.$$

In some embodiments of the invention, antenna array weights may comprise phases from the set of 0°, 90°, 180°, and 270°. Thus, quadrature weights are selected from {+1, −1, +j, −j}. An embodiment of the invention may provide for transmitting and/or receiving signals characterized by I (0°), −I (180°), Q (270°), and −Q (90°). An equivalent set of signals comprises I+Q, I−Q, −I+Q, and −I−Q.

Figure 4A:
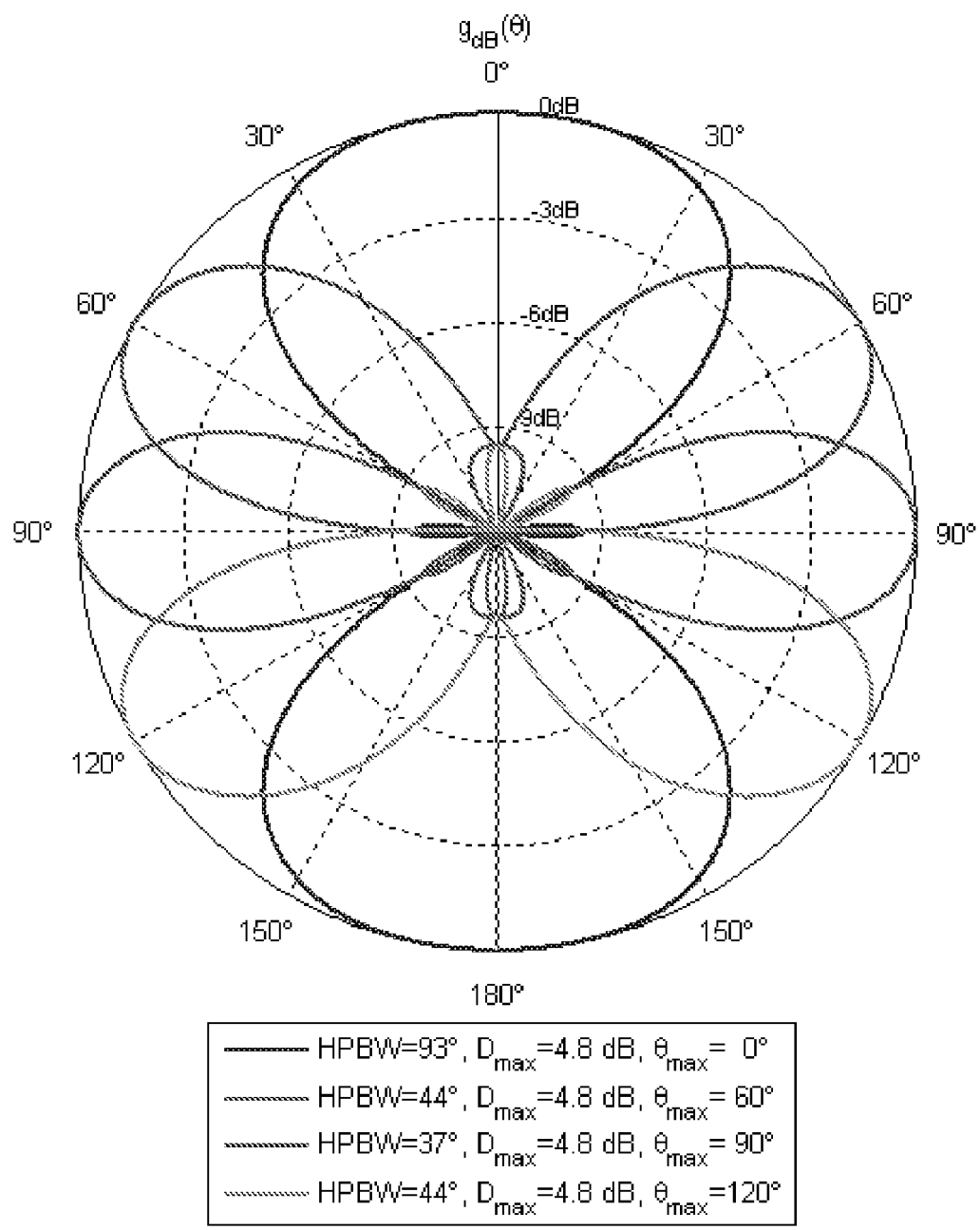
FIG. 4A shows four antenna array patterns for a two-element array with an element spacing of $\lambda/2$ and quadrature beamforming/combining weights.

FIG. 4A shows four antenna array patterns for a two-element array with an element spacing of $\lambda/2$ and quadrature beamforming/combining weights. The codebook for this case comprises the set of vectors given by the columns of the following weight matrix W $$W = \begin{bmatrix} +1 & +1 & +1 & +1 \\ -1 & -j & +1 & +j \end{bmatrix}.$$

In this case, $WW^H = 4I$.

Figure 4B:
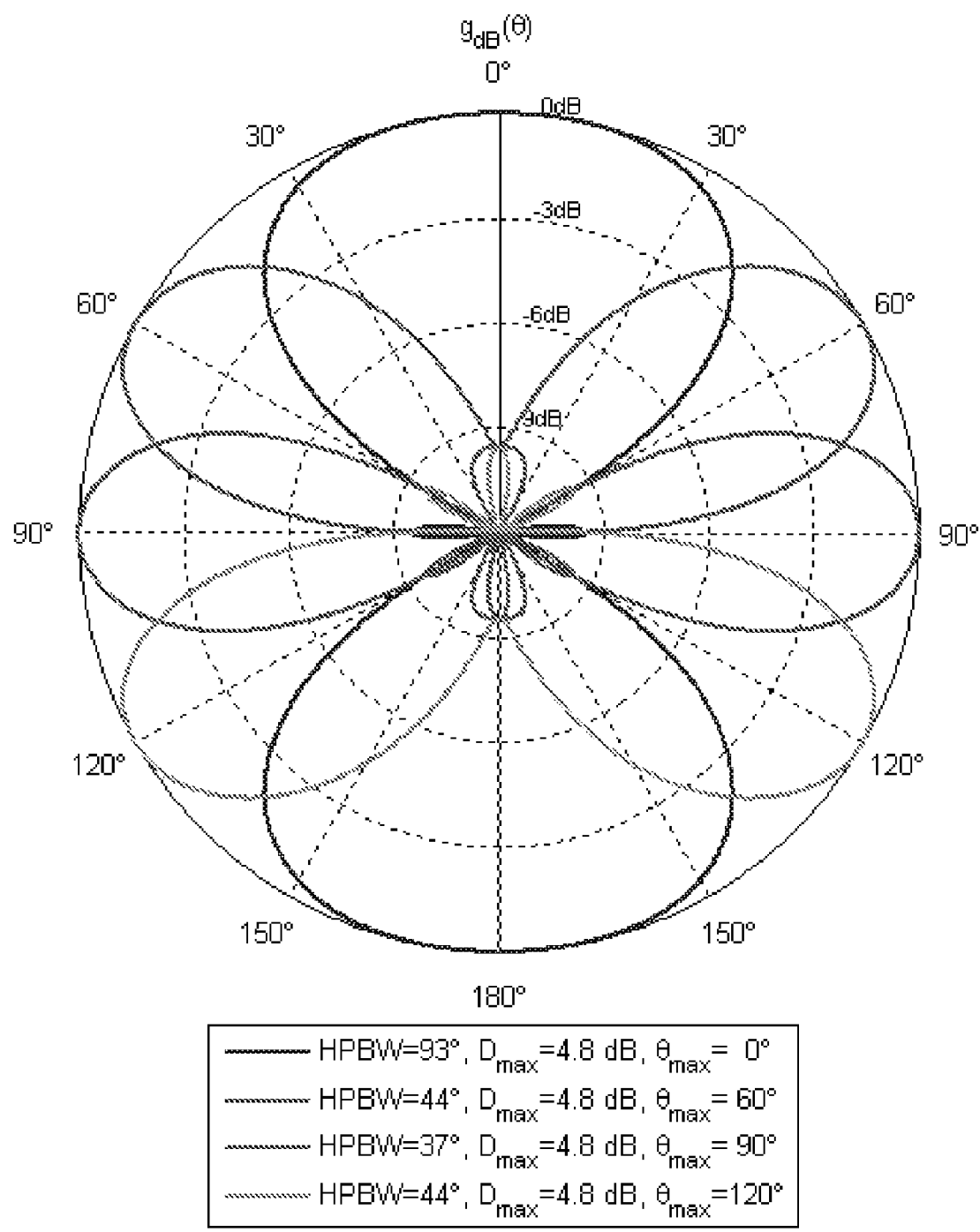
FIG. 4B shows four antenna array patterns for a three-element array employing an element spacing of $\lambda/2$ and quadrature beamforming/combining weights.

FIG. 4B shows four antenna array patterns for a three-element array employing an element spacing of $\lambda/2$ and quadrature beamforming/combining weights. The codebook comprises the set of vectors given by the columns of the following weight matrix $$W = \begin{bmatrix} +1 & +1 & +1 & +1 \\ -1 & -j & +1 & +j \\ +1 & -1 & +1 & -1 \end{bmatrix}.$$

In this case, $WW^H = 4I$ as well.

Figure 4C:
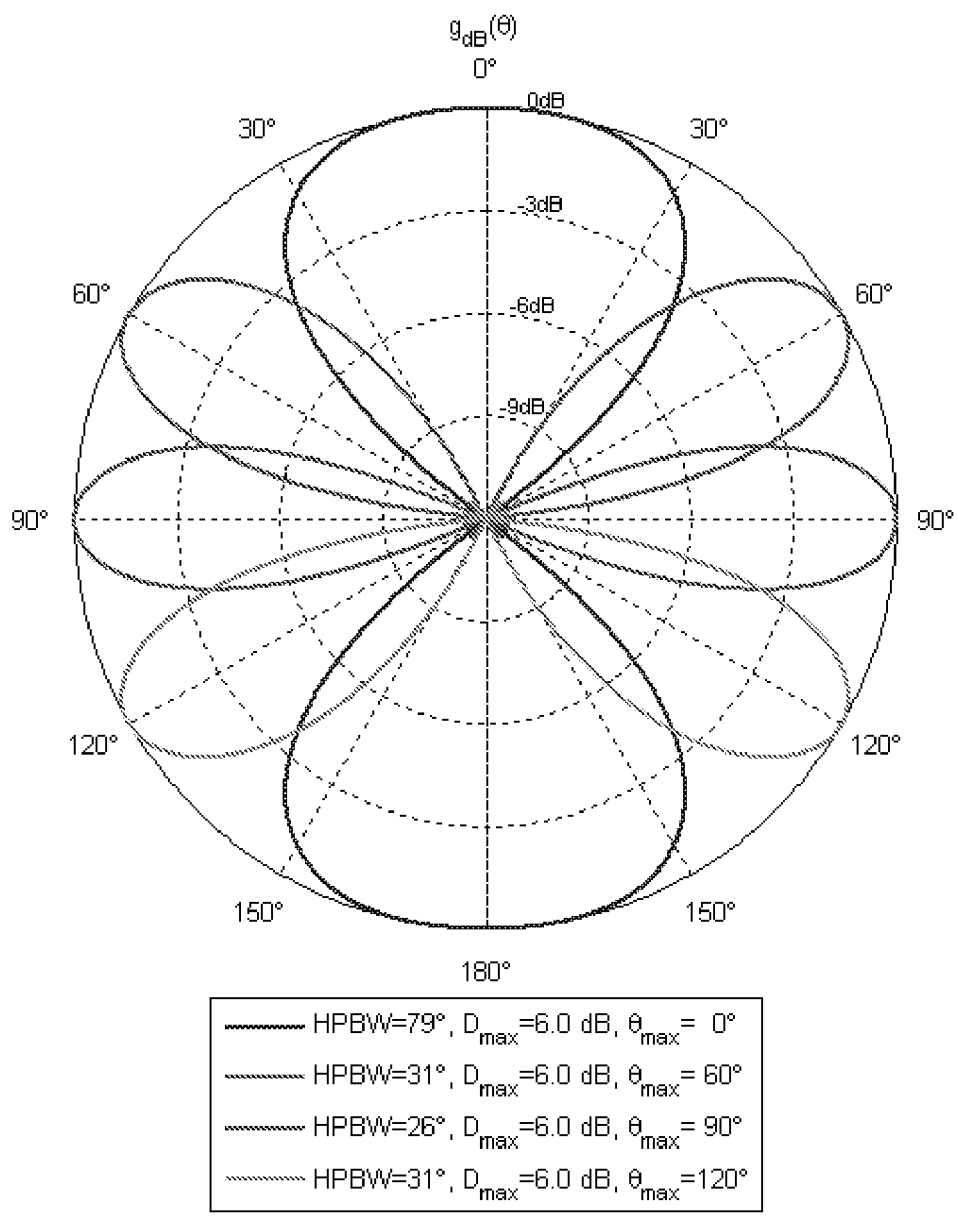
FIG. 4C shows four orthogonal antenna array patterns for a four-element array employing an element spacing of $\lambda/2$ and quadrature beamforming/combining weights.

FIG. 4C shows four orthogonal antenna array patterns for a four-element array employing an element spacing of $\lambda/2$ and quadrature beamforming/combining weights. The codebook comprises the set of four orthogonal vectors given by the columns of the following weight matrix $$W = \begin{bmatrix} +1 & +1 & +1 & +1 \\ -1 & -j & +1 & +j \\ +1 & -1 & +1 & -1 \\ -1 & +j & +1 & -j \end{bmatrix}.$$

Figure 4D:
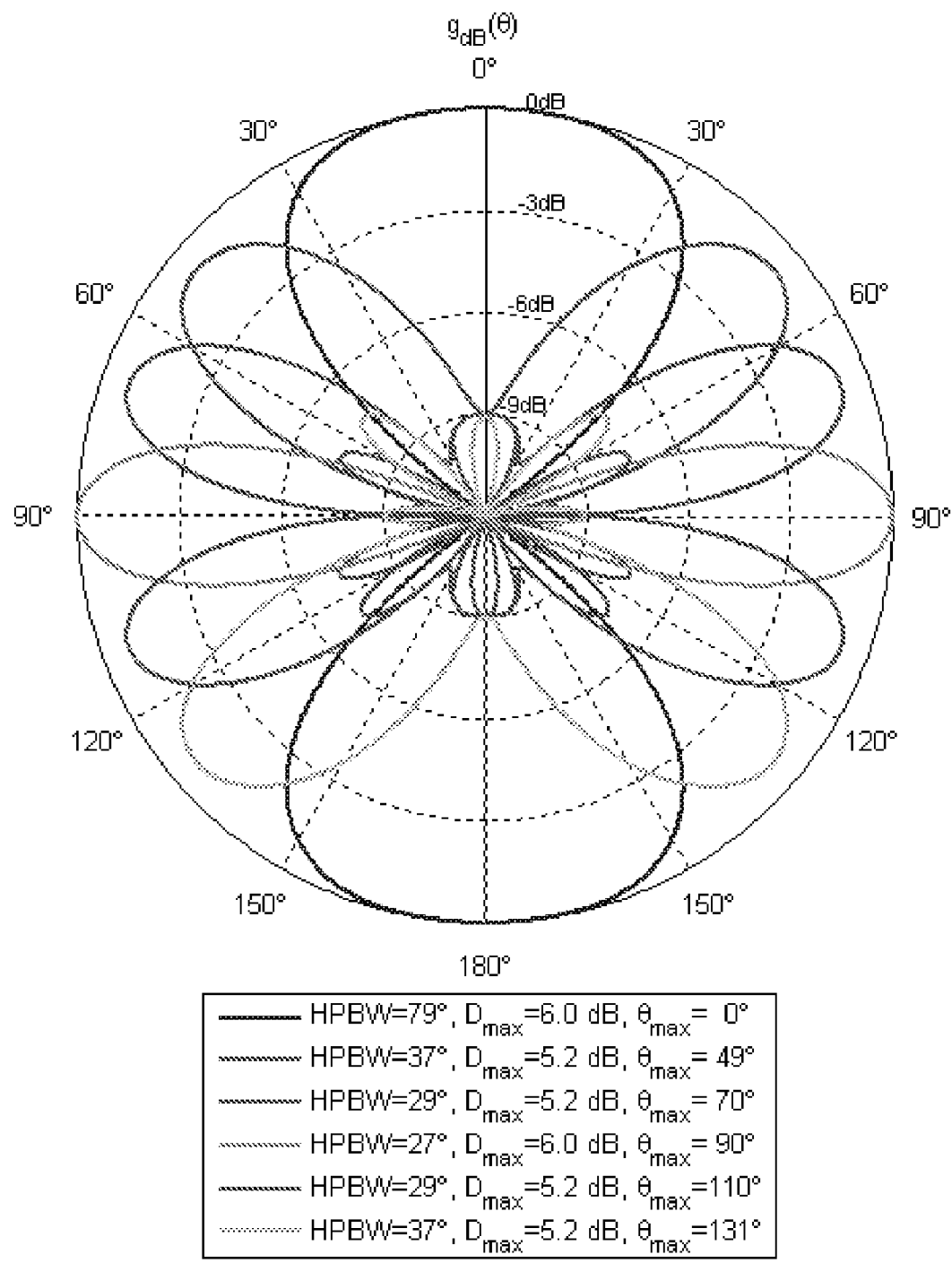
FIG. 4D shows beam patterns corresponding to an alternative codebook for a four-element array employing quadrature weights and an element spacing of $\lambda/2$.

FIG. 4D shows beam patterns corresponding to an alternative codebook for a four-element array employing quadrature weights and an element spacing of $\lambda/2$. Six beam-forming/combining vectors are given by columns of the weight matrix $$W = \begin{bmatrix} +1 & +1 & +1 & +1 & +1 & +1 \\ -1 & -j & +1 & +1 & +j & -1 \\ +1 & -1 & -j & +1 & -1 & -j \\ -1 & +1 & -1 & +1 & -1 & +1 \end{bmatrix}.$$

Figure 4E:
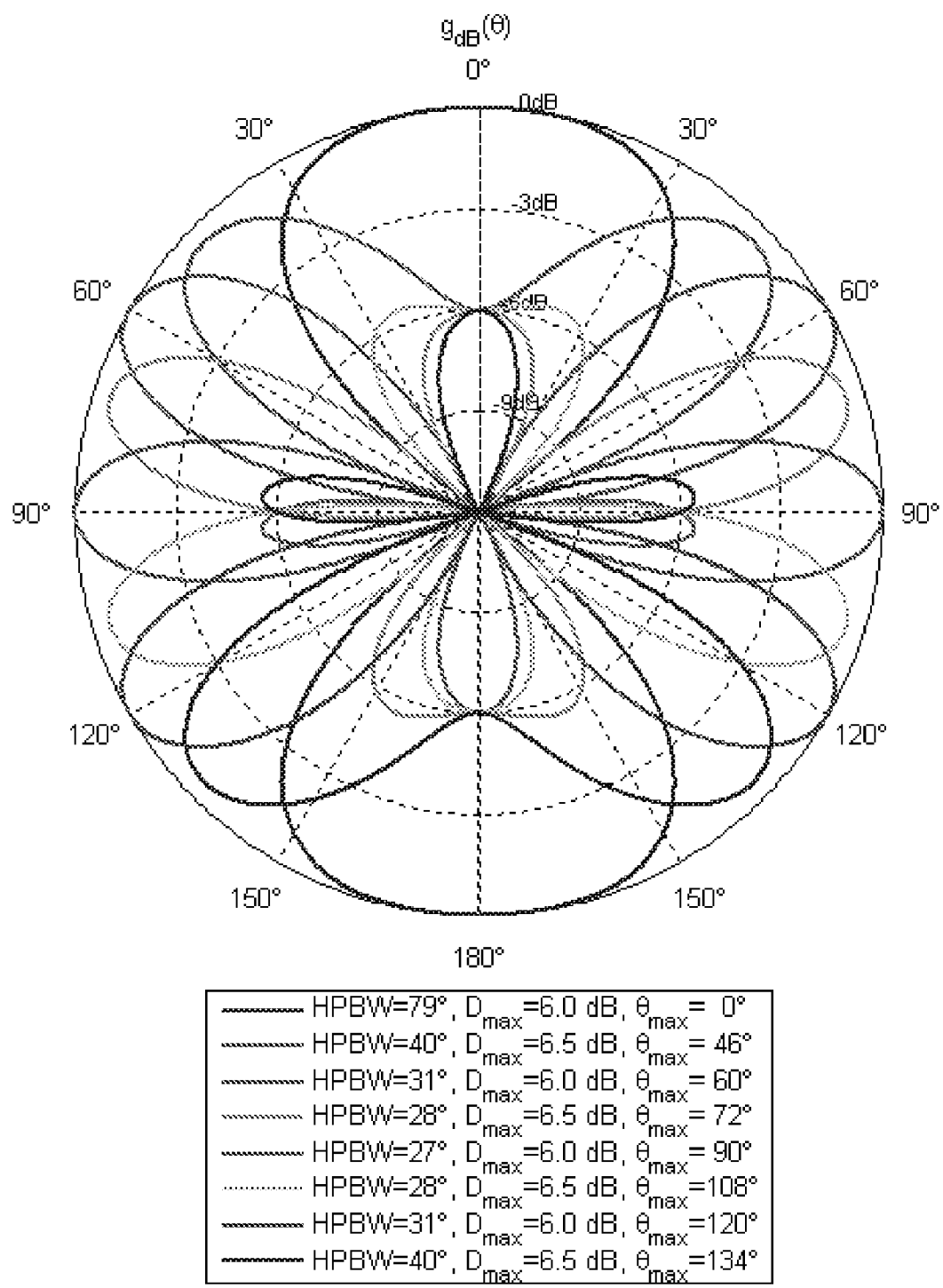
FIG. 4E shows beam patterns corresponding to an extended codebook for a four-element array.

Beam patterns corresponding to an extended codebook for a four-element array are shown in FIG. 4E. The array comprises elements with $\lambda/2$-spaced and quadrature beamforming/combining weights. The codebook comprises the set of eight vectors given by the columns of the following weight matrix $$W = \begin{bmatrix} +1 & +1 & +1 & +1 & +1 & +1 & +1 & +1 \\ -1 & -j & -j & -j & +1 & +j & +j & +j \\ +1 & +j & -1 & -j & +1 & +j & -1 & -j \\ -1 & +1 & +j & -1 & +1 & -1 & -j & +1 \end{bmatrix}.$$

Figure 4F:
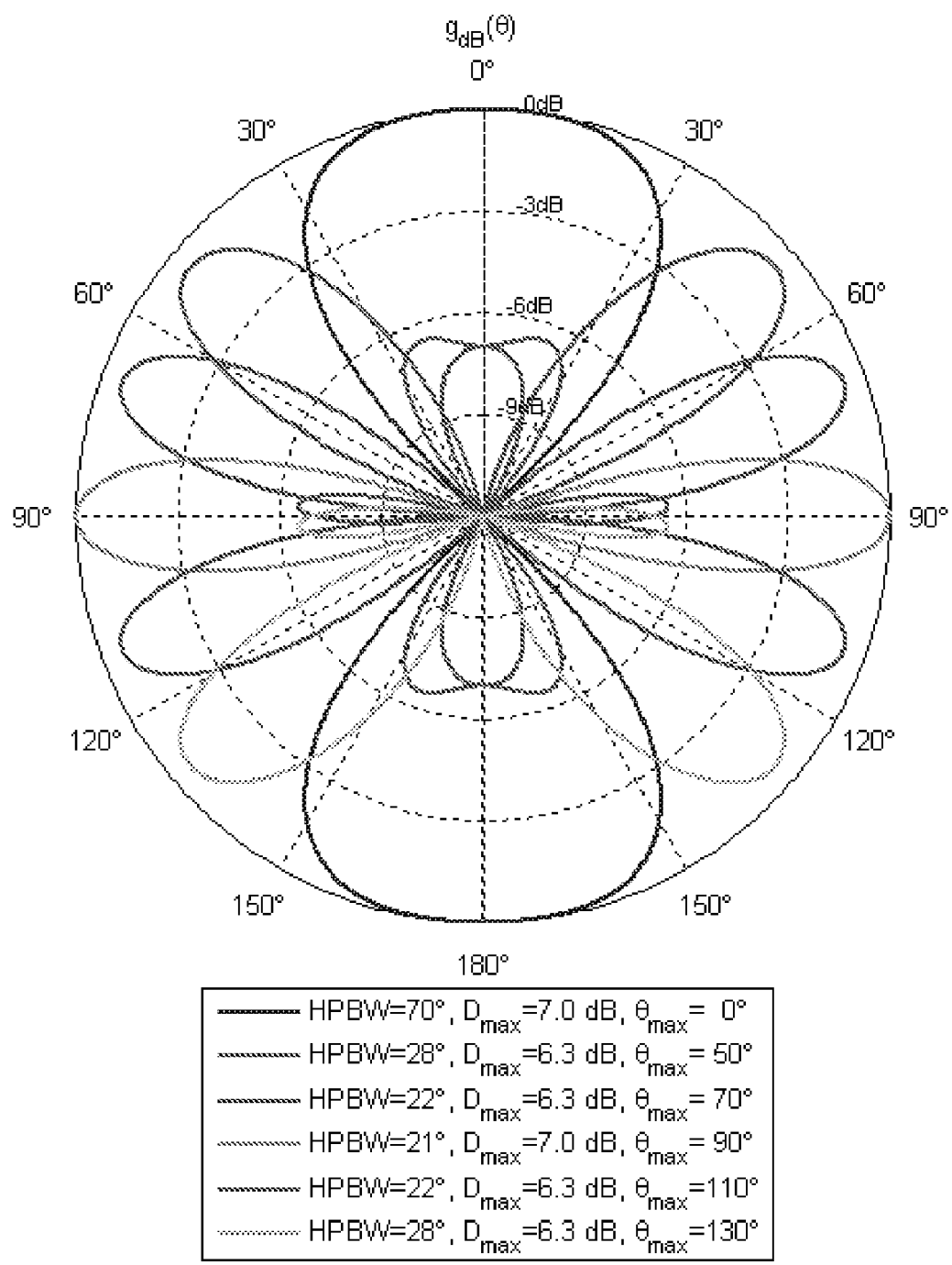
FIG. 4F shows six antenna array patterns for a five-element array employing an element spacing of $\lambda/2$ and quadrature beamforming/combining weights.

FIG. 4F shows six antenna array patterns for a five-element array employing an element spacing of $\lambda/2$ and quadrature beamforming/combining weights. The codebook comprises the set of vectors given by the columns of the following weight matrix $$W = \begin{bmatrix} +1 & +1 & +1 & +1 & +1 & +1 \\ -1 & -j & -j & +1 & +j & +j \\ +1 & +j & -j & +1 & -1 & -1 \\ -1 & +1 & -1 & +1 & -1 & +1 \\ +1 & -j & +j & +1 & -j & +j \end{bmatrix}.$$

Figure 4G:
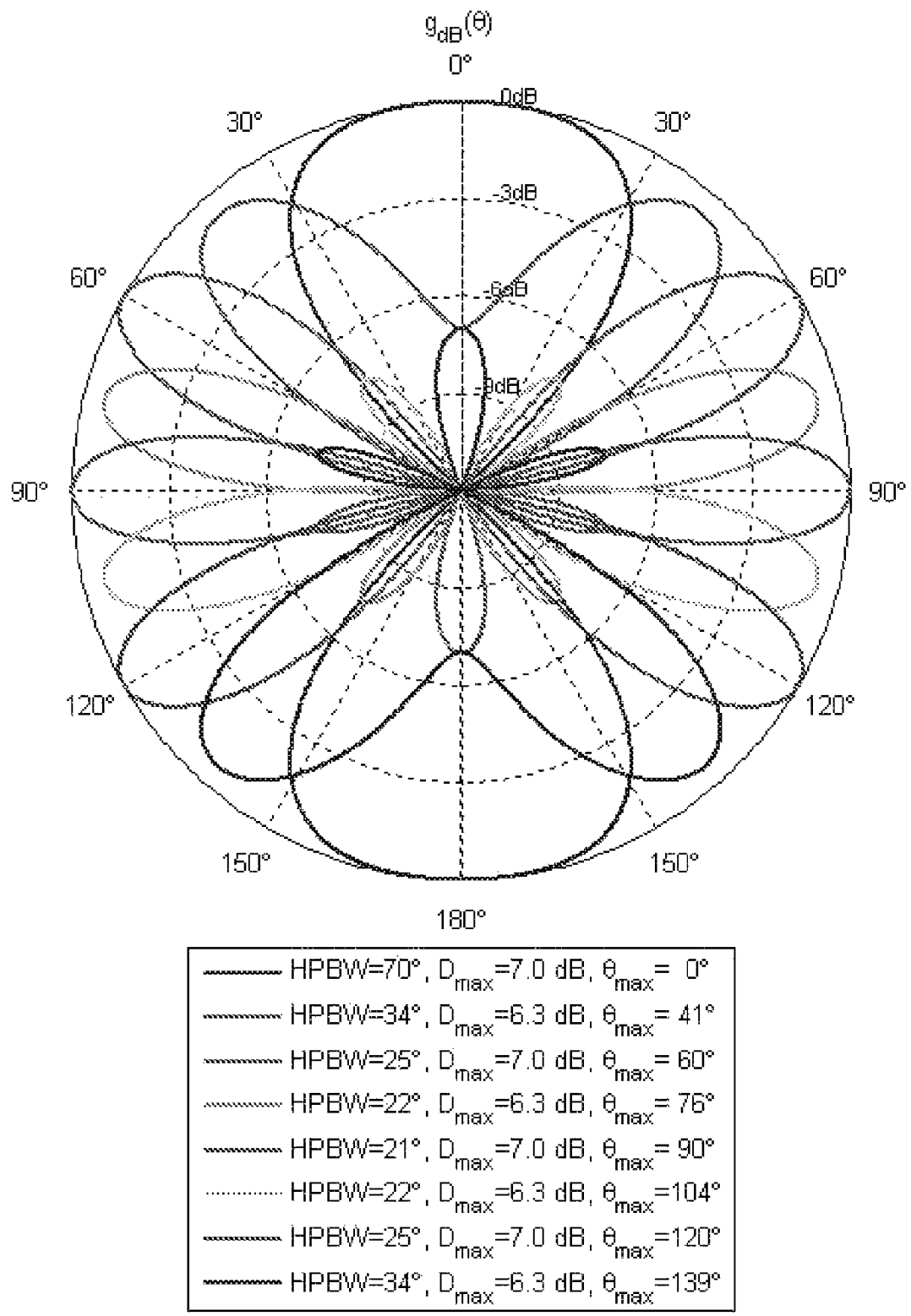
FIG. 4G shows eight antenna array patterns may be produced by a five-element array employing an element spacing of $\lambda/2$ and quadrature beamforming/combining weights.

In FIG. 4G, eight antenna array patterns may be produced by a five-element array employing an element spacing of $\lambda/2$ and quadrature beamforming/combining weights according to a codebook of vectors represented by columns of the following weight matrix $$W = \begin{bmatrix} +1 & +1 & +1 & +1 & +1 & +1 & +1 & +1 \\ -1 & -j & -j & -j & +1 & +j & +j & +j \\ +1 & +j & -1 & -j & +1 & +j & -1 & -j \\ -1 & +1 & +j & -1 & +1 & -1 & -j & +1 \\ +1 & -1 & +1 & -1 & +1 & -1 & +1 & -1 \end{bmatrix}.$$

Figure 4H:
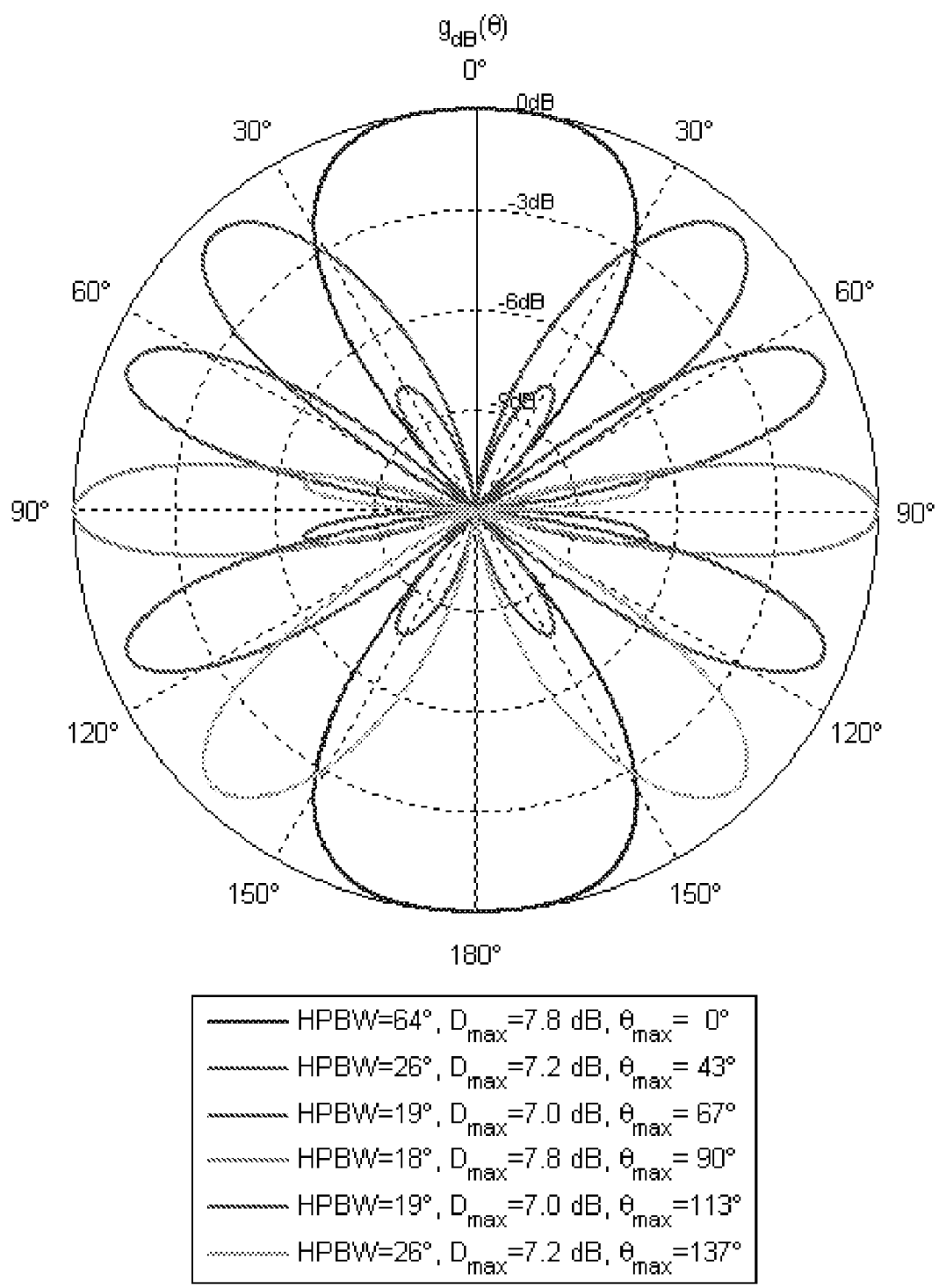
FIG. 4H shows six non-orthogonal antenna array patterns for a six-element array employing an element spacing of $\lambda/2$ and quadrature beamforming/combining weights.

FIG. 4H shows six non-orthogonal antenna array patterns for a six-element array employing an element spacing of $\lambda/2$ and quadrature beamforming/combining weights. The codebook comprises the set of six vectors given by the columns of the following weight matrix $$W = \begin{bmatrix} +1 & +1 & +1 & +1 & +1 & +1 \\ -1 & -j & -j & +1 & +j & +j \\ +1 & +j & -j & +1 & +j & -j \\ -1 & +1 & -1 & +1 & -1 & +1 \\ +1 & -1 & +j & +1 & -j & -1 \\ -1 & +j & +1 & +1 & +1 & -j \end{bmatrix}.$$

Figure 4I:
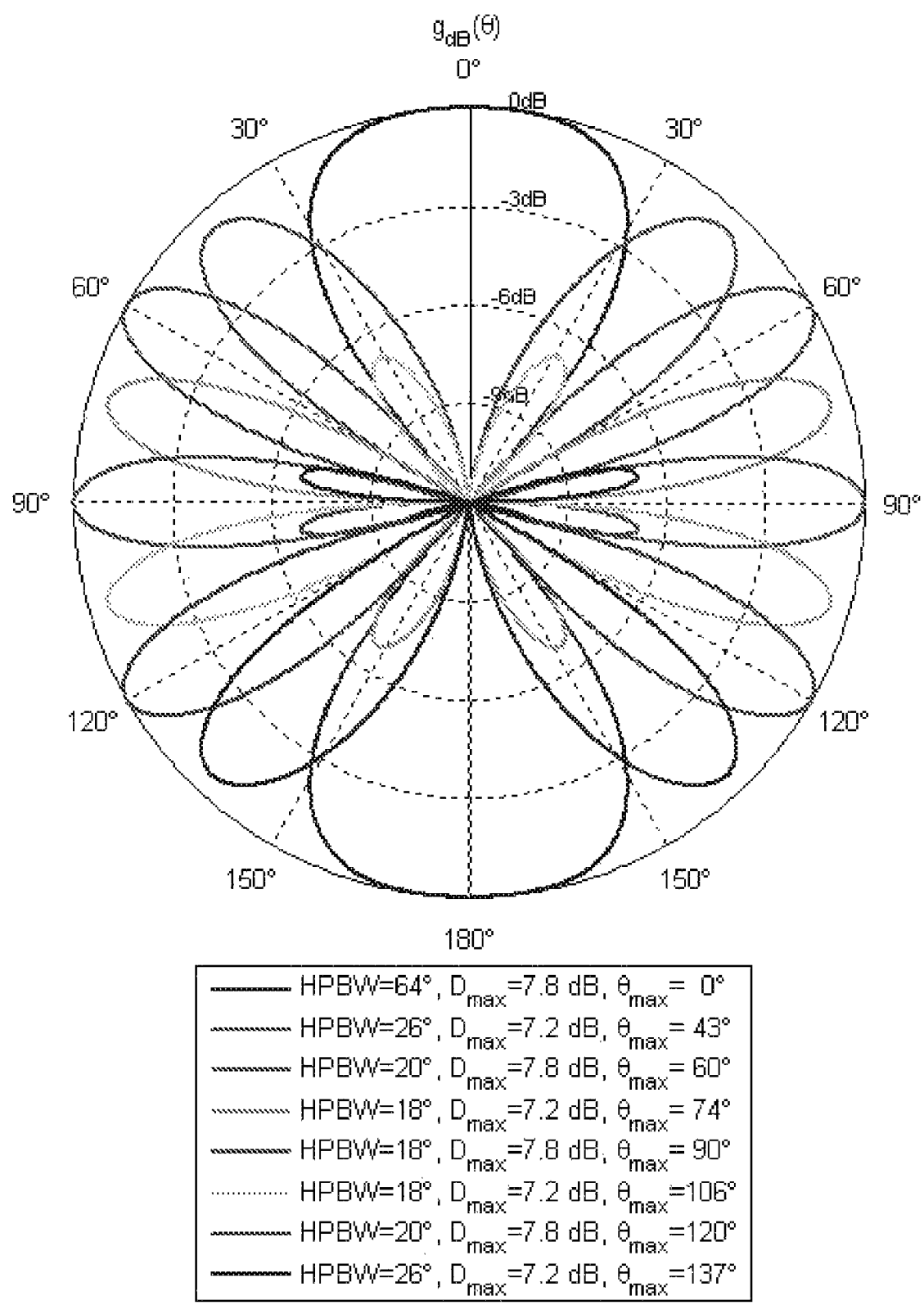
FIG. 4I shows eight antenna array patterns for a six-element array employing an element spacing of $\lambda/2$ and quadrature beamforming/combining weights.

FIG. 4I shows eight antenna array patterns for a six-element array employing an element spacing of $\lambda/2$ and quadrature beamforming/combining weights. The codebook comprises the set of eight vectors given by the columns of the following weight matrix $$W = \begin{bmatrix} +1 & +1 & +1 & +1 & +1 & +1 & +1 & +1 \\ -1 & -j & -j & -j & +1 & +j & +j & +j \\ +1 & +j & -1 & -j & +1 & +j & -1 & -j \\ -1 & +1 & +j & -1 & +1 & -1 & -j & +1 \\ +1 & -1 & +1 & -1 & +1 & -1 & +1 & -1 \\ -1 & +j & -j & +j & +1 & -j & +j & -j \end{bmatrix},$$

wherein $WW^H = 8I$.

Figure 4J:
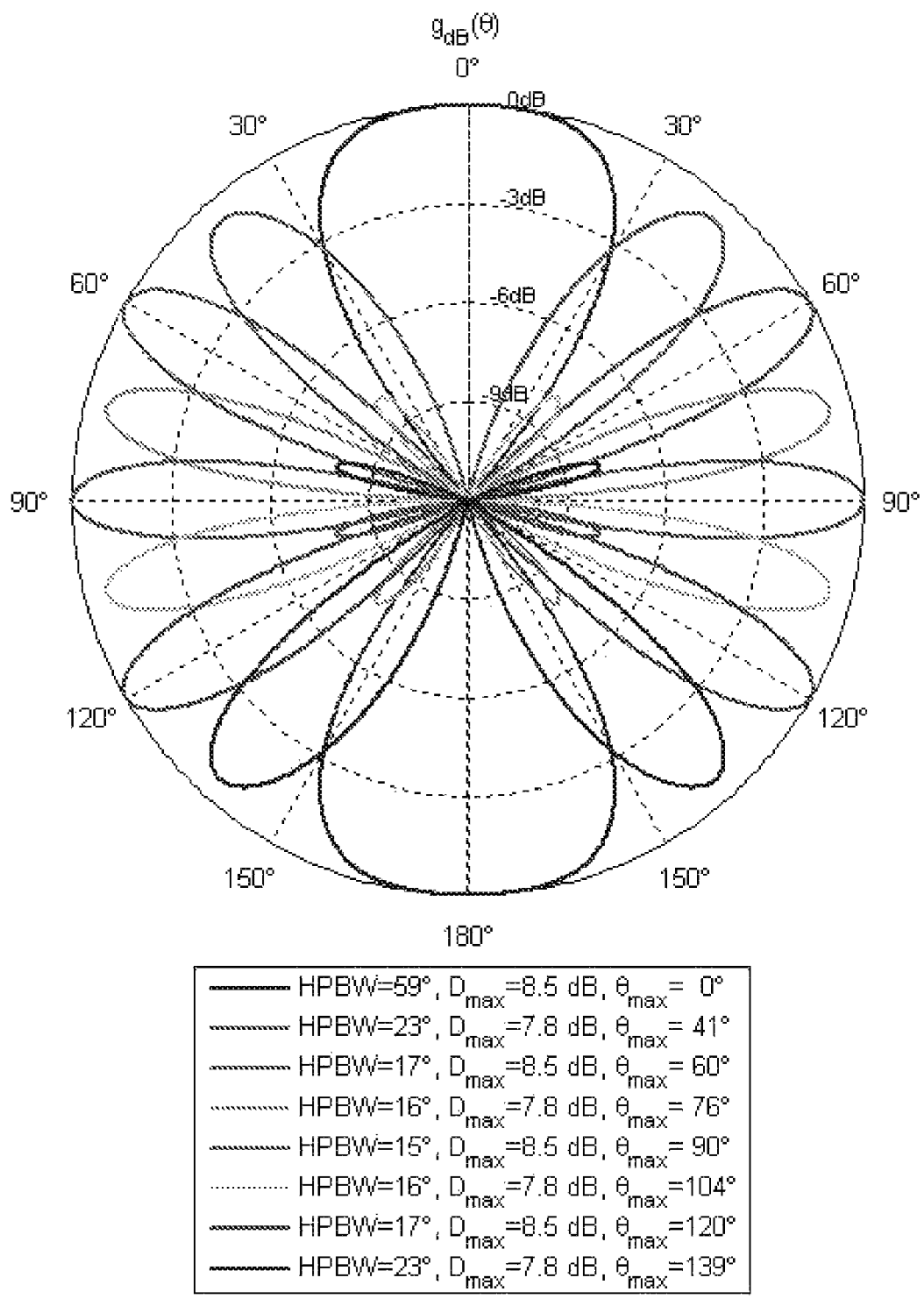
FIG. 4J shows eight antenna array patterns for a seven-element array employing an element spacing of $\lambda/2$ and quadrature beamforming/combining weights.

FIG. 4J shows eight antenna array patterns for a seven-element array employing an element spacing of $\lambda/2$ and quadrature beamforming/combining weights. The codebook comprises the set of eight vectors given by the columns of the following weight matrix in which the relationship $WW^H = 8I$ also holds.

$$W = \begin{bmatrix} +1 & +1 & +1 & +1 & +1 & +1 & +1 & +1 \\ -1 & -j & -j & -j & +1 & +j & +j & +j \\ +1 & +j & -1 & -j & +1 & +j & -1 & -j \\ -1 & +1 & +j & -1 & +1 & -1 & -j & +1 \\ +1 & -1 & +1 & -1 & +1 & -1 & +1 & -1 \\ -1 & +j & -j & +j & +1 & -1 & +j & -j \\ +1 & -j & -1 & +j & +1 & -j & -1 & +j \end{bmatrix}.$$

Figure 4K:
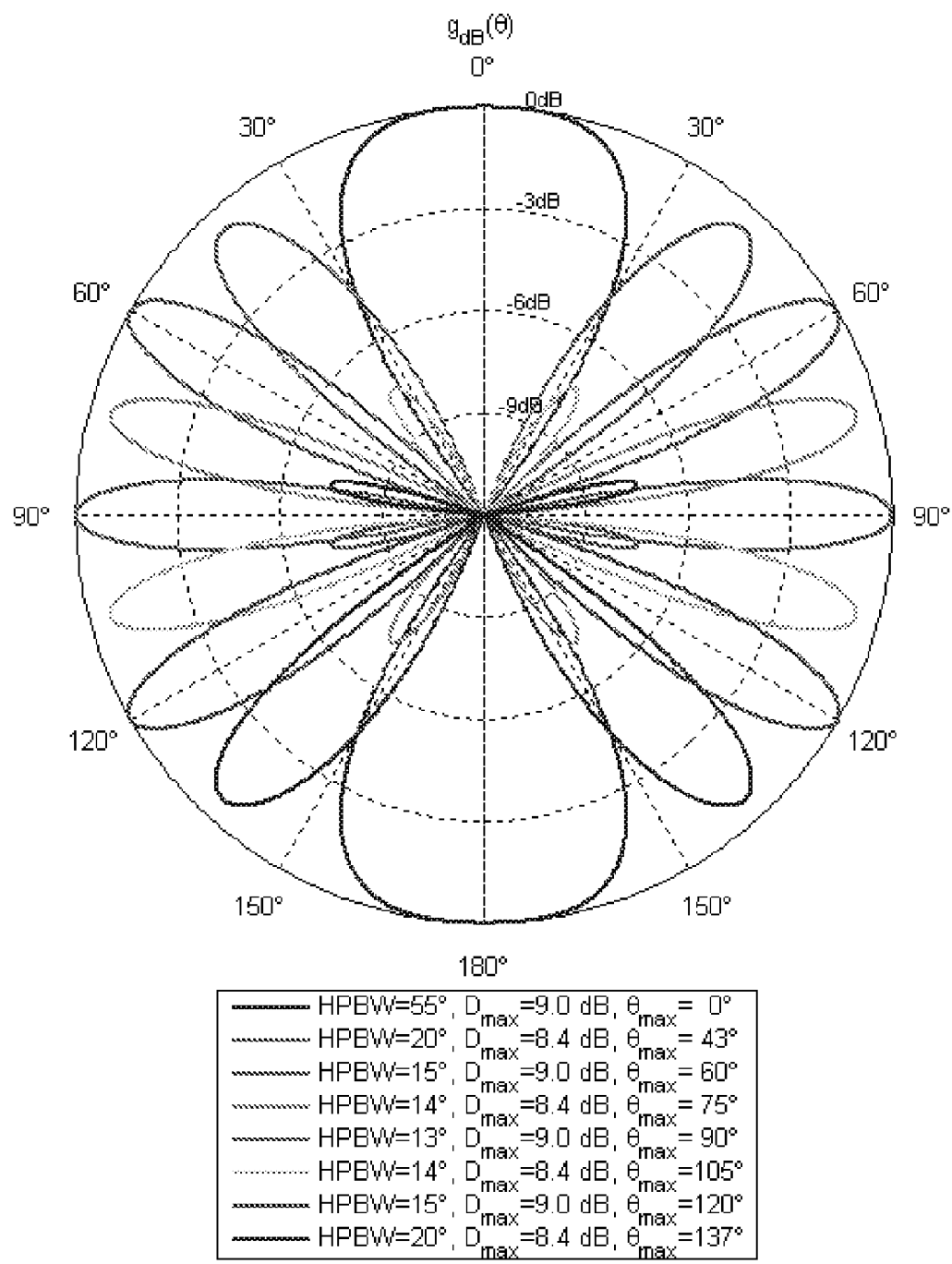
FIG. 4K shows eight orthogonal antenna array patterns for an eight-element array employing an element spacing of $\lambda/2$ and quadrature beamforming/combining weights.

FIG. 4K shows eight orthogonal antenna array patterns for an eight-element array employing an element spacing of $\lambda/2$ and quadrature beamforming/combining weights. The codebook comprises the set of eight orthogonal vectors given by the columns of the following weight matrix $$W = \begin{bmatrix} +1 & +1 & +1 & +1 & +1 & +1 & +1 & +1 \\ -1 & -j & -j & -j & +1 & +j & +j & +j \\ +1 & +j & -1 & -j & +1 & +j & -1 & -j \\ -1 & +1 & +j & -1 & +1 & -1 & -j & +1 \\ +1 & -1 & +1 & -1 & +1 & -1 & +1 & -1 \\ -1 & +j & -j & +j & +1 & -1 & +j & -j \\ +1 & -j & -1 & +j & +1 & -j & -1 & +j \end{bmatrix}.$$

Figure 4L:
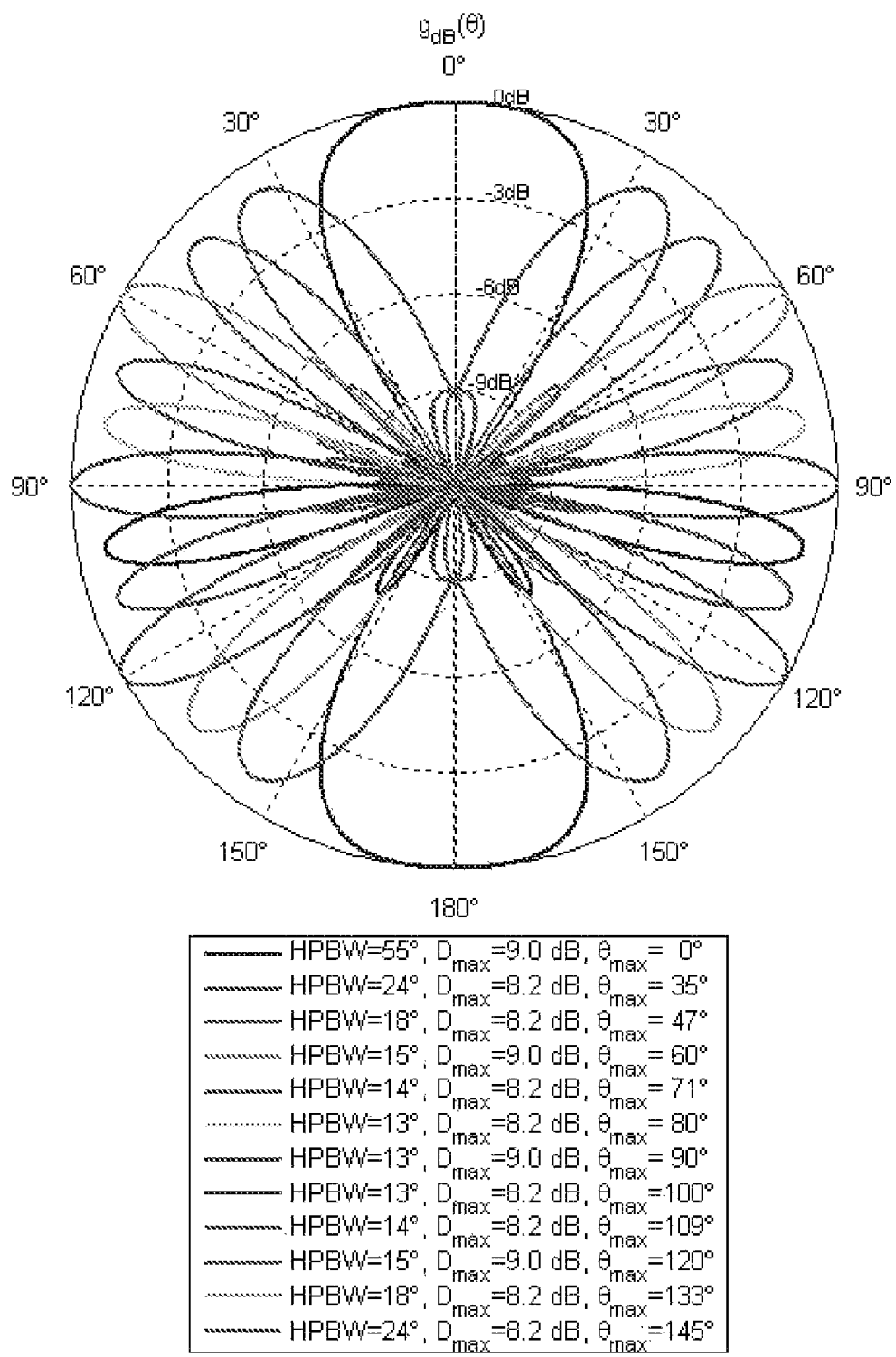
FIG. 4L shows twelve antenna array patterns for an eight-element array employing an element spacing of $\lambda/2$ and quadrature beamforming/combining weights.

FIG. 4L shows twelve antenna array patterns for an eight-element array employing an element spacing of $\lambda/2$ and quadrature beamforming/combining weights. The codebook comprises the set of eight vectors given by the columns of the following weight matrix $$W = \begin{bmatrix} +1 & +1 & +1 & +1 & +1 & +1 & +1 & +1 & +1 & +1 & +1 & +1 \\ -1 & -1 & -j & -j & +1 & -j & +1 & +j & +1 & +j & +j & -1 \\ +1 & +1 & -1 & -1 & -j & -j & +1 & +j & +j & -1 & -1 & +1 \\ -1 & -j & +1 & +j & -1 & -j & +1 & +j & -1 & -j & +1 & +j \\ +1 & +j & -j & +1 & -1 & +1 & -1 & -1 & +1 & +j & -j \\ -1 & +1 & +j & -j & +j & -1 & +1 & -1 & -j & +j & -j & +1 \\ +1 & -1 & +1 & -1 & +1 & -1 & +1 & -1 & +1 & -1 & +1 & -1 \\ -1 & +1 & -j & +j & +1 & +j & +1 & -j & +1 & -j & +j & +1 \end{bmatrix}.$$

Figure 4M:
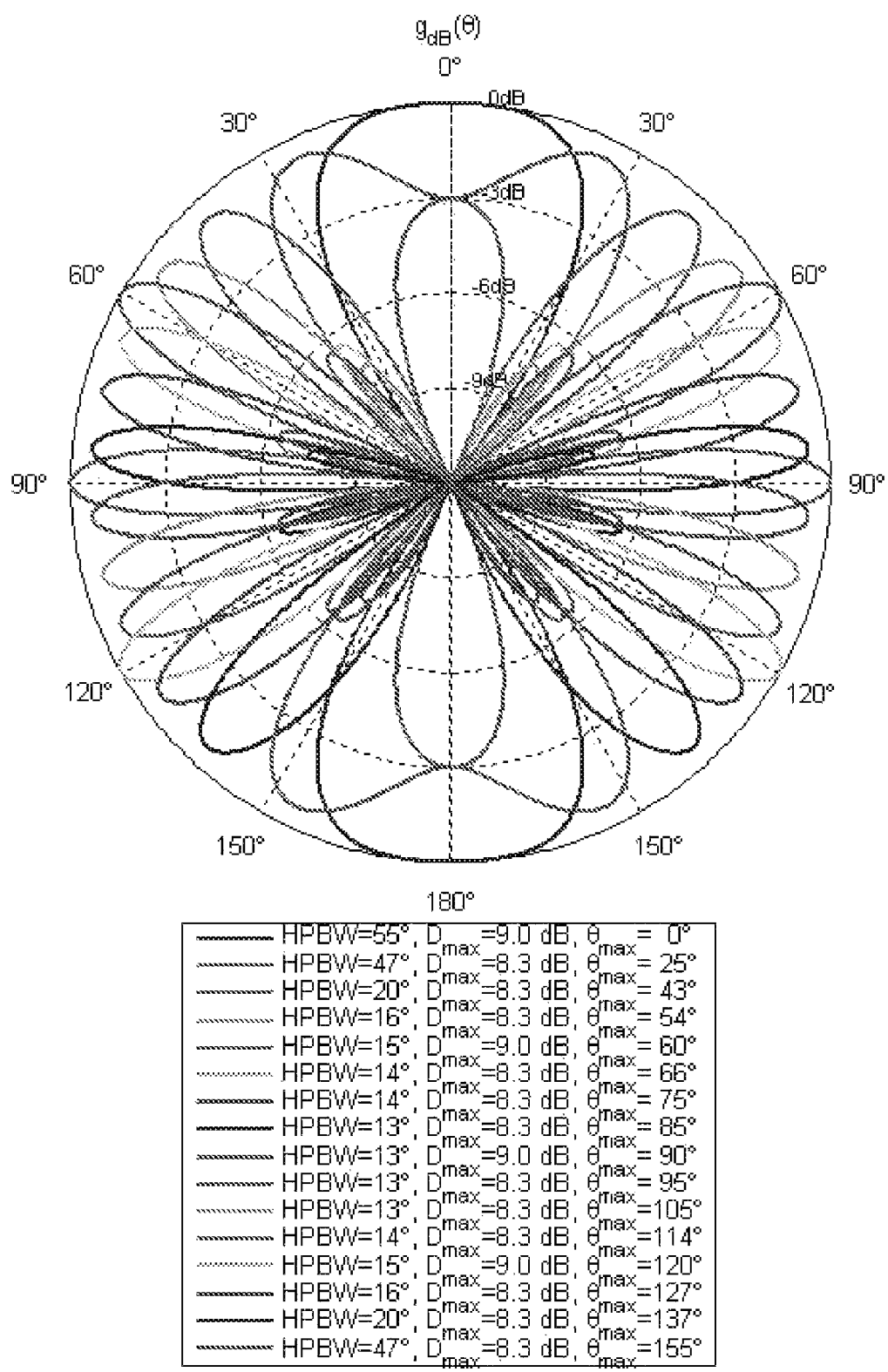
FIG. 4M shows sixteen antenna array patterns for an eight-element array employing an element spacing of $\lambda/2$ and quadrature beamforming/combining weights.

FIG. 4M shows sixteen antenna array patterns for an eight-element array employing an element spacing of $\lambda/2$ and quadrature beamforming/combining weights. The codebook comprises the set of eight vectors given by the columns of the following weight matrix $$W = \begin{bmatrix} +1 & +1 & +1 & +1 & +1 & +1 & +1 & +1 & +1 & +1 & +1 & +1 & +1 & +1 & +1 & +1 \\ -1 & -1 & -j & -j & -j & -j & -j & +1 & +1 & +1 & +j & +j & +j & +j & +j & -1 \\ +1 & +1 & +j & -1 & -1 & -1 & -j & +1 & +1 & +1 & +j & -1 & -1 & -1 & -j & +1 \\ -1 & -1 & +1 & +j & +j & +j & -1 & +1 & +1 & +1 & +j & -j & -j & -j & +1 & -1 \\ +1 & +j & -1 & -j & +1 & +j & -1 & -j & +1 & +j & -1 & -j & +1 & +j & -1 & -j \\ -1 & -j & +j & -1 & -j & +1 & +j & -j & +1 & +j & -1 & +1 & +j & -1 & -j & +j \\ +1 & +j & -j & +j & -1 & -j & +j & -1 & +1 & +j & -j & +j & -1 & -j & +j & -j \\ -1 & -j & -1 & +1 & +j & -1 & -j & +1 & +j & +1 & -1 & -j & +1 & -1 & +j \end{bmatrix},$$

wherein $WW^H = 16I$.

Some embodiments of the invention may provide for quasi-omni and complementary Golay codebooks employing binary beamforming/combining weights for antenna arrays having from two to eight antenna elements (N=2 . . . 8). The beamformer weights are +1 or −1. A +1 weight on an antenna element means that +I (a positive in-phase signal) is transmitted on that antenna element, whereas a −1 weight means that −I (a negative in-phase signal) is transmitted on that antenna element. Each codebook may contain multiple options for quasi-omni patterns. Depending on the polar and azimuthal antenna gain patterns, one or more quasi-omni patterns may be used. Real complementary Golay patterns exist for N=2, 4, and 8 only. Depending on the polar and azimuthal antenna gain pattern, one or both complementary patterns can be used.

A quasi-omni codebook for a two-element array comprises two orthogonal beamforming (or combining) vectors given by the columns of the weight matrix $$W = \begin{bmatrix} +1 & +1 \\ -1 & +1 \end{bmatrix}.$$

Figure 5A:
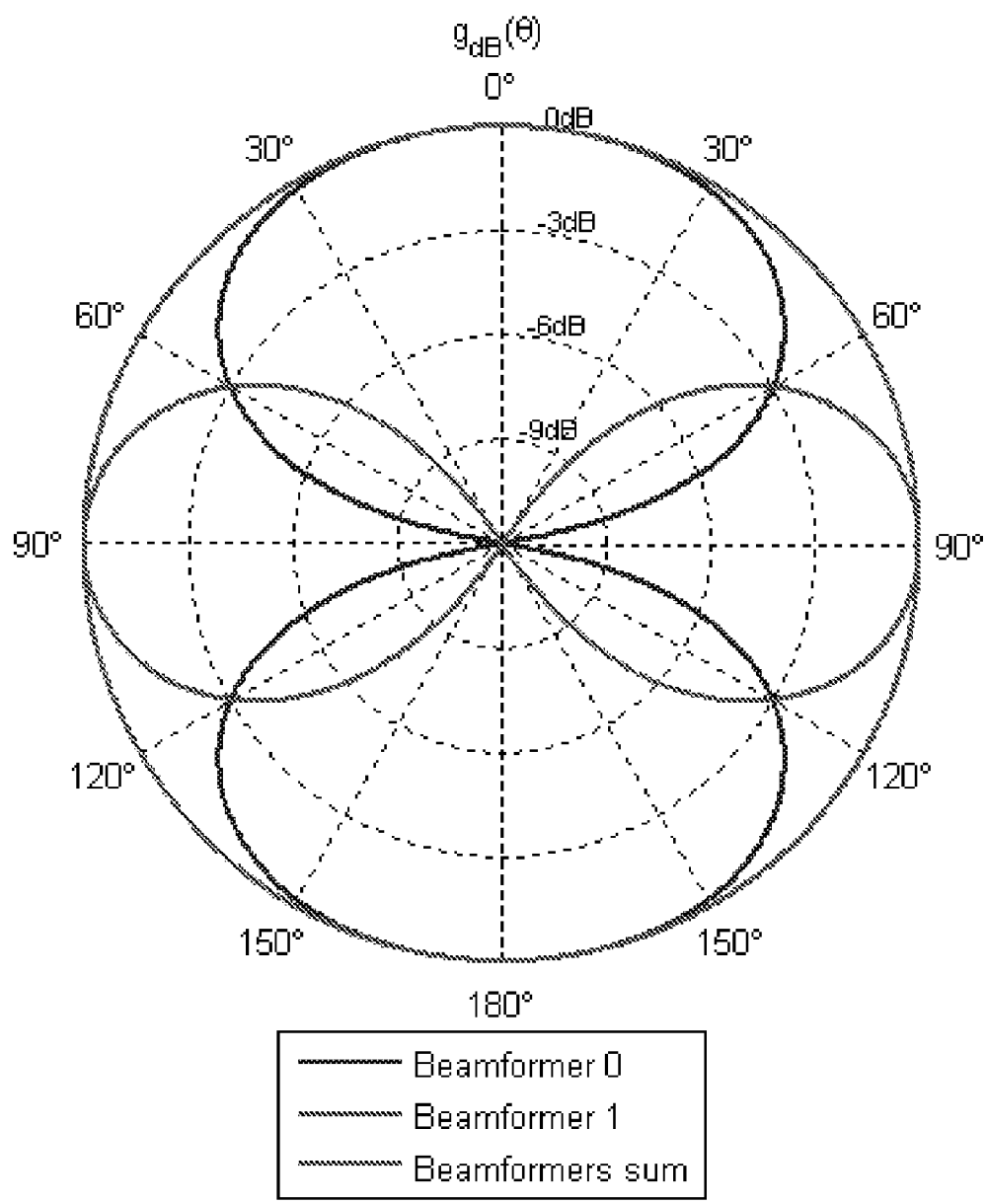
FIG. 5A shows two complementary Golay patterns for a two-element array comprises two orthogonal beamforming (or combining) vectors

The two complementary Golay patterns $g_1(\theta,\phi)$ and $g_2(\theta,\phi)$, where $g_1(\theta,\phi)+g_2(\theta,\phi)=2$, are shown in FIG. 5A. The first pattern is maximum in direction 0° and has a HPBW of 120.5° and maximum directivity of 3.0 dB. The second pattern is maximum in direction 90° with a HPBW of 60.4° and maximum directivity of 3.0 dB.

A quasi-omni codebook for a three-element antenna array comprising three quasi-orthogonal beamforming/combining vectors is given by the columns of weight matrix W $$W = \begin{bmatrix} +1 & +1 & +1 \\ -1 & +1 & +1 \\ +1 & -1 & +1 \end{bmatrix}.$$

Figure 5B:
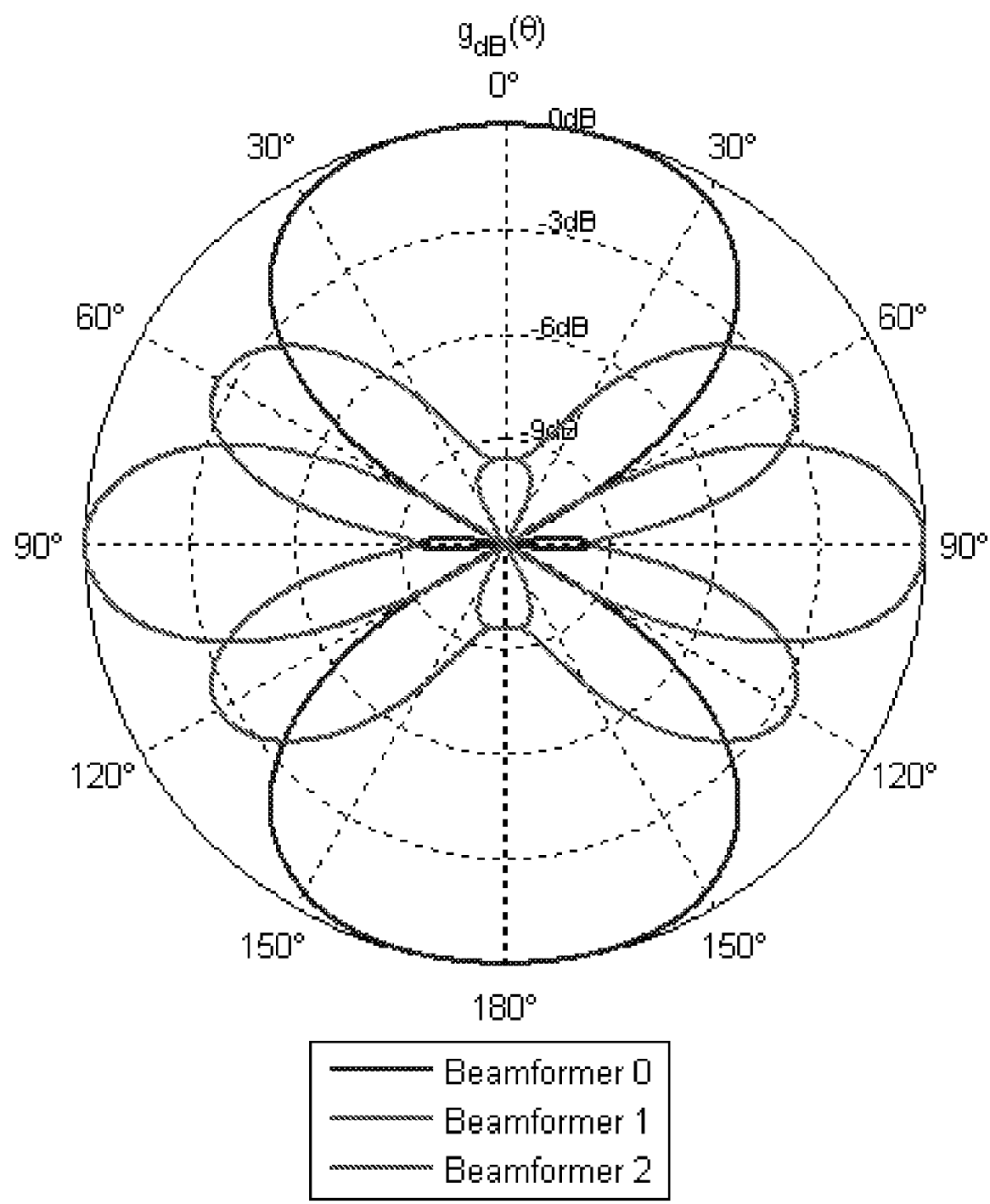
FIG. 5B shows three quasi-orthogonal beam patterns for a three-element antenna array.

The resulting quasi-orthogonal beam patterns are shown in FIG. 5B. The first pattern is maximum in direction 0° and has a HPBW of 93.4° and maximum directivity of 4.77 dB. The second pattern is maximum in directions 60° and 120° with a HPBW of 40.4° and maximum directivity of 2.2 dB. The third pattern is maximum in direction 90° and has a HPBW of 36.7° and maximum directivity of 4.77 dB.

Figure 5C:
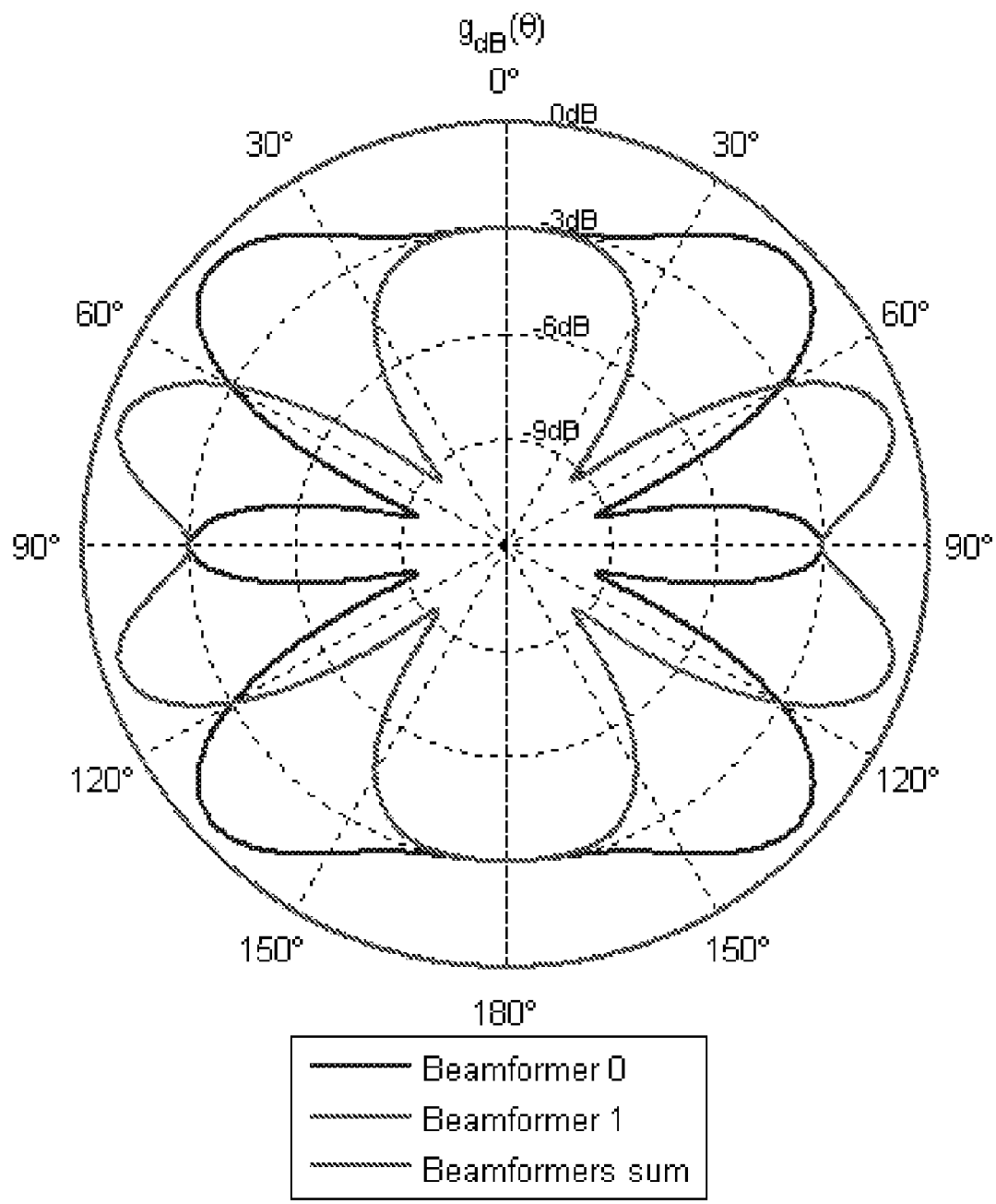
FIG. 5C shows a pair of Golay complementary patterns for a four-element array

A pair of Golay complementary patterns $g_1(\theta,\phi)+g_2(\theta,\phi)=1.77$ is shown in FIG. 5C. Two orthogonal beamforming/combining vectors are given by the columns of the following weighting matrix for a four-element array $$W = \begin{bmatrix} +1 & +1 \\ -1 & +1 \\ +1 & +1 \\ +1 & -1 \end{bmatrix}.$$

The first pattern is maximum in directions 46° and 134°, has a HPBW of 123.0° and maximum directivity of 2.48 dB. The second pattern is maximum in directions 72° and 108° with a HPBW of 62.9° and maximum directivity of 2.48 dB.

Figure 5D:
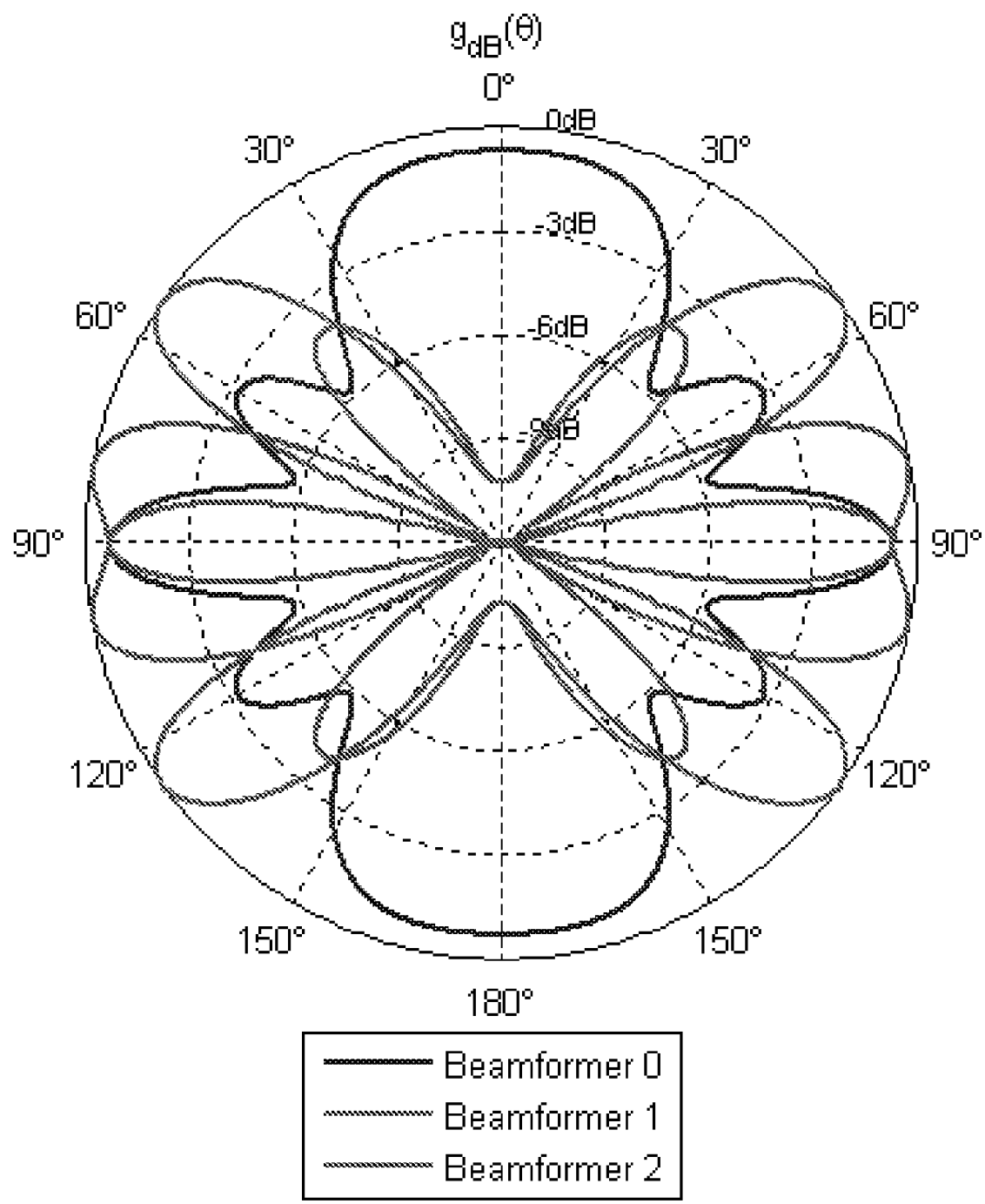
FIG. 5D shows three quasi-orthogonal beam patterns corresponding to a codebook for a five-element array comprising three quasi-orthogonal beam-forming vectors.

FIG. 5D shows three quasi-orthogonal beam patterns corresponding to a codebook for a five-element array comprising three quasi-orthogonal beam-forming vectors. The codebook vectors are the columns of the following weighting matrix.

$$W = \begin{bmatrix} +1 & +1 & +1 \\ -1 & +1 & +1 \\ +1 & -1 & +1 \\ +1 & +1 & +1 \\ +1 & +1 & -1 \end{bmatrix}.$$

The first pattern is maximum in direction 0°, with a HPBW of 109.3° and maximum directivity of 2.55 dB. The second pattern is maximum in directions 54° and 126°, with a HPBW of 63.5° and maximum directivity of 3.25 dB. The third pattern is maximum in directions 79° and 101°, with a HPBW of 43.8° and maximum directivity of 3.22 dB.

Figure 5E:
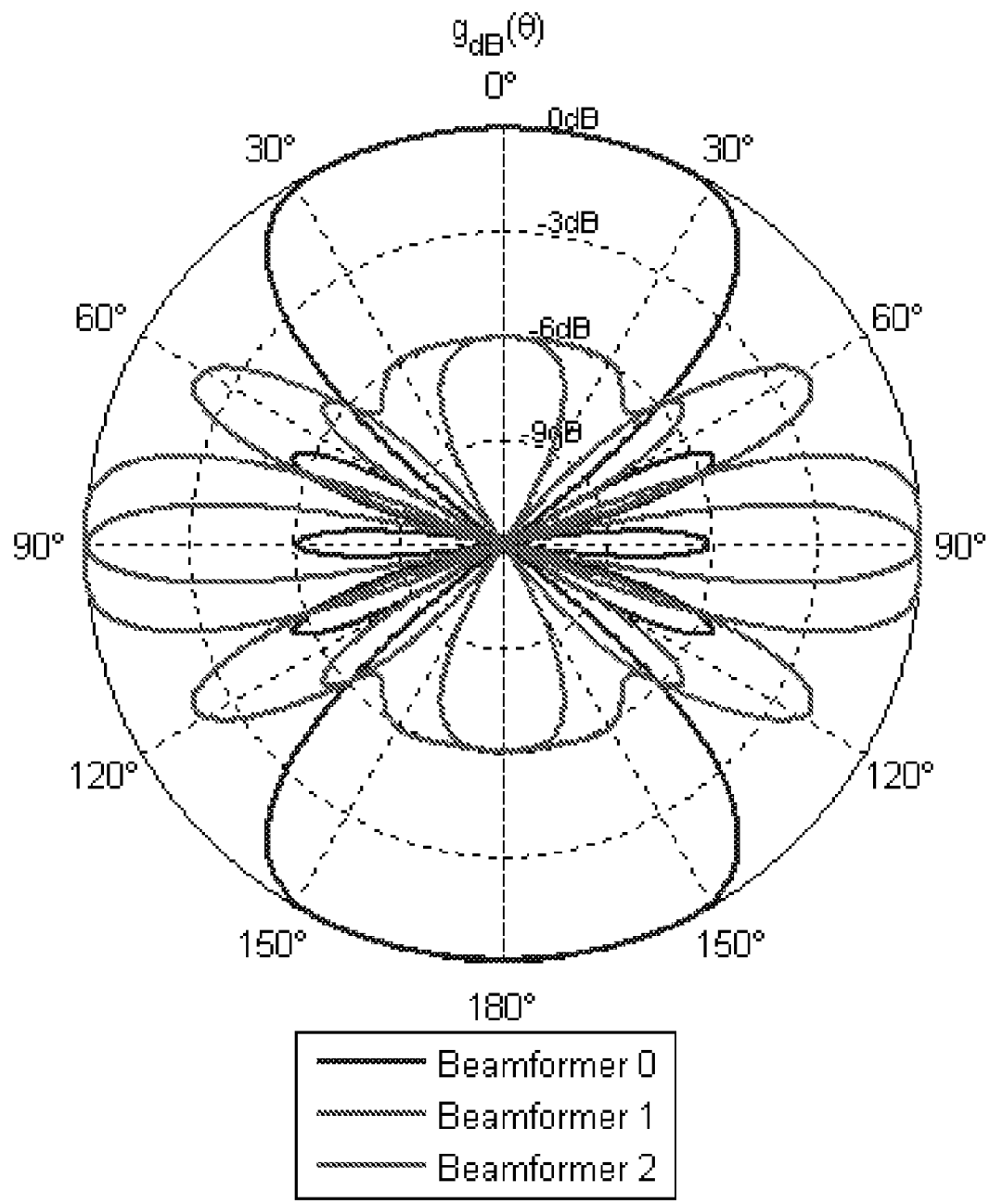
FIG. 5E shows three quasi-orthogonal beam patterns corresponding to a code book for a six-element array.

FIG. 5E shows three quasi-orthogonal beam patterns corresponding to a code book for a six-element array. The codebook comprises three quasi-orthogonal beam-forming vectors, which are columns of the following weighting matrix.

$$W = \begin{bmatrix} +1 & +1 & +1 \\ -1 & +1 & +1 \\ +1 & -1 & +1 \\ -1 & +1 & +1 \\ +1 & +1 & +1 \\ +1 & +1 & -1 \end{bmatrix}.$$

In this case, the first pattern is maximum in directions 23° and 157°, with a HPBW of 88.2° and maximum directivity of 4.30 dB. The second pattern is maximum in directions 57° and 123°, with a HPBW of 20.0° and maximum directivity of 5.11 dB. The third pattern is maximum in directions 85° and 95°, with a HPBW of 32.7° and maximum directivity of 4.30 dB.

Figure 5F:
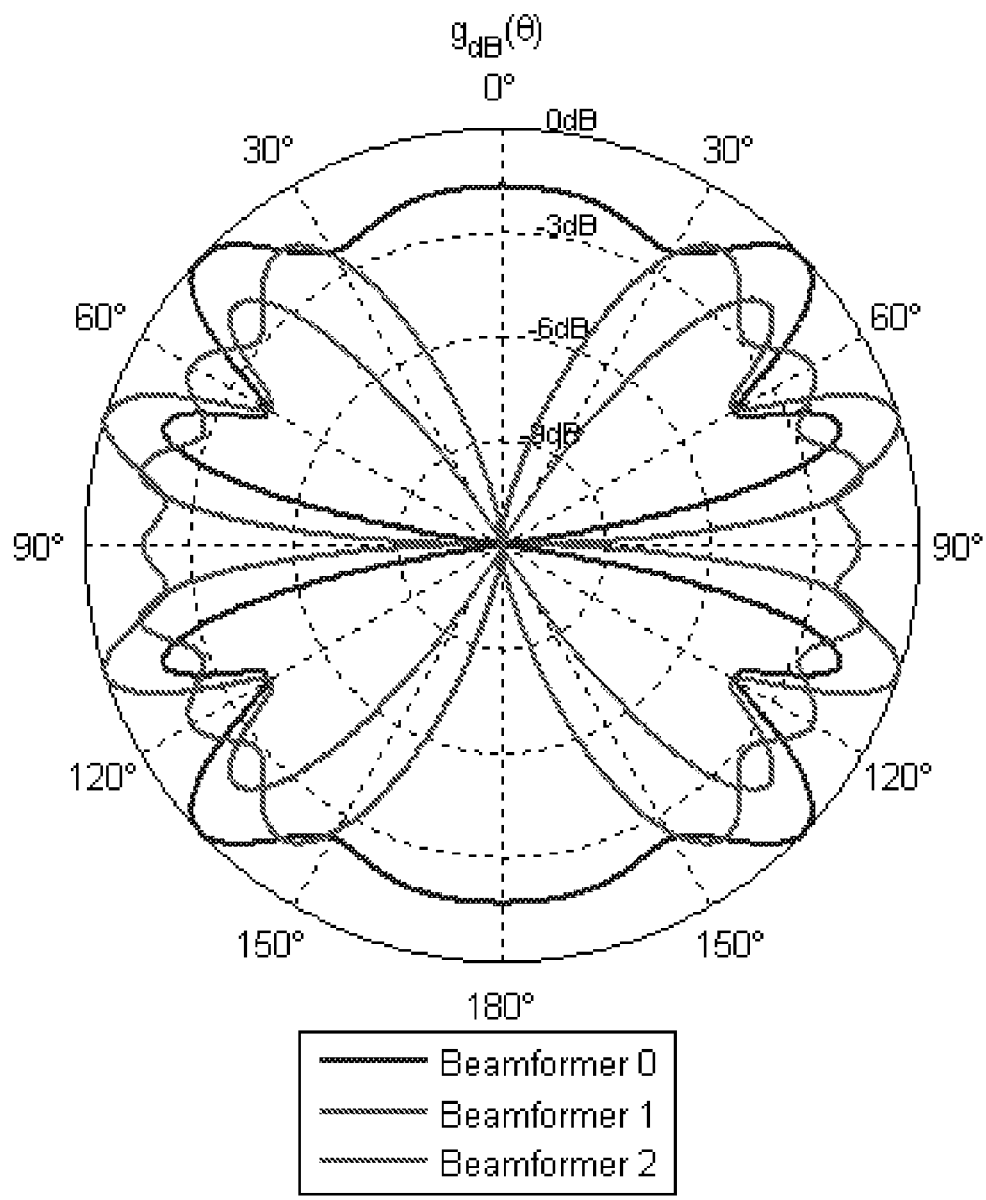
FIG. 5F shows three quasi-orthogonal beam patterns corresponding to a code book for a seven-element array.

FIG. 5F shows three quasi-orthogonal beam patterns corresponding to a code book for a seven-element array. The codebook comprises three quasi-orthogonal beam-forming vectors, which are columns of the following weighting matrix.

$$W = \begin{bmatrix} +1 & +1 & +1 \\ -1 & +1 & -1 \\ +1 & +1 & -1 \\ -1 & -1 & +1 \\ -1 & -1 & +1 \\ +1 & +1 & +1 \\ +1 & -1 & +1 \end{bmatrix}.$$

The first pattern has a HPBW of 133.3° and maximum directivity of 2.77 dB. The second pattern has a HPBW of 109.7° and maximum directivity of 1.39 dB. The third pattern has a HPBW of 53.8° and maximum directivity of 2.77 dB.

A quasi-omni codebook for an eight-element array comprises two orthogonal beamforming (or combining) vectors given by the columns of the weight matrix $$W = \begin{bmatrix} +1 & +1 \\ +1 & -1 \\ -1 & -1 \\ -1 & +1 \\ +1 & +1 \\ -1 & +1 \\ +1 & +1 \\ -1 & +1 \end{bmatrix}$$

Figure 5G:
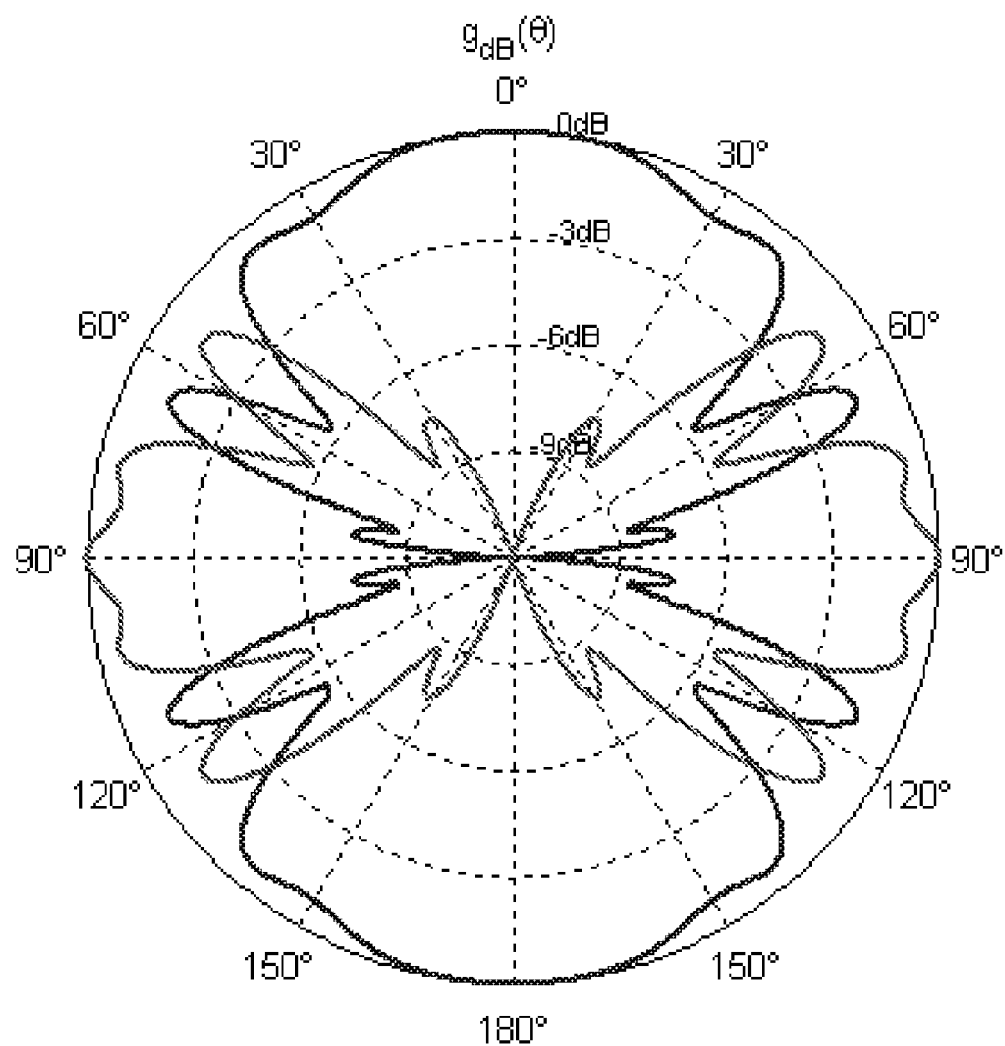
FIG. 5G shows a pair of beam patterns generated from two complementary Golay vectors for an eight-element array

The two complementary Golay patterns $g_1(\theta,\phi)+g_2(\theta,\phi)=2$ are shown in FIG. 5G. The first pattern is maximum in direction 0° and has a HPBW of 98.70 and maximum directivity of 3.0 dB. The second pattern is maximum in direction 90° with a HPBW of 40.9° and maximum directivity of 3.0 dB.

A quasi-omni codebook for a two-element array employing quadrature weights is identical to the case in which binary weights are employed. Thus, the codebook comprises two orthogonal beamforming (or combining) vectors given by the columns of the weight matrix $$W = \begin{bmatrix} +1 & +1 \\ -1 & +1 \end{bmatrix}.$$

Figure 6A:
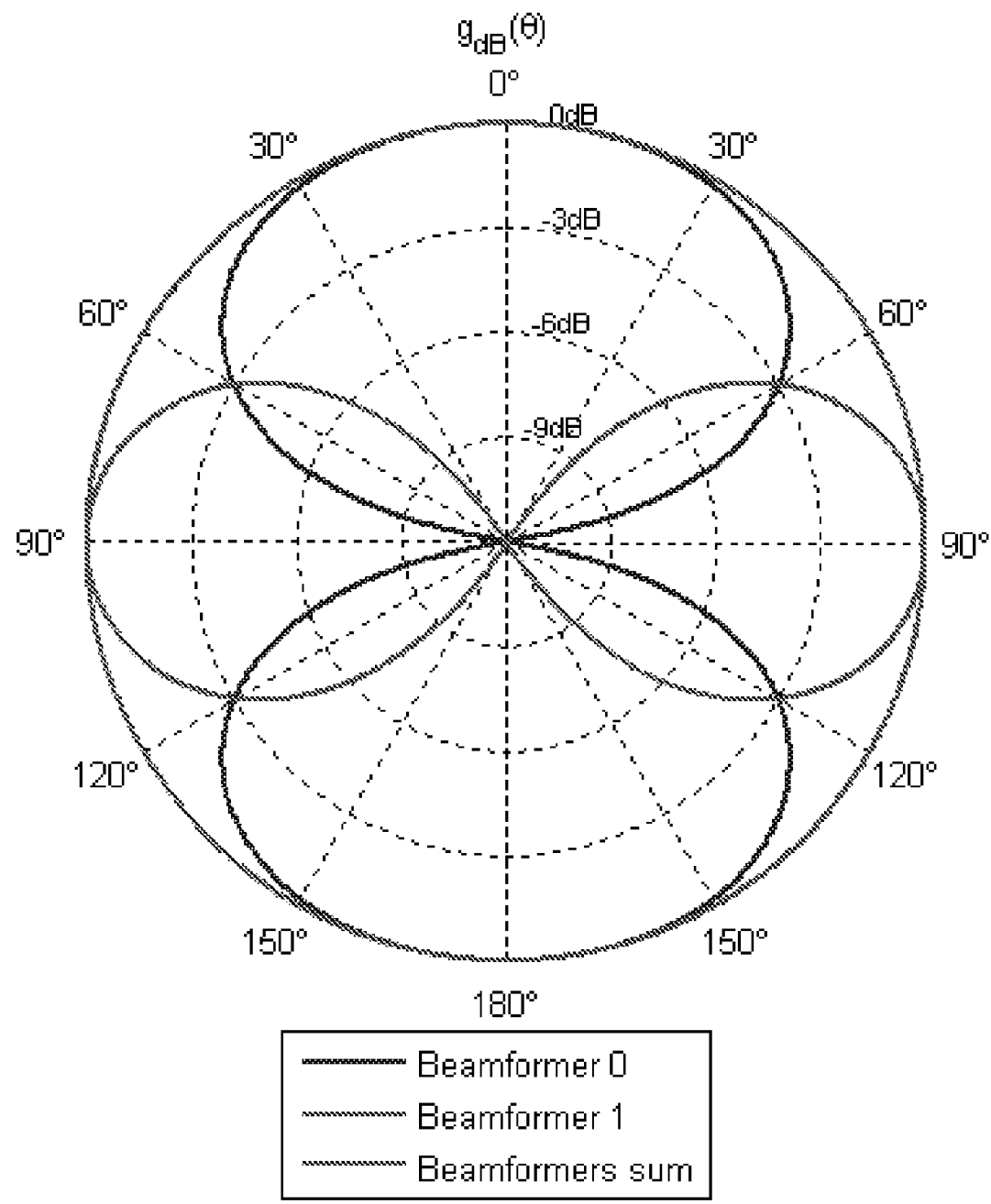
FIG. 6A shows a pair of quasi-omni beam patterns for a two-element array.

The two complementary Golay patterns $g_1(\theta,\phi)$ and $g_2(\theta,\phi)$, where $g_1(\theta,\phi)+g_2(\theta,\phi)=2$, are shown in FIG. 6A. The first pattern is maximum in direction 0° and has a HPBW of 120.5° and maximum directivity of 3.0 dB. The second pattern is maximum in direction 90° with a HPBW of 60.4° and maximum directivity of 3.0 dB.

Figure 6B:
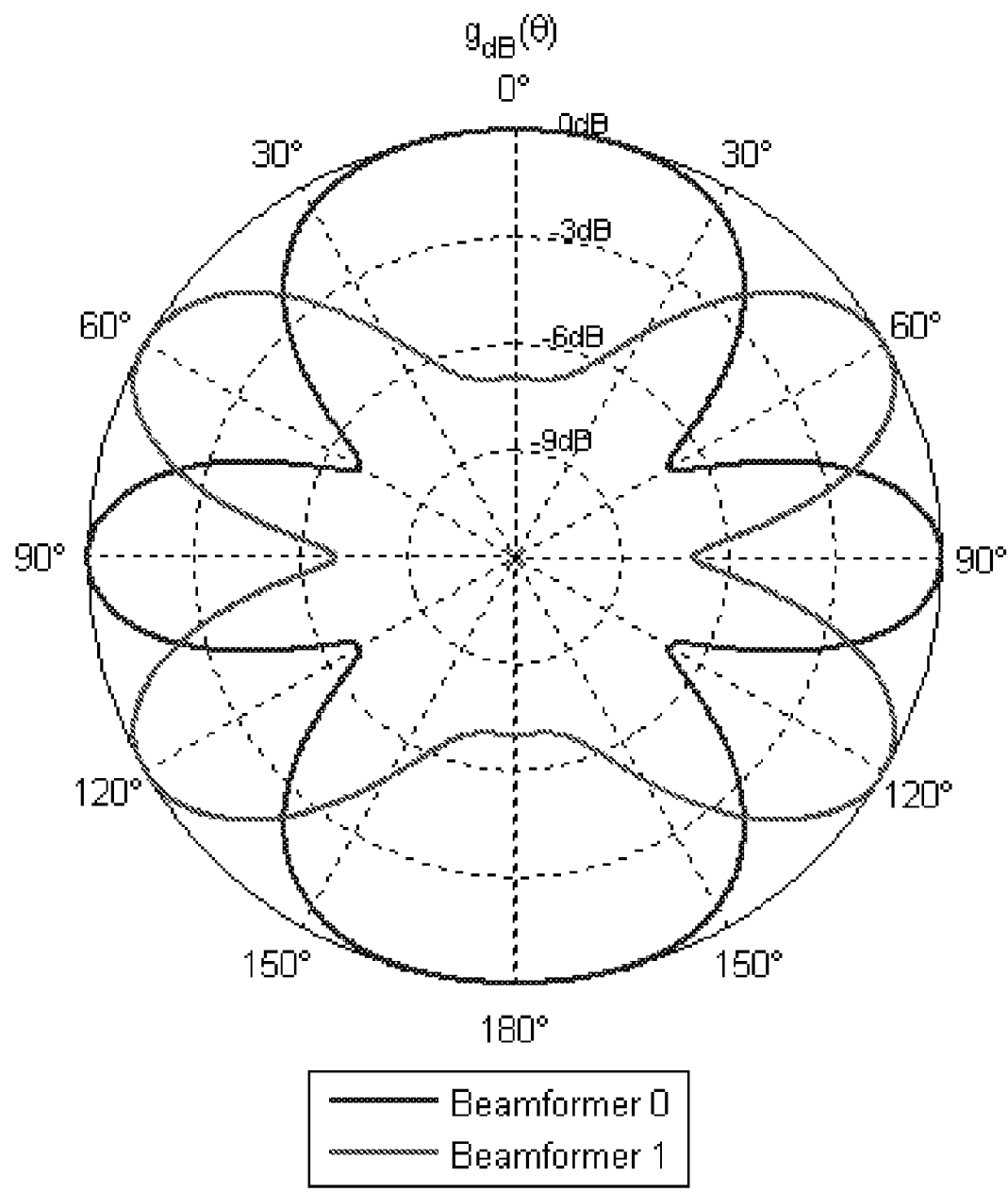
FIG. 6B shows a pair of quasi-omni beam patterns of a three-element array employing quadrature weights.

FIG. 6B shows a pair of quasi-omni beam patterns of a three-element array employing quadrature weights. The codebook comprises the pair of quadrature vectors derived from the pair of columns in the following weight matrix $$W = \begin{bmatrix} +1 & +1 \\ +j & +1 \\ +1 & -1 \end{bmatrix}.$$

One pattern has a HPBW of 123.6° and the other pattern has a HPBW of 80.0°. Both patterns have a maximum directivity of 2.22 dB.

Figure 6C:
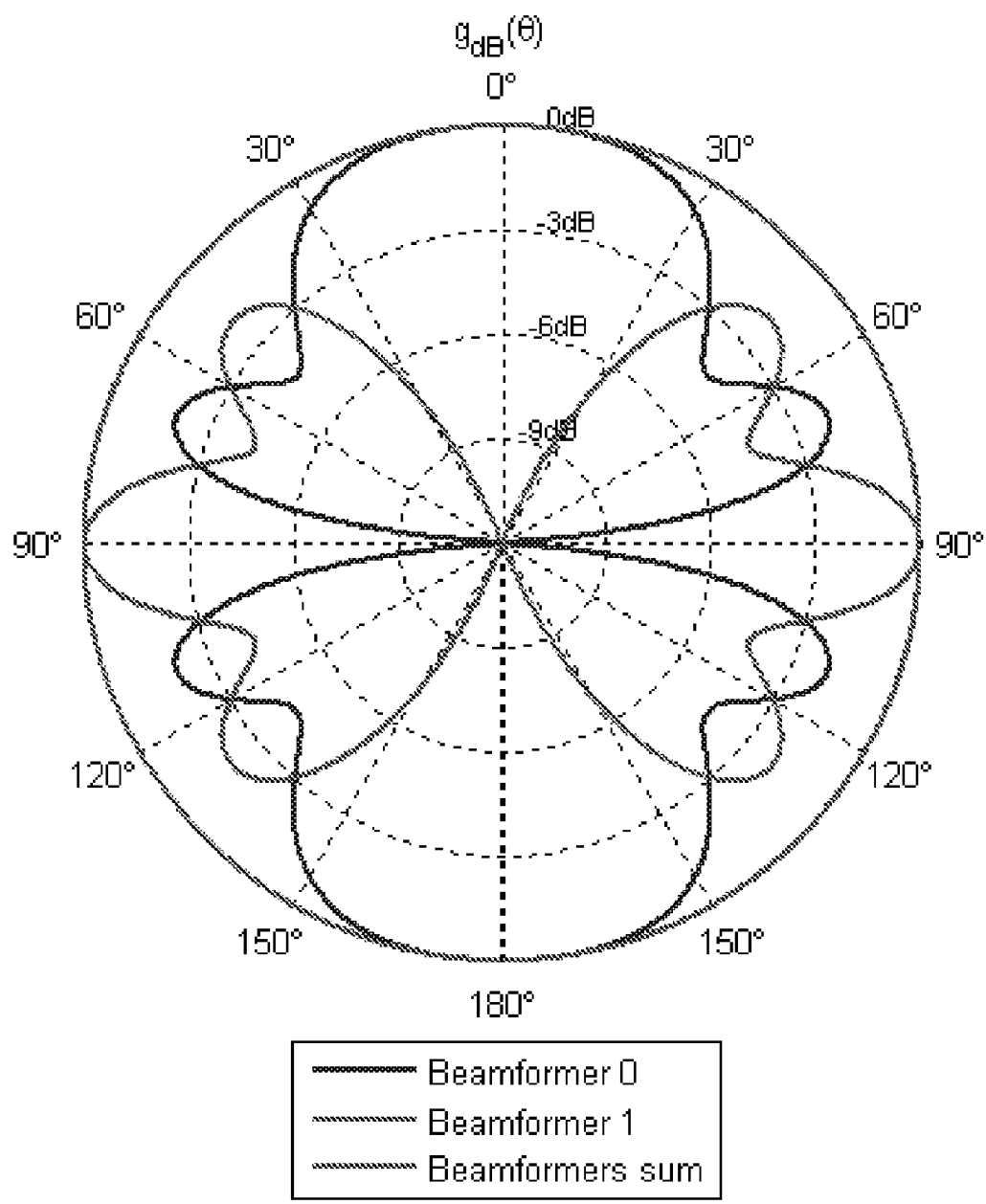
FIG. 6C is a plot of two Golay complementary patterns generated by a four-element array with quadrature weights.

FIG. 6C is a plot of two Golay complementary patterns $g_1(\theta,\phi)$ and $g_2(\theta,\phi)$, where $g_1(\theta,\phi)+g_2(\theta,\phi)=2$, generated by a four-element array with quadrature weights. The resulting quasi-omni codebook for this case is given by vectors represented by the columns of the following weight matrix $$W = \begin{bmatrix} +1 & +1 \\ -j & +j \\ +j & +j \\ -1 & +1 \end{bmatrix}.$$

The first pattern is maximum in direction 0° and has a HPBW of 83.4° and maximum directivity of 3.01 dB. The second pattern is maximum in direction 90° with a HPBW of 29.4° and maximum directivity of 3.01 dB.

Figure 6D:
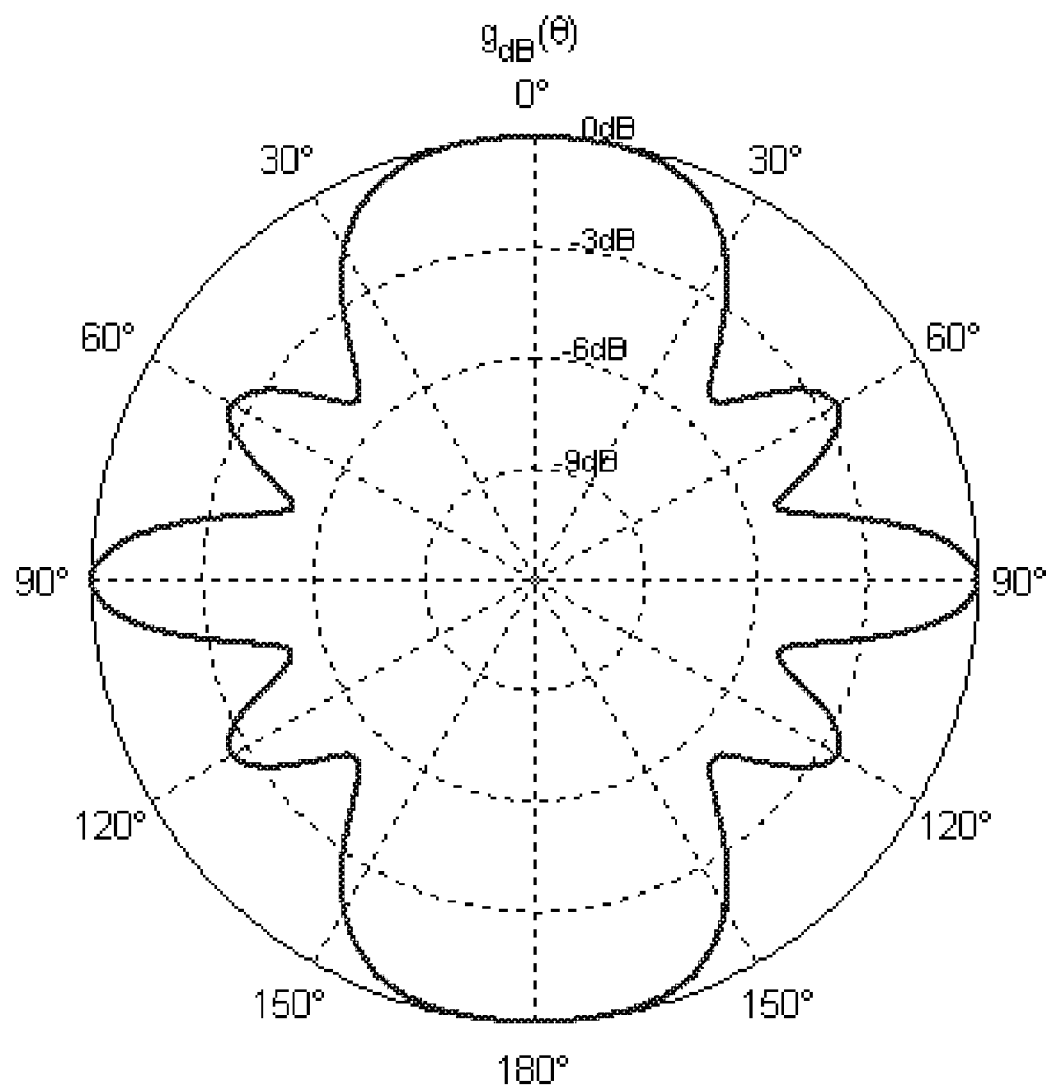
FIG. 6D shows a quasi-omni pattern with maximum directivity of 2.55 dB generated by a five-element array

FIG. 6D shows a quasi-omni pattern with maximum directivity of 2.55 dB generated by a five-element array employing a weight vector w=[+1 −1 +1 +1 +1], which is the quasi-omni codebook for this case.

FIGS. 7A-7D show quasi-omni beam patterns for a six-element array corresponding to vectors of a quasi-omni codebook, wherein each vector is a column of the following weight matrix $$W = \begin{bmatrix} +1 & +1 & +1 & +1 \\ -1 & -1 & +1 & +1 \\ +j & -j & -j & +j \\ -1 & -1 & -1 & -1 \\ +j & -j & +1 & +1 \\ +j & -j & -1 & -1 \end{bmatrix}.$$

Figure 7A:
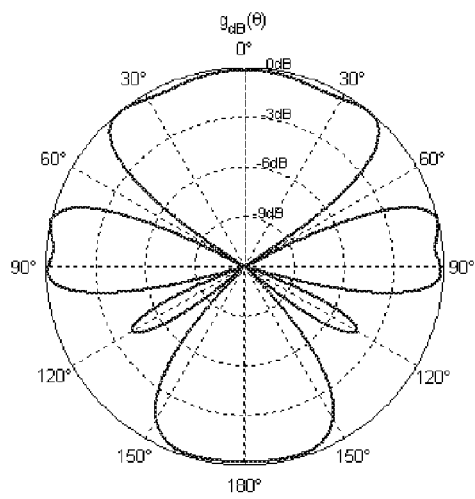
FIGS. 7A-7D show quasi-omni beam patterns for a six-element array corresponding to vectors of a quasi-omni codebook
Figure 7B:
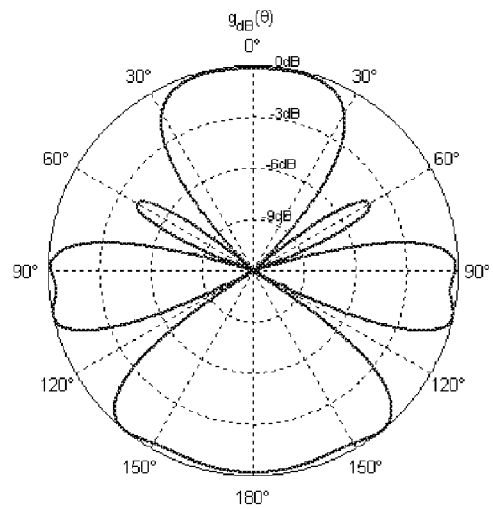
Figure 7C:
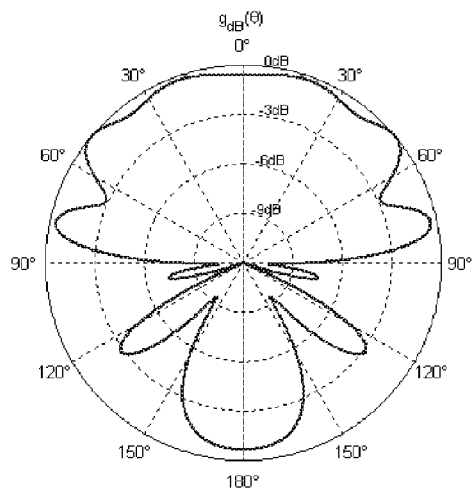
Figure 7D:
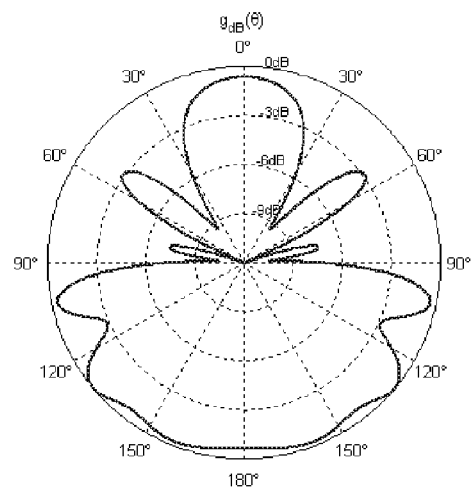

The quasi-omni beam patterns shown in FIGS. 7A and 7B have maximum directivity of 2.39 dB, and the quasi-omni patterns shown in FIGS. 7C and 7D have maximum directivity of 2.86 dB.

Figure 8A:
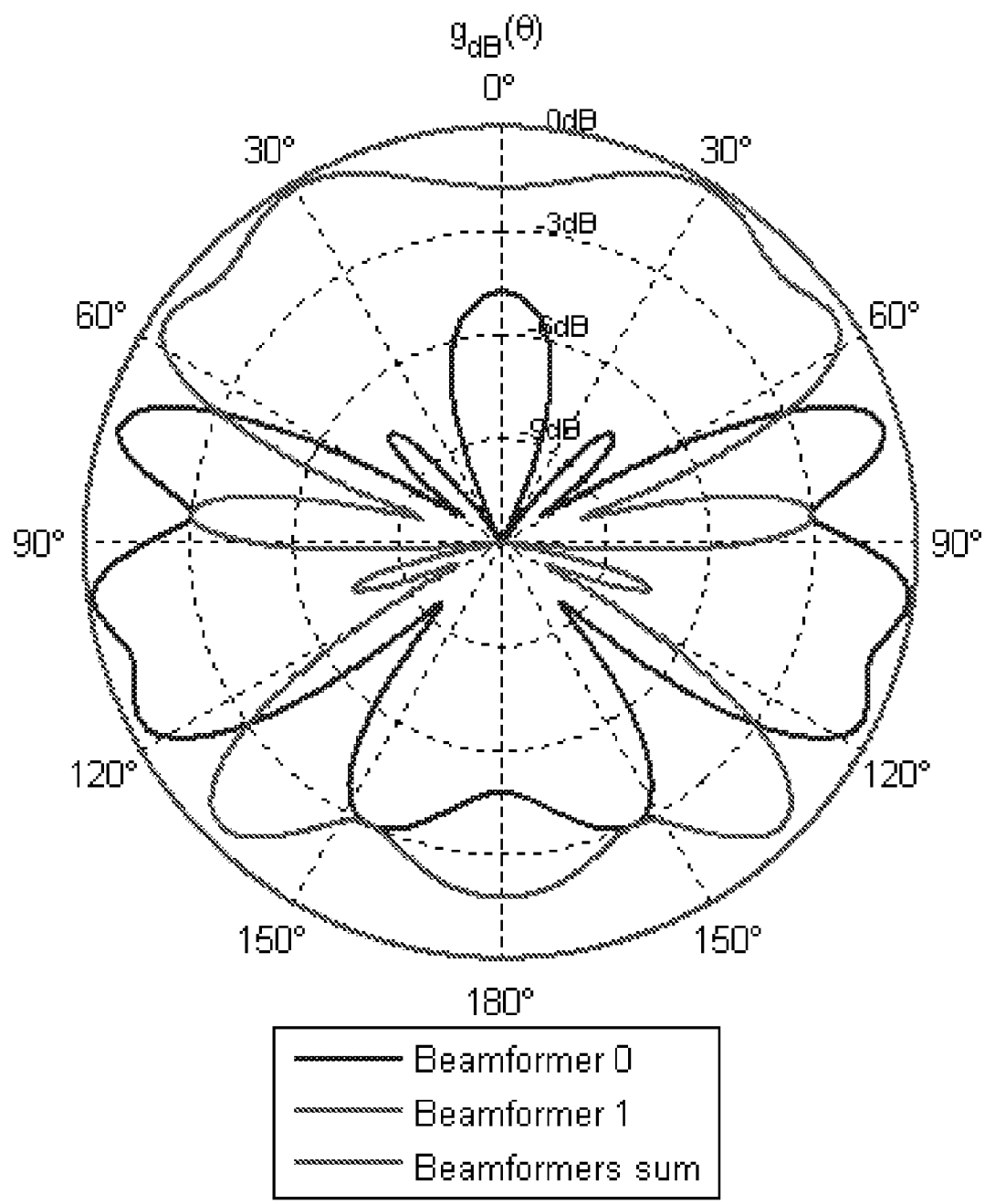
FIG. 8A shows a pair of Golay complementary patterns generated by a six-element array.

A six-element array is configured to generate the pair of Golay complementary patterns $g_1(\theta,\phi)$ and $g_2(\theta,\phi)$, where $g_1(\theta,\phi)+g_2(\theta,\phi)=1.93$, shown in FIG. 8A. A related pair of orthogonal beamforming/combining vectors comprises the columns of the following weight matrix $$W = \begin{bmatrix} +1 & +1 \\ -j & +j \\ -j & -j \\ -j & +j \\ +1 & +1 \\ +j & -j \end{bmatrix}.$$

The first pattern is maximum in directions 31° and 149°, has a HPBW of 120.7° and maximum directivity of 2.86 dB. The second pattern is maximum in directions 82° and 98° with a HPBW of 61.2° and maximum directivity of 2.86 dB.

Figure 8B:
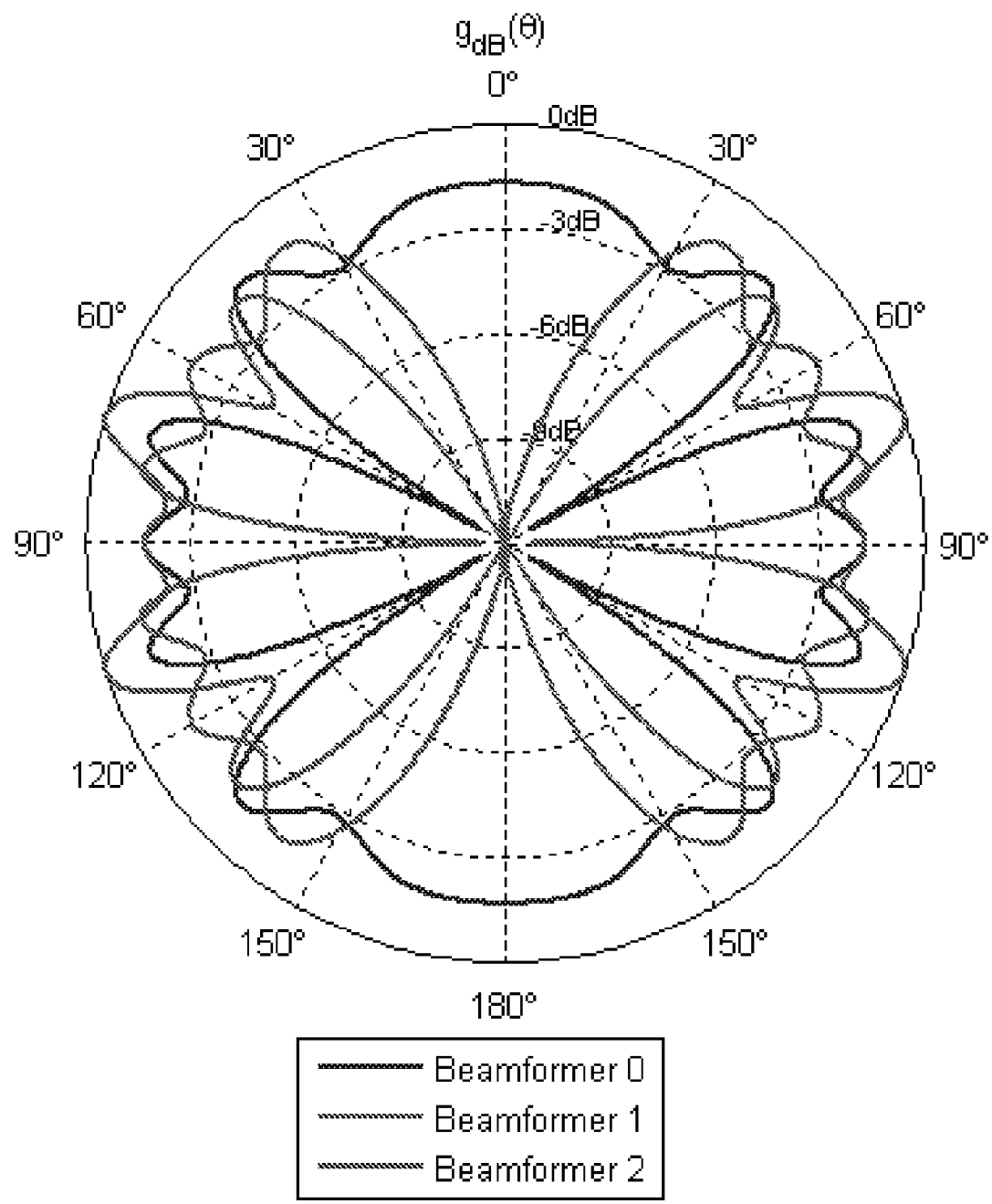
FIG. 8B shows three quasi-omni beam patterns generated by a seven-element array with quadrature weighting vectors.

FIG. 8B shows three quasi-omni beam patterns from a seven-element array with quadrature weighting vectors. The vectors are components of a quasi-omni codebook and include the columns of the following weight matrix $$W = \begin{bmatrix} +1 & +1 & +1 \\ +j & +1 & -1 \\ -1 & +1 & -1 \\ +j & -1 & +1 \\ -1 & -1 & +1 \\ +j & +1 & +1 \\ +1 & -1 & +1 \end{bmatrix}.$$

The maximum directivity of the first two patterns is 1.39 dB, and the maximum directivity of the third pattern is 2.77 dB.

Figure 8C:
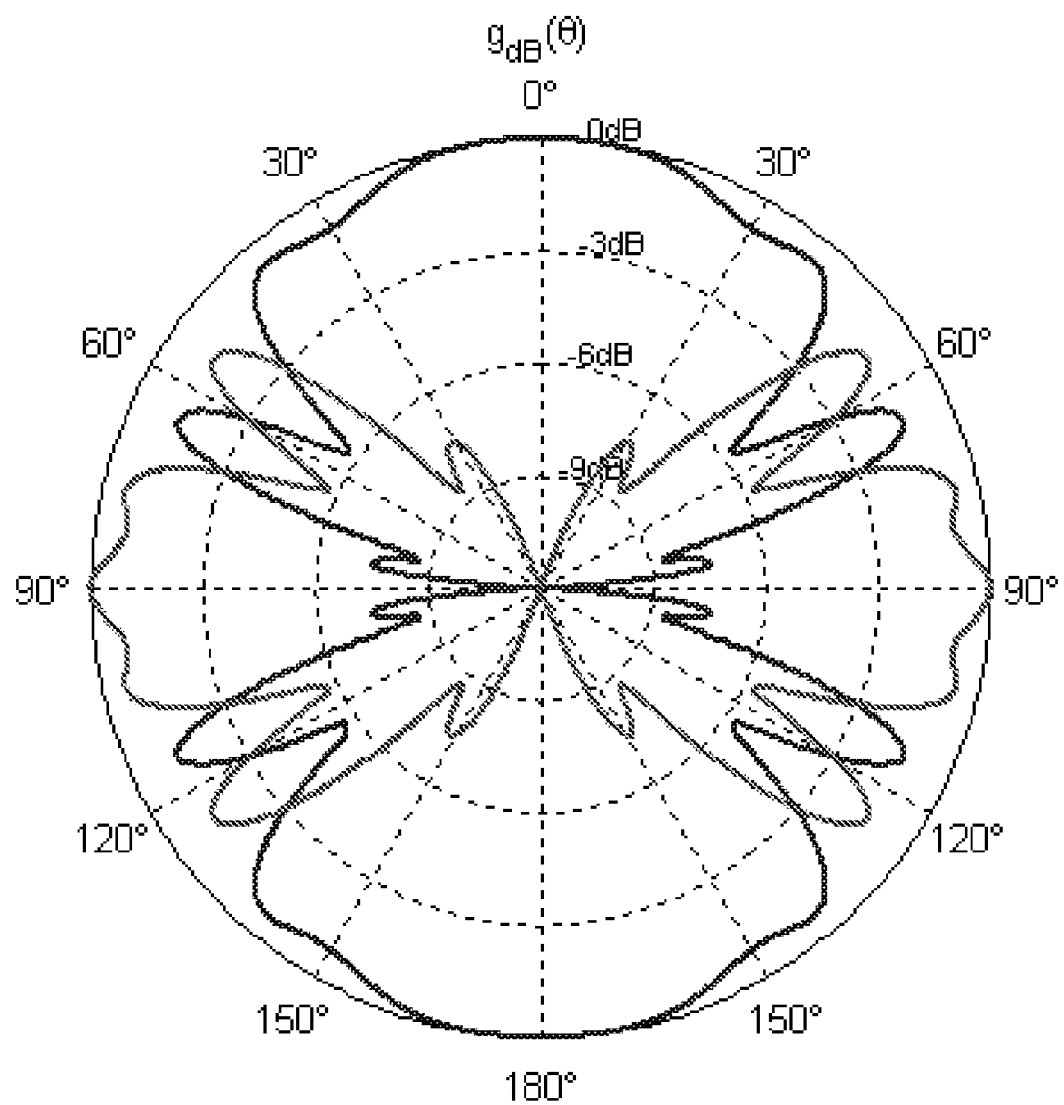
FIG. 8C shows a pair of complementary beam patterns generated by an eight-element array with quadrature weighting vectors.

An eight-element array can employ a codebook comprising a pair of quadrature weight vectors (expressed by columns of the following weight matrix) to produce two complementary beam patterns shown in FIG. 8C.

$$W = \begin{bmatrix} +1 & +1 \\ +1 & -1 \\ -1 & -1 \\ -1 & +1 \\ +1 & +1 \\ -1 & +1 \\ +1 & +1 \\ -1 & +1 \end{bmatrix}$$

Both patterns have maximum directivity of 3.0 dB. One pattern is maximum in direction 0° and has a HPBW of 98.7°, and the other pattern is maximum in direction 90° and has a HPBW of 40.9°.

Figure 8D:
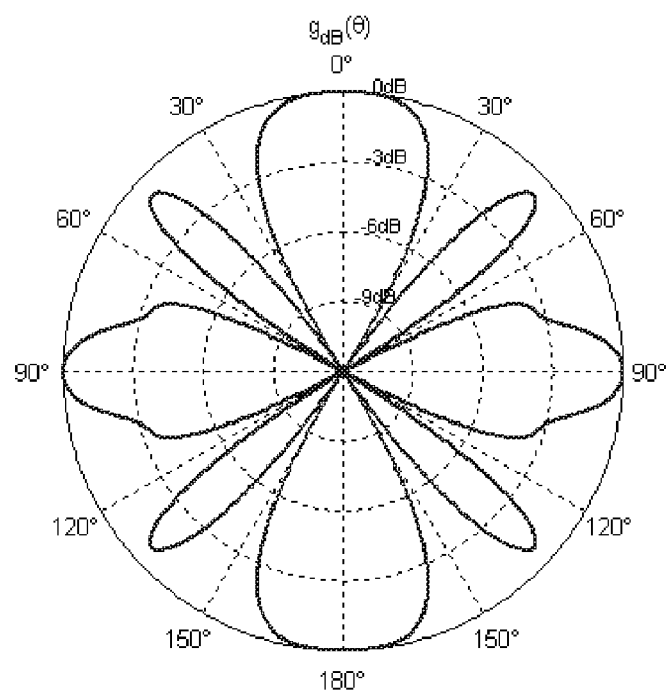
FIGS. 8D-8E show beam patterns with a pair of orthogonal beam forming/combining vectors generated for an eight element array.
Figure 8E:
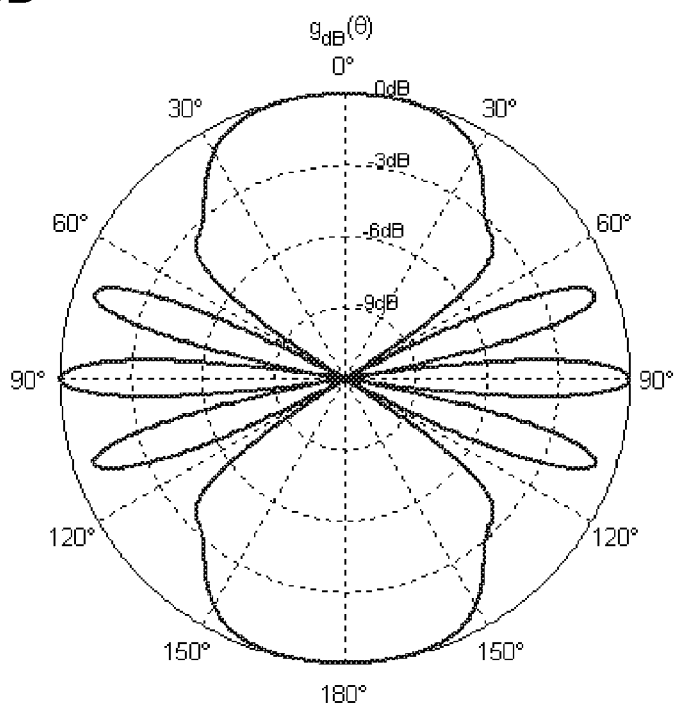

A pair of orthogonal beamforming/combining vectors (shown in FIGS. 8D and 8E) may also be generated for an eight-element array using the following weight matrix $$W = \begin{bmatrix} +1 & +1 \\ +1 & -1 \\ -1 & +1 \\ +1 & +1 \\ -1 & +1 \\ +1 & +1 \\ +1 & +1 \\ +1 & -1 \end{bmatrix}$$

Some embodiments of the invention may employ a sectored antenna array (SEAA) or a switched antenna array (SWAA). The codebook for an N-element SEAA or SWAA may be expressed by an identity matrix:

$$W = \begin{bmatrix} 1 & 0 & \cdots & 0 \\ 0 & 1 & \ddots & \vdots \\ \vdots & \ddots & \ddots & 0 \\ 0 & \cdots & 0 & 1 \end{bmatrix}$$

Each beamforming vector has only one non-zero entry since only one antenna element is active at a time.

One embodiment of the invention provides for a unified messaging protocol that is independent of antenna configuration and estimation algorithms employed for beamforming (i.e., estimating w and c). The messaging protocol may be configured to support a variety of antenna configurations used for transmitting and receiving. Such configurations may include beamforming antenna arrays, such as phased arrays. Antenna configurations may include sectored and switched antenna arrays. Antenna configuration may be defined by a variety of beam patterns, including omni, quasi-omni, or directional single antenna. The messaging protocol also supports SAS and AAS configurations, and it may be configured to support proactive and on-demand beamforming. In one embodiment, the messaging protocol is further configured to support a variety of link models, including (but not limited to) per-packet beamforming between a piconet controller and multiple subscriber devices, a link between a piconet controller and a single subscriber device, and peer-to-peer links between subscriber devices.

Figure 9:
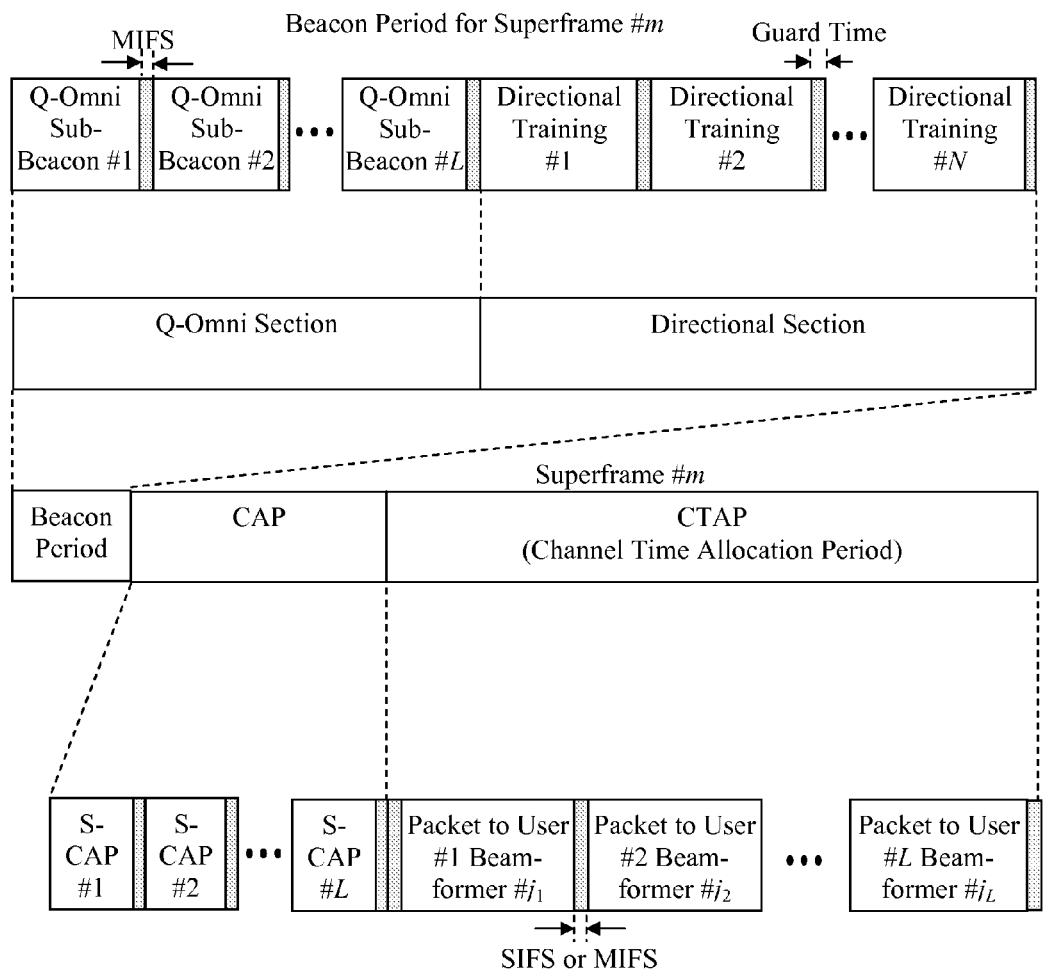
FIG. 9 shows a superframe that may be employed in accordance with embodiments of the invention.

Embodiments of the invention may provide for a plurality of beamforming protocols to be implemented, including a proactive beamforming protocol and an on-demand beamforming protocol. Proactive beamforming is performed using the beacon portion of a superframe (such as shown in FIG. 9) and is used when the piconet controller is the data source for one or more subscriber devices. For example, the piconet controller may be a Kiosk, STB, or Laptop computer, and it is configured to send each packet in at least one of a plurality of different directions to the destination device.

On-demand beamforming may be employed for transmissions between two subscriber devices or between a piconet controller and one subscriber device. On-demand beamforming employs the Channel Time Allocation (CTA) part of the superframe (such as shown in FIG. 9) allocated to the pair of transceivers. In both beamforming protocols, quasi-omni transmissions convey information about the structure of the directional training sections, and the directional training sections enable CSI acquisition and tracking.

The piconet controller beacon comprises at least one quasi-omni (Q-omni) section and at least one directional section. In one embodiment, the Q-omni section has L identical Q-omni sub-beacons (S-beacons) covering different (and possibly overlapping) geographical areas around the piconet controller. The aggregated coverage of the Q-omni S-beacons covers the target space around the piconet controller. Each Q-omni S-beacon is transmitted using a different Q-omni beamforming pattern selected from a Q-omni codebook.

In the embodiment shown in FIG. 9, the directional section may comprise N repetitions of a training sequence (i.e., a plurality N of directional training segments) where each repetition is transmitted by the piconet controller with a different orthogonal or quasi-orthogonal beamforming vector from an orthogonal (or quasi-orthogonal) codebook. In this case, the directional training segments are sent back-to-back, except for a small guard interval. However, alternative embodiments of the invention may provide for interleaving (or otherwise positioning) Q-omni training segments within the directional section. For example, a Q-omni training segment may have the same format as a directional training segment, but it is sent omni-directionally. In one embodiment, a Q-omni training segment follows each directional training segment. A subscriber device uses the Q-omni training segments to help compensate for timing and frequency drift, as such compensation is necessary for generating accurate estimates of the CSI.

The Contention Access Period (CAP) is divided into L identical periods referred to as Sub-CAPs (S-CAPs). The L S-CAPs correspond to the L Q-omni beacons. During the $l^{th}$ S-CAP, the piconet controller is in a receiving mode using the same Q-omni beamformer vector it used for transmission during the $l^{th}$ Q-Omni beacon.

Figure 10A:
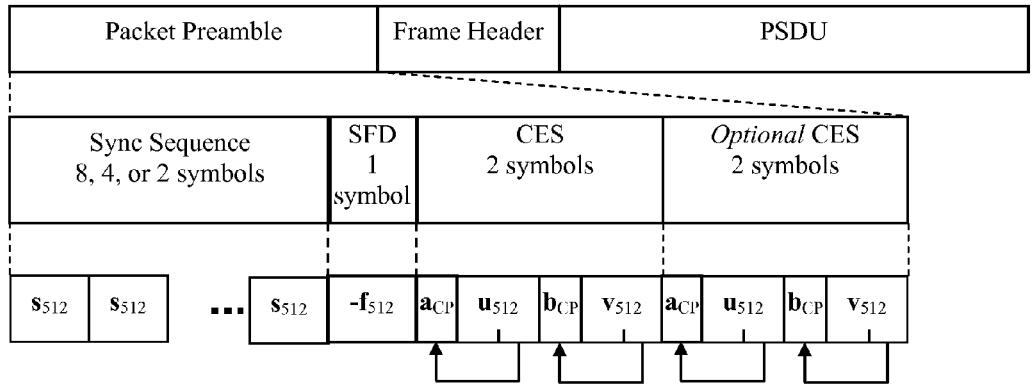
FIG. 10A shows the packet structure of an S-beacon for OFDM.
Figure 10B:
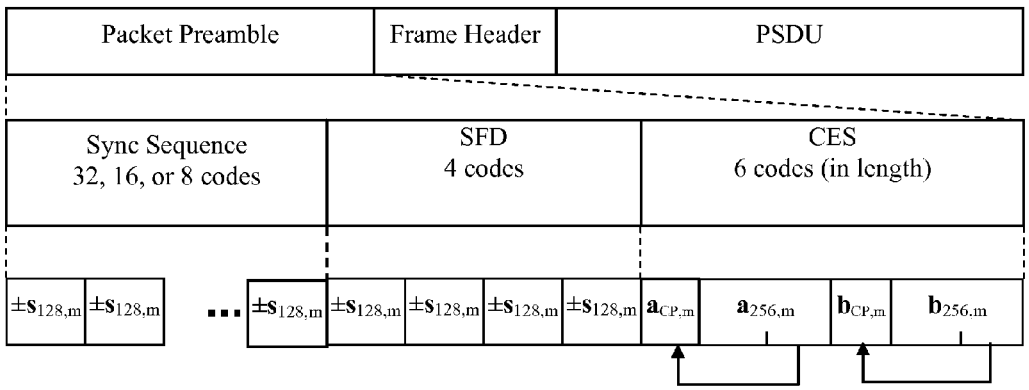
FIG. 10B shows the packet structure of an S-beacon for Single Carrier (SC) signaling.

FIG. 10A shows the packet structure of an S-beacon for OFDM, and FIG. 10B shows the packet structure of an S-beacon for Single Carrier (SC) signaling. Depending on the antenna gain of the Q-omni beacon, the piconet controller may adjust the length of the SYNC, the data rate in the header, and the PSDU fields.

The number L of Q-omni S-beacons may be reduced in order to reduce overhead. For a single antenna, L=1. For SAA, L is the number of sector (or switched) antennas. In beamforming or phased-array configurations, L equals 1 or 2, but it may be more. During transmission, the piconet controller employs L Quasi-omni beamforming vectors from a corresponding quasi-omni codebook, and one Q-omni beamforming vector is used per Q-omni sub-beacon transmission.

In one embodiment of the invention, L=1 for a transmitting phased array with six elements, which employs a one-dimensional vector w=[+1 −1 +j −1 +j +j]$^T$ to transmit the Q-omni sub-beacon. In a different embodiment, L=2 for a two-dimensional phased antenna array wherein $N_x=4$ and $N_y=3$. The first Q-omni sub-beacon is transmitted using the beamforming matrix, $W_{xy,11}=w_{x,1}w_{y,1}^T$, where $w_{x,1}=[+1 \ -j \ +j \ -1]^T$, and $w_{y,1}=[+1 \ +1 \ -1]^T$. The second Q-omni sub-beacon is transmitted using the beamforming matrix, $W_{xy,21}=w_{x,2}w_{y,1}^T$, where $w_{x,2}=[+1 \ +j \ +j \ +1]^T$ and $w_{y,1}=[+1 \ +1 \ -1]^T$.

Figure 11A:
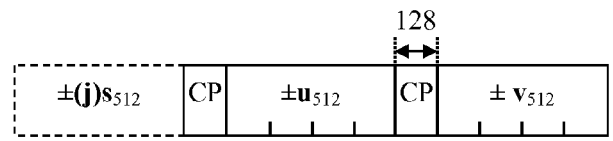
FIG. 11A illustrates a short OFDM training sequence.
Figure 11B:
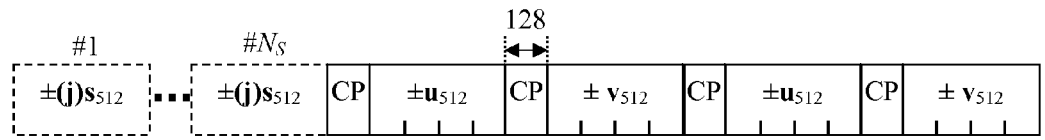
FIG. 11B shows a long OFDM training sequence.
Figure 11C:
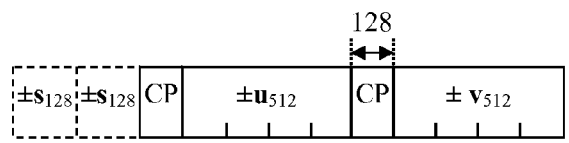
FIG. 11C shows a short single-carrier training sequence.
Figure 11D:
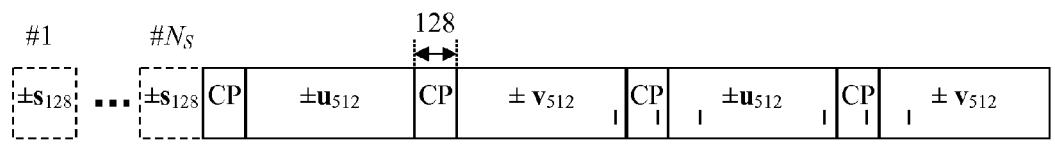
FIG. 11D shows a long single carrier training sequence.

The directional section of the frame shown in FIG. 9 comprises N repetitions of a training sequence. FIG. 11A illustrates a short OFDM training sequence. FIG. 11B shows a long OFDM training sequence. FIG. 11C shows a short single-carrier training sequence. FIG. 11D shows a long single carrier training sequence. The sequences denoted by vectors $u_{512}$, $v_{512}$, and $s_{512}$ are described in Provisional Application Ser. No. 60/985,957, filed Nov. 6, 2007, which is incorporated by reference in its entirety.

The training sequence includes $N_s$ repetitions (where $N_s$ may be zero) of a sync sequence s followed by $N_c$ (e.g., one or two) repetitions of the CES field. Each training sequence transmitted by a piconet controller employs a different orthogonal (or quasi-orthogonal) beam pattern selected from an orthogonal (or quasi-orthogonal) codebook. In the case where OFDM and single-carrier employ short training sequences, the two sync sequence may be used for automatic gain control (AGC). Furthermore, the CES field may be used to acquire the CSI. A matched-filter receiver may align and add the outputs of a Golay matched filter configured to correlate the received signal with the modified Golay sequences u and v to produce a perfect channel estimate. Also, the receiver may produce a difference signal, which provides a perfect noise estimate.

In one embodiment, a beamforming antenna array with $N_x=4$ and $N_y=2$. employs a length-4 x-axis codebook:

$$W = [w_{x,1} \ w_{x,2} \ w_{x,3} \ w_{x,4}] = \begin{bmatrix} +1 & +1 & +1 & +1 \\ -1 & -j & +1 & +j \\ +1 & -1 & +1 & -1 \\ -1 & +j & +1 & -j \end{bmatrix}$$

The corresponding length-2 y-axis codebook is $$W_y = [w_{y,1} \ w_{y,2}] = \begin{bmatrix} +1 & +1 \\ -1 & +1 \end{bmatrix},$$

wherein the total number of orthogonal beamforming matrices is J=8, i.e. $W_{xy,mn}=W_{x,m}W_{y,n}^T$, where m=1, . . . , 4 and n=1, 2:

$$W_{xy,11} = \begin{bmatrix} +1 & -1 \\ -1 & +1 \\ +1 & -1 \\ -1 & +1 \end{bmatrix},$$

$$W_{xy,12} = \begin{bmatrix} +1 & +1 \\ -1 & -1 \\ +1 & +1 \\ -1 & -1 \end{bmatrix}, \ldots,$$

$$W_{xy,42} = \begin{bmatrix} +1 & -1 \\ +j & -j \\ -1 & +1 \\ -j & +j \end{bmatrix}.$$

In this case, the piconet controller completes a cycle of training by transmitting J=8 training sequences, each one being sent in a different direction as specified by the beamforming matrices $W_{xy,11}$, $W_{xy,12}$, . . . , $W_{xy,4,2}$. For example, the first training sequence is sent in the direction corresponding to beamforming matrix $W_{xy,11}$, the second training sequence is sent in the direction corresponding to beamforming matrix $W_{xy,12}$, etc.

In some embodiments, the piconet controller may be configured to employ only a subset of the available beamforming matrices. For example, the piconet controller may transmit over a restricted angular range (e.g., 180°, instead of 360°). The piconet controller employs a directional codebook, which is the subset of possible beamforming matrices that the piconet controller could use to train the subscriber devices. If the directional codebook is of size J, a transmission of J training sequences in the corresponding J directions is referred to as a cycle. In some embodiments, the L identical Q-omni S-beacons may include indices of the codebook vectors selected by the piconet controller. The Q-omni S-beacons may also convey the number of cycles per superframe and/or the number of superframes per cycle.

Figure 12A:
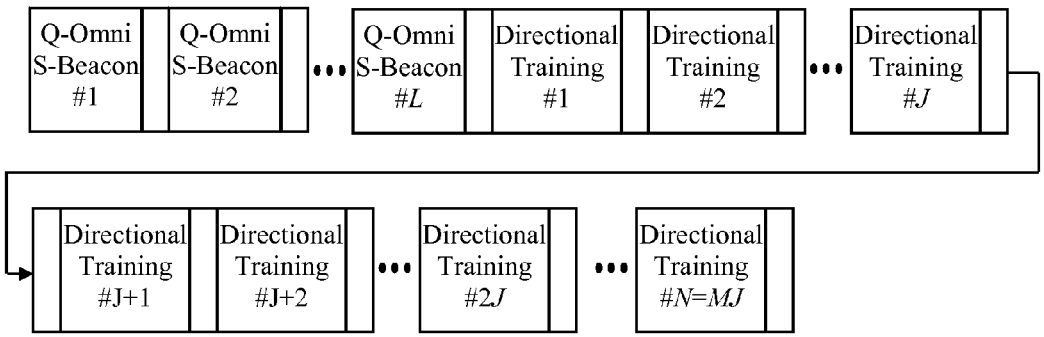
FIG. 12A shows a superframe comprising a plurality M of cycles.
Figure 12B:
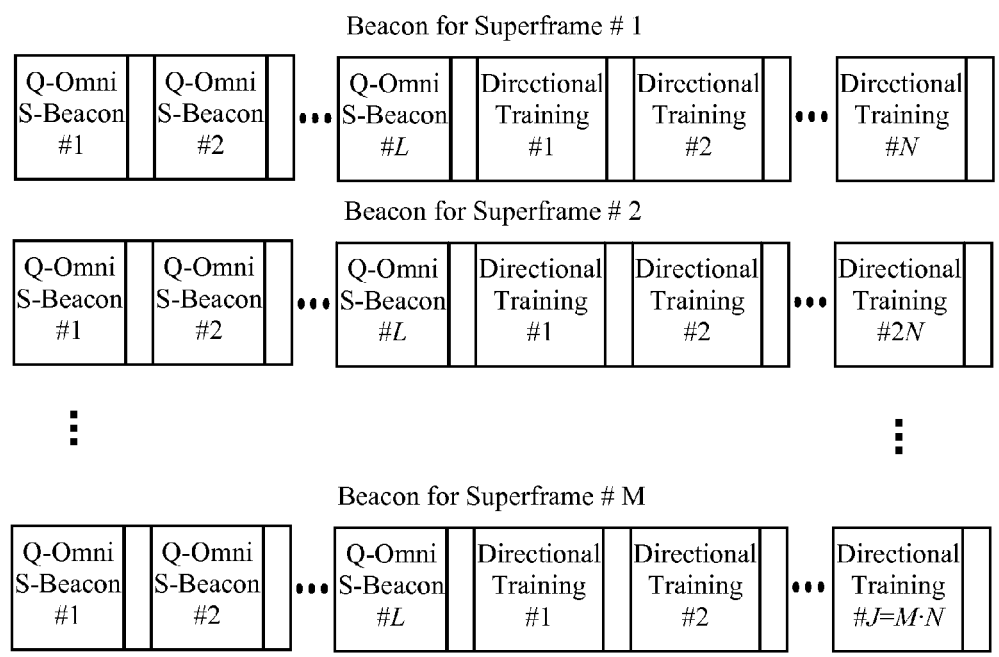
FIG. 12B shows a cycle comprising a plurality of M superframes.

FIG. 12A shows a superframe comprising M cycles, whereas FIG. 12B shows a cycle occurring every M superframes. A subscriber device is configured to listen to the Q-omni transmissions from a piconet controller. Upon detection, the subscriber device decodes the content of the Q-omni S-beacon to obtain the structure of the directional section. The subscriber device selects a first codebook vector to steer its antenna to a first direction. The subscriber device selects a second codebook vector to steer its antenna to a second direction, and it may repeat this procedure for each codebook vector. Alternatively, the subscriber device may select codebook vectors from a subset of the codebook. The subscriber device calculates the CSI matrix, H, from which it estimates the optimal beamforming weights for the piconet controller and the optimal combining vector for itself. In the SAS case, the subscriber device may listen to the Q-omni transmissions until it determines a combination of weights that it deems to provide adequate link quality. The resulting beamforming weights are transmitted back to the piconet controller.

FIG. 13A shows a beamforming information element of a transmission frame comprising training sequence information, antenna array information about the transmit and receive antennas, antenna type, a Q-Omni S-beacon identifier, and the number of Q-Omni S-beacons. The antenna type may include information about the piconet controller antenna (e.g., single antenna, beamforming array, phased array, SEAA, SWAA), SAS or AAS antenna configuration, and whether quadrature or binary weights are used for the transmit and receive sides. The fields of the beamforming information element may be adapted for different antenna configurations. For example, the training sequence information and the antenna array information may be omitted for a single antenna configuration or a switched antenna array.

FIG. 13B shows the antenna array information portion of the beamforming information element. This information may include the number $N_x$ of antennas along the x-axis, ID of the codebook used along the x-axis, the number $N_y$ of antennas along the y-axis, and ID of the codebook used along the y-axis in the case of a two-dimensional array. Some embodiments may include the size $J_x$ and ID of the subset of the beamforming vectors to be used along the x-axis, and the size $J_y$ and ID of the subset of the beamforming vectors to be used along the y-axis.

FIG. 13C shows the training sequence information portion of the beamforming information element, which includes the guard interval duration in units of $32 \times T_c$ (where $T_c$ is the chip or sampling duration), the number of CES repetitions, $N_c$, and the number of SYNC repetitions, $N_s$, and the number of training sequence repetitions.

Figure 16A:
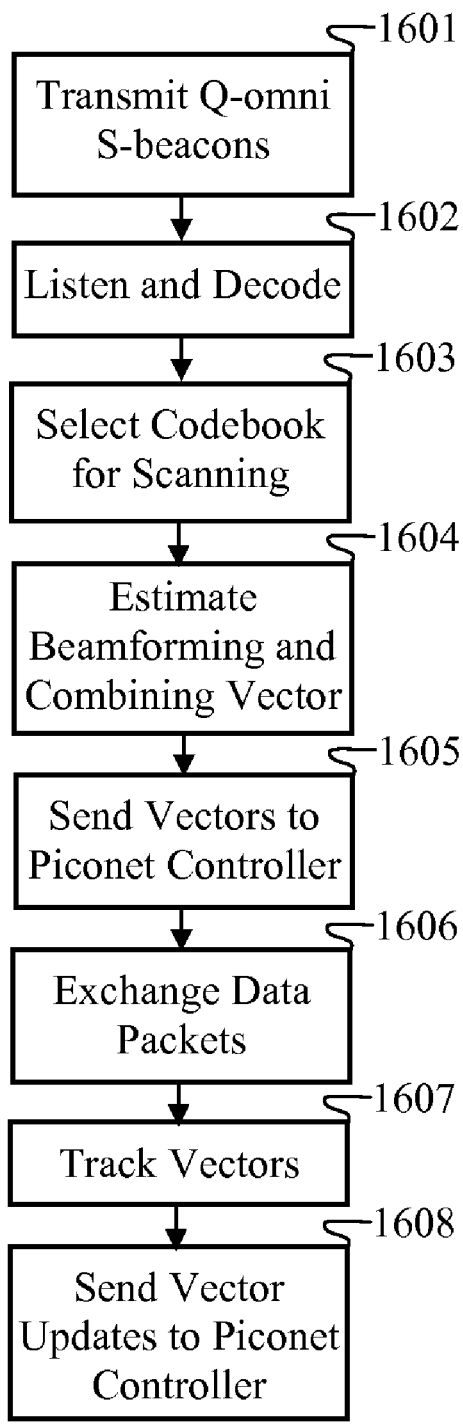
FIG. 16A illustrates a method for performing proactive beamforming in accordance with one embodiment of the invention.

FIG. 16A illustrates a method for performing proactive beamforming. A piconet controller transmits 1601 a number L of Q-omni S-beacons and a number N of directional training sequences per superframe. A subscriber device listens to and decodes 1602 at least one of the Q-omni S-beacons, from which it acquires information related to the directional section. In one embodiment of the invention, the subscriber device may listen to the entire set of Q-omni S-beacons. The subscriber device selects 1603 an appropriate subset of an orthogonal (or quasi-orthogonal) codebook and begins a scanning procedure using the selected combining vectors.

In one embodiment, when the subscriber device steers to a particular direction using a vector from the codebook and listens to a transmitted cycle, it may store a Link quality Factor (LQF). This process is repeated until the subscriber device finds an $l^{th}$ LQF above a predetermined threshold, or until it has finished listening to all the codebook vectors and acquires the CSI matrix.

The subscriber device estimates 1604 its optimal combining vector $c_2$ and an optimal beamforming vector $w_1$ for the piconet controller. The estimated optimal beamforming vector $w_1$ (and optionally, the optimal combiner vector $c_2$) are fed back 1605 to the piconet controller during the $l^{th}$ S-CAP.

In the SAS case, the subscriber device and the piconet controller exchange 1606 data packets during a CTAP. The subscriber device may track 1607 the beamforming and combining vectors by periodically scanning the beacon. The subscriber device may periodically feed back 1608 any updates to w and c.

Figure 16B:
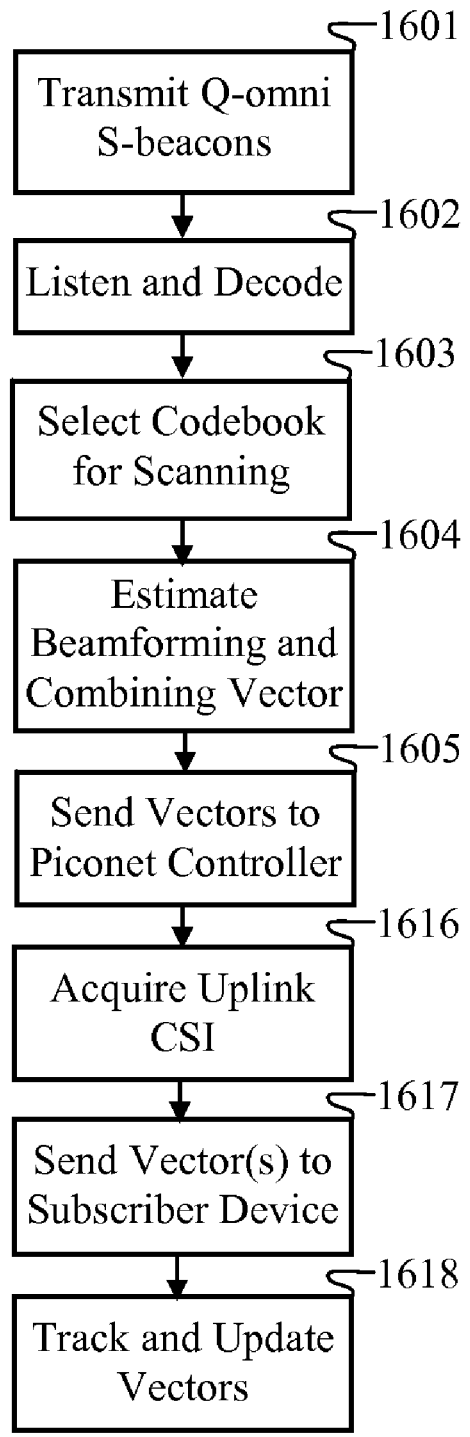
FIG. 16B illustrates a method for performing on-demand beamforming in accordance with an embodiment of the invention.

In the AAS case, steps 1606-1608 are bypassed. Instead, on-demand beamforming may be used during the CTAP allocated to the communication link in order to complete bi-directional beamforming. As shown in FIG. 16B, the piconet controller acquires 1616 the uplink CSI, $H_{2 \to 1}(n)$ for n=0, 1, . . . , N−1, to estimate its optimal combining vector $c_1$ and the subscriber device's optimal beamforming vector $w_2$, and then conveys 1617 at least the beamforming weight vector $w_2$ to the subscriber device. Once acquisition is complete, the subscriber device may transmit 1618 an infrequent "directional acquisition period" (e.g., once every few microseconds) to allow the piconet controller to track and update $w_2$ and $c_1$. The update rate (tracking rate) depends on the maximum Doppler that the system can tolerate. For a pedestrian speed of 3 m/s at 60 GHz, the Doppler frequency is $f_d$=600 Hz, and the coherence time is approximately 0.3 ms, which allows an update rate of once every 0.3 ms or less.

Figures 14A, 14B:
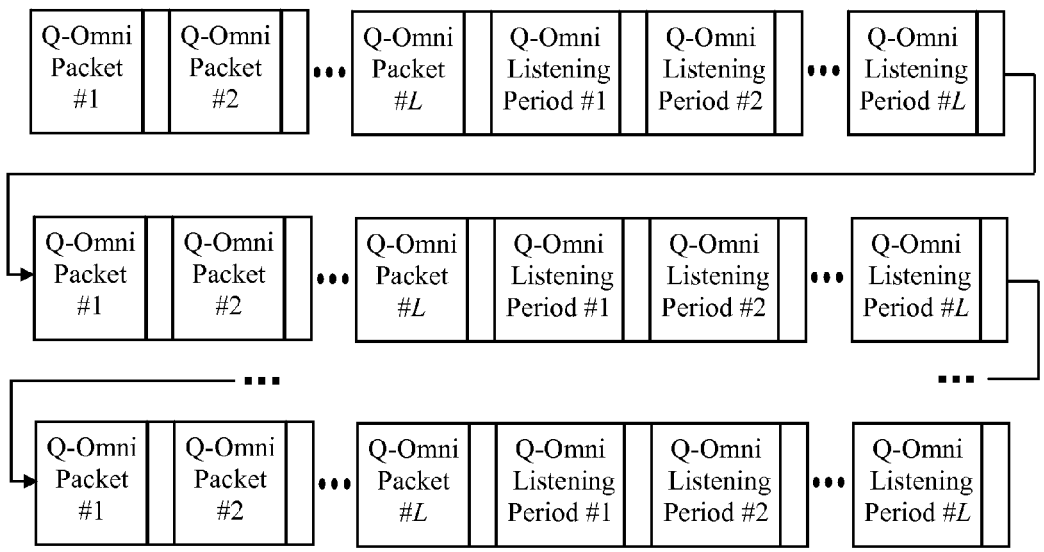
FIG. 14A shows a superframe that may be employed in embodiments of the invention.
FIG. 14B illustrates a quasi-omni acquisition signaling protocol in accordance with an embodiment of the invention.
Figure 17A:
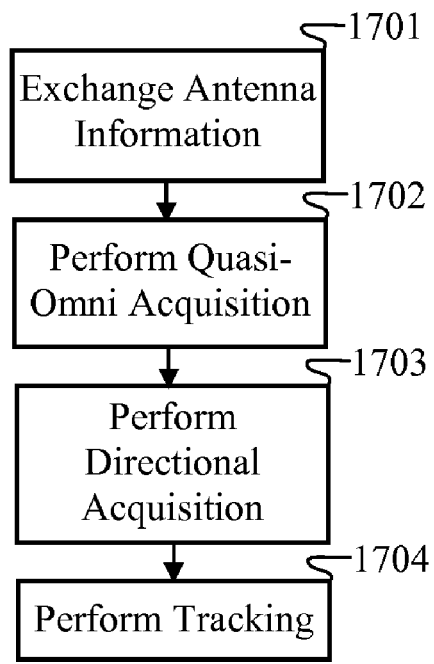
FIG. 17A is a flow diagram of an on-demand beamforming method for SAS in accordance with one embodiment of the invention.

On-demand beamforming (which is performed between two subscriber devices or between a piconet controller and one subscriber device) employs the Channel Time Allocation (CTA) part of the superframe shown in FIG. 14A. FIG. 17A is a flow diagram of an on-demand beamforming method for SAS in accordance with one embodiment of the invention. Antenna information is exchanged 1701 during association such that each transceiver knows the antenna array processing capabilities (e.g., number of array elements, range of antenna-element weights, etc.) of the other transceiver(s). Quasi-omni acquisition 1702 is performed as a first transceiver transmits a Q-omni S-beacon to a second transceiver. Directional acquisition 1703 is performed as the first transceiver transmits a directional training sequence to the second transceiver. Once acquisition is complete, the system may perform tracking 1704 as the first transceiver transmits data to the second transceiver.

Figure 17B:
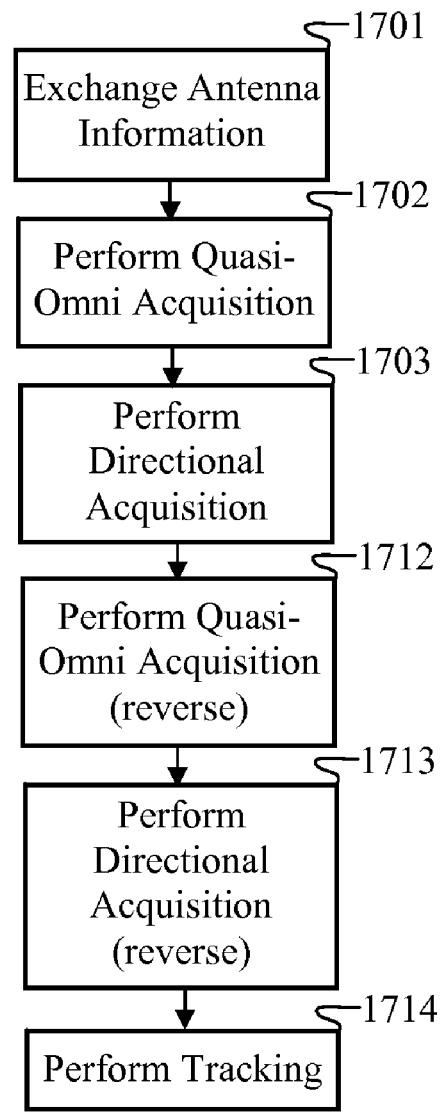
FIG. 17B illustrates steps of an on-demand beamforming method for AAS in accordance with an embodiment of the invention.

FIG. 17B illustrates steps of an on-demand beamforming method for AAS in accordance with an embodiment of the invention. Antenna information is exchanged 1701 during association. Quasi-omni acquisition 1702 is performed as a first transceiver transmits a Q-omni S-beacon to a second transceiver. Directional acquisition 1703 is performed as the first transceiver transmits a directional training sequence to the second transceiver. Quasi-omni acquisition 1712 is performed as the second transceiver transmits a Q-omni S-beacon to the first transceiver. Similarly, directional acquisition 1713 is performed as the second transceiver transmits a directional training sequence to the first transceiver. Once acquisition in both directions is complete, the system may perform tracking 1714 as the first transceiver transmits data to the second transceiver and/or the second transceiver transmits data to the first transceiver.

FIG. 14B illustrates a quasi-omni acquisition signaling protocol in accordance with an embodiment of the invention. In a CTA frame (shown in FIG. 14A), a first transceiver transmits a number L of quasi-omni packets carrying the beamforming information element. Each of the L transmissions is followed by L listening periods (ACKs). The first transceiver continues repeating this structure until it receives an ACK in one of the L listening periods (e.g., at the $l^{th}$ listening period). From this point on, the first transceiver selects the $l^{th}$ Q-omni direction for transmission (which is also the reception direction in the SAS case) from the Q-omni codebook. The second transceiver records its best Q-omni receiving direction (which is also the best transmitting direction in SAS case) and uses it for any future Q-omni reception. In the AAS case, the process is repeated as the second transceiver transmits to the first transceiver.

Figure 15:
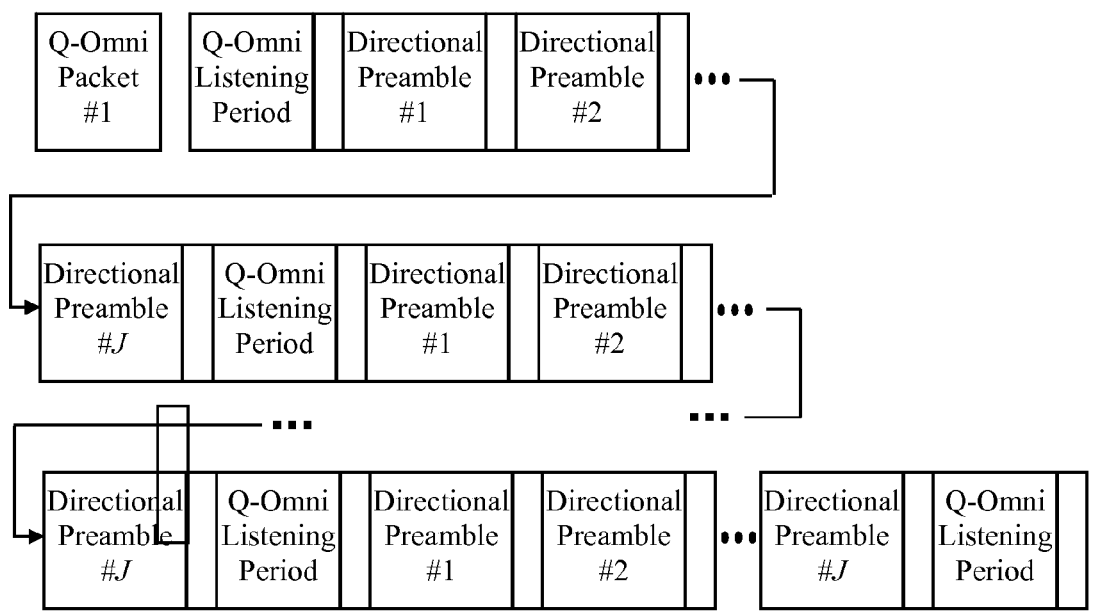
FIG. 15 illustrates a frame format for directional training employing periodic transmissions from the first transceiver to the second transceiver.

FIG. 15 illustrates a frame format for directional training employing periodic transmissions from the first transceiver to the second transceiver, and FIG. 18A illustrates a method in accordance with an embodiment of the invention that employs the frame format. A directional acquisition period may comprise an optional Q-omni packet followed by a listening period. One cycle of directional training sequences transmitted by the first transceiver corresponds to all J orthogonal (quasi-orthogonal) beamforming vectors from a subset of the selected codebook. Each cycle is followed by a listening period (ACK) to listen to any feedback from the second transceiver.

The first transceiver repeats the period 1801 until the second transceiver acquires the CSI, $H_{1 \to 2}(n)$ for n=0, 1, . . . , N−1, or finds an adequate link-quality indicator (LQI) 1802. The second transceiver estimates preferred $w_1$ and $c_2$ 1803 and couples at least the $w_1$ estimate to the first transceiver 1804 during the listening (ACK) period. The preferred beamforming vector $w_1$ may be one of the transceiver's codebook vectors, or it may be a linear combination of the codebook vectors, or it may be unrelated to the transceiver's codebook vectors.

In one embodiment employing a four-element array with a codebook represented by the following weight matrix $$W = \begin{bmatrix} +1 & +1 & +1 & +1 \\ -1 & -j & +1 & +j \\ +1 & -1 & +1 & -1 \\ -1 & +j & +1 & -j \end{bmatrix},$$

the codebook may comprise one or more of the vectors [1 −1 1 −1], [1 −j −1 j], [1 1 1 1], and [1 j −1 −j]. If the optimal beamforming/combining vector is chosen from one of the codebook vectors, the embodiment is referred to as beam-switching.

In one embodiment, the optimal beamforming/combining vector is selected from any of the possible weight combinations for the four-element array. If quadrature weights are employed (i.e., weights ±1 and ±j), then there are $4^4$ possible combinations from which to select the vector. One embodiment of the invention provides for selecting an optimal beamforming/combining vector from weights comprising any phasor. Another embodiment may employ weights comprising a range of amplitudes and phases.

The transceivers will employ the $w_1$ and $c_2$ estimates for beamforming and combining during data communications. Either or both transceivers may update 1805 the estimates $w_1$ and $c_2$ when the first transceiver transmits a directional acquisition period.

For the AAS case, additional steps shown in FIG. 18B are performed. The second transceiver transmits directional training sequences 1811 to the first transceiver, and the first transceiver acquires the CSI, $H_{2 \to 1}$ (or determines an adequate LQI) 1812. The first transceiver estimates $w_2$ and $c_1$ 1813 and couples at least the $w_2$ estimate 1814 to the second transceiver. The estimates $w_1$ and $c_2$ are employed as beamforming and combining weights during data transmission, and these estimates $w_1$ and $c_2$ may be updated periodically 1815 when the second transceiver transmits a directional acquisition period.

The scope of the invention should not be interpreted as being limited to the array-processing embodiments illustrated herein. Rather, the Applicants anticipate that alternative embodiments may comprise antenna arrays with more than eight elements along a particular axis and antenna arrays comprising antennas with a plurality of polarizations, and that such antenna-array configurations fall within the scope and spirit of the invention. In one embodiment, two dipole antennas with orthogonal linear polarizations may be employed together to produce a quasi-omni pattern.

It should be appreciated that the apparatus and method embodiments of the invention may be implemented using a variety of hardware and software. For example, beamforming, combining, and related applications in accordance with embodiments of the invention may be implemented using special-purpose hardware, such as an application specific integrated circuit (ASIC) and programmable logic devices such as gate arrays, and/or software or firmware running on a computing device, such as a microprocessor, microcontroller or digital signal processor (DSP). It also will be appreciated that although functions of beamforming/combining weight calculation and selection may be integrated in a single device, such as a single ASIC, they may also be distributed among several devices.

The invention is not intended to be limited to the preferred embodiments. Furthermore, those skilled in the art should recognize that the method and apparatus embodiments described herein may be implemented in a variety of ways, including implementations in hardware, software, firmware, or various combinations thereof. Examples of such hardware may include ASICs, Field Programmable Gate Arrays, general-purpose processors, DSPs, and/or other circuitry. Software and/or firmware implementations of the invention may be implemented via any combination of programming languages, including Java, C, C++, Matlab™, Verilog, VHDL, and/or processor specific machine and assembly languages.

Various digital computer system configurations can be employed to perform the method embodiments of this invention, and to the extent that a particular system configuration is capable of performing the method embodiments of this invention, it is equivalent to the representative system embodiments of the invention disclosed herein, and within the scope and spirit of this invention.

Once digital computer systems are programmed to perform particular functions pursuant to instructions from program software that implements the method embodiments of this invention, such digital computer systems in effect become special-purpose computers particular to the method embodiments of this invention. The techniques necessary for this programming are well known to those skilled in the art of computer systems.

Various embodiments of the invention may include variations in system configurations and the order of steps in which methods are performed. In many cases, multiple steps and/or multiple components may be consolidated.

The method and system embodiments described herein merely illustrate particular embodiments of the invention. It should be appreciated that those skilled in the art will be able to devise various arrangements, which, although not explicitly described or shown herein, embody the principles of the invention and are included within its spirit and scope. Furthermore, all examples and conditional language recited herein are intended to be only for pedagogical purposes to aid the reader in understanding the principles of the invention. This disclosure and its associated references are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be appreciated by those skilled in the art that the block diagrams herein represent conceptual views of illustrative circuitry, algorithms, and functional steps embodying principles of the invention. Similarly, it should be appreciated that any flow charts, flow diagrams, signal diagrams, system diagrams, codes, and the like represent various processes that may be substantially represented in computer-readable medium and so executed by a computer or processor, whether or not such computer or processor is explicitly shown.

The functions of the various elements shown in the drawings, including functional blocks labeled as "processors" or "systems," may be provided through the use of dedicated hardware as well as hardware capable of executing software in association with appropriate software. When provided by a processor, the functions may be provided by a single dedicated processor, by a shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included. Similarly, the function of any component or device described herein may be carried out through the operation of program logic, through dedicated logic, through the interaction of program control and dedicated logic, or even manually, the particular technique being selectable by the implementer as more specifically understood from the context.

Any element expressed herein as a means for performing a specified function is intended to encompass any way of performing that function including, for example, a combination of circuit elements which performs that function, or software in any form, including, therefore, firmware, micro-code or the like, combined with appropriate circuitry for executing that software to perform the function. Embodiments of the invention as described herein reside in the fact that the functionalities provided by the various recited means are combined and brought together in the manner which the operational descriptions call for. Applicant regards any means that can provide those functionalities as equivalent to those shown herein.

The invention claimed is:

1. A beamforming method between a first transceiver and a second transceiver, the method comprising:
acquiring channel state information (CSI) by transmitting a signal employing at least a subset of a beamforming codebook from the first transceiver to the second transceiver and configuring the second transceiver to employ at least a subset of a combining codebook to acquire the CSI,
estimating an optimal beamforming vector and an optimal combining vector from the CSI to produce an estimated optimal beamforming vector and an estimated optimal combining vector, and
sending at least one of the estimated optimal beamforming vector and the estimated optimal combining vector to the first transceiver.

2. The method recited in claim 1, wherein estimating employs at least one optimality criterion of a set of optimality criteria, the set comprising an effective signal-to-noise ratio (SNR) and a mean SNR.

3. The method recited in claim 1, further comprising providing for updating the CSI after the CSI is acquired by transmitting the subset of the beamforming codebook at a lower rate than a rate employed for acquiring the CSI and repeating the estimating step and the sending step.

4. The method recited in claim 1, wherein the beamforming codebook and the combining codebook comprise at least one of a set of weight vectors, the set comprising at least one binary weight vector, at least one quadrature weight vector.

5. The method recited in claim 1, wherein the beamforming codebook and the combining codebook comprise at least one of a set of codebooks, the set comprising a quasi-omni codebook and a complementary Golay codebook.

6. A method for employing a frame format for signaling between a first transceiver and at least a second transceiver to select beamforming and combining weights, the method comprising:
transmitting a signal from the first transceiver to the second transceiver, the signal comprising a plurality of transmission segments, wherein each of the plurality of transmission segments is transmitted with a different beam pattern from a predetermined beamforming codebook,
listening for feedback from the at least second transceiver, and
selecting at least one vector of a set based on feedback from the at least second transceiver, the set comprising at least one of beamforming weights and combining weights.

7. The method recited in claim 6, wherein transmitting the signal comprises transmitting at least one of a quasi-omni section and a directional section.

8. The method recited in claim 6, further configured to perform at least one of proactive beamforming and on-demand beamforming.

9. The method recited in claim 6, wherein the predetermined beamforming codebook comprises at least one of a quasi-omni codebook and a complementary Golay codebook.

10. The method, recited in claim 6, wherein the predetermined beamforming codebook comprises a subset of at least one of a quasi-omni codebook and a complementary Golay codebook.

11. The method recited in claim 6, wherein listening comprises employing a plurality of combining vectors for listening over a plurality of listening segments, the plurality of combining vectors being vectors of the beamforming codebook, each of the plurality of combining vectors corresponding to each one of the plurality of transmission segments.

12. The method recited in claim 6, wherein the signal comprises at least one of a quasi-omni sub-beacon and a directional training sequence.

13. A method for selecting beamforming and combining weights for at least a first transceiver comprising an antenna array communicatively coupled to a second transceiver comprising an antenna array, the method comprising:
receiving a signal at the second transceiver transmitted by the first wireless transceiver, the signal comprising a plurality of transmission segments wherein each of the plurality of transmission segments is transmitted with a different beam pattern from a predetermined beamforming codebook,
estimating a preferred beamforming vector for the first transceiver from at least a subset of the plurality of transmission segments, estimating a preferred combining vector for the second transceiver, and
sending at least one of the preferred beamforming vector and the preferred combining vector to the first transceiver during a listening period.

14. The method recited in claim 13, wherein at least one of estimating the preferred beamforming vector and estimating the preferred combining vector comprises at least one of acquiring channel state information and calculating a link-quality indicator.

15. The method recited in claim 13, wherein estimating the preferred combining vector comprises correlating the signal with a plurality of Golay sequences to produce a plurality of matched-filter outputs, and combining the matched-filter outputs to produce a channel estimate.

16. The method recited in claim 13, wherein the listening period comprises a plurality of listening-period segments, each of the plurality of listening-period segments corresponding to one of the plurality of transmission segments, wherein sending is further configured for selecting a particular one of the plurality of listening-period segments corresponding to a particular one of the transmission segments that corresponds to the estimated preferred beamforming vector.

17. The method recited in claim 13, configured for performing at least one of proactive beamforming and on-demand beamforming.

18. The method recited in claim 13, wherein the signal comprises at least one of a quasi-omni sub-beacon and a directional training sequence.

19. The method recited in claim 13, wherein estimating the preferred beamforming vector employs a first set of constraints corresponding to the first transceiver, and estimating the preferred combining vector employs a second set of constraints corresponding to the second transceiver.

20. The method recited in claim 13, wherein the preferred beamforming vector and the preferred combining vector comprise at least one of a plurality of phases and a plurality of amplitudes.

21. The method recited in claim 13, wherein at least one of the antenna array of the first transceiver and the antenna array of the second transceiver comprises a plurality of antennas, wherein each of the plurality of antennas has a different polarization.

22. An apparatus for beamforming, the apparatus comprising:
   a receiver configured to acquire channel state information (CSI) from reception of a signal employing at least a subset of a beamforming codebook and employment of at least a subset of a combining codebook;
   a processor configured to estimate an optimal beamforming vector and an optimal combining vector from the CSI to produce an estimated optimal beamforming vector and an estimated optimal combining vector; and
   a transmitter configured to send at least one of the estimated optimal beamforming vector and the estimated optimal combining vector.

23. An apparatus for beamforming, the apparatus comprising:
   means for acquiring channel state information (CSI) by transmitting a signal employing at least a subset of a beamforming codebook from the first transceiver to the second transceiver and configuring the second transceiver to employ at least a subset of a combining codebook to acquire the CSI;
   means for estimating an optimal beamforming vector and an optimal combining vector from the CSI to produce an estimated optimal beamforming vector and an estimated optimal combining vector; and
   means for sending at least one of the estimated optimal beamforming vector and the estimated optimal combining vector to the first transceiver.

24. A computer program product for communication comprising a computer readable medium comprising instructions that when executed cause an apparatus to:
   acquire channel state information (CSI) by transmitting a signal employing at least a subset of a beamforming codebook from the first transceiver to the second transceiver and configuring the second transceiver to employ at least a subset of a combining codebook to acquire the CSI;
   estimate an optimal beamforming vector and an optimal combining vector from the CSI to produce an estimated optimal beamforming vector and an estimated optimal combining vector; and
   send at least one of the estimated optimal beamforming vector and the estimated optimal combining vector to the first transceiver.

25. A subscriber device comprising:
   one or more antennas;
   a receiver configured to acquire channel state information (CST) from reception, via the one or more antennas, of a signal employing at least a subset of a beamforming codebook and employment of at least a subset of a combining codebook;
   a processor configured to estimate an optimal beamforming vector and an optimal combining vector from the CSI to produce an estimated optimal beamforming vector and an estimated optimal combining vector; and
   a transmitter configured to send, via the one or more antennas, at least one of the estimated optimal beamforming vector and the estimated optimal combining vector.

26. An apparatus for beamforming, the apparatus comprising:
   a transmitter configured to transmit a signal comprising a plurality of transmission segments, wherein each of the plurality of transmission segments is transmitted with a different beam pattern from a predetermined codebook;
   a receiver configured to receive feedback from at least one transceiver; and
   a processor configured to select at least one vector of a set based on feedback from the at least one transceiver, the set comprising at least one of beamforming weights and combining weights.

27. An apparatus for beamforming, the apparatus comprising:
   means for transmitting a signal comprising a plurality of transmission segments, wherein each of the plurality of transmission segments is transmitted with a different beam pattern from a predetermined beamforming codebook;
   means for listening for feedback from the at least one transceiver; and
   means for selecting at least one vector of a set based on feedback from the at least one transceiver, the set comprising at least one of beamforming weights and combining weights.

28. A computer program product for communication comprising a computer readable medium comprising instructions that when executed cause an apparatus to:
   transmit a signal comprising a plurality of transmission segments wherein each of the plurality of transmission segments is transmitted with a different beam pattern from a predetermined beamforming codebook;
   listening for feedback from the at least one transceiver; and
   select at least one vector of a set based on feedback from the at least one transceiver, the set comprising at least one of beamforming weights and combining weights.

29. A piconet controller comprising:
   one or more antennas;
   a transmitter configured to transmit, via the antennas, a signal comprising a plurality of transmission segments, wherein each of the plurality of transmission segments is transmitted with a different beam pattern from a predetermined codebook;
   a receiver configured to receive, via the antennas, feedback from at least one transceiver; and
   a processor configured to select at least one vector of a set based on feedback from the at least one transceiver, the set comprising at least one of beamforming weights and combining weights.

30. An apparatus for beamforming, the apparatus comprising:
   a receiver configured to receive a signal comprising a plurality of transmission segments wherein each of the plurality of transmission segments is transmitted with a different beam pattern from a predetermined beamforming codebook;
   a processor configured to estimate a preferred beamforming vector from at least a subset of the plurality of transmission segments and estimate a preferred combining vector; and
   a transmitter configured to send at least one of the preferred beamforming vector and the preferred combining vector during a listening period.

31. An apparatus for beamforming, the apparatus comprising:
- means for receiving a signal comprising a plurality of transmission segments wherein each of the plurality of transmission segments is transmitted with a different beam pattern from a predetermined beamforming codebook;
- means for estimating a preferred beamforming vector from at least a subset of the plurality of transmission segments and a preferred combining vector for the second transceiver; and
- means for sending at least one of the preferred beamforming vector and the preferred combining vector during a listening period.

32. A computer program product for communication comprising a computer readable medium comprising instructions that when executed cause an apparatus to:
- receive a signal comprising a plurality of transmission segments wherein each of the plurality of transmission segments is transmitted with a different beam pattern from a predetermined beamforming codebook;
- estimate a preferred beamforming vector for the first transceiver from at least a subset of the plurality of transmission segments and a preferred combining vector for the second transceiver; and
- send at least one of the preferred beamforming vector and the preferred combining vector to the first transceiver during a listening period.

33. A subscriber device comprising:
- one or more antennas;
- a receiver configured to receive, via the antennas, a signal comprising a plurality of transmission segments wherein each of the plurality of transmission segments is transmitted with a different beam pattern from a predetermined beamforming codebook;
- a processor configured to estimate a preferred beamforming vector from at least a subset of the plurality of transmission segments and estimate a preferred combining vector; and
- a transmitter configured to send, via the antennas, at least one of the preferred beamforming vector and the preferred combining vector during a listening period.

* * * * *